United States Patent
Fujikura et al.

(10) Patent No.: US 10,185,131 B2
(45) Date of Patent: Jan. 22, 2019

(54) ZOOM LENS AND LENS BARREL AND IMAGE PICKUP APPARATUS USING THE SAME

(71) Applicant: OLYMPUS CORPORATION, Tokyo (JP)

(72) Inventors: Takashi Fujikura, Tokyo (JP); Keisuke Takada, Tokyo (JP); Keisuke Ichikawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 289 days.

(21) Appl. No.: 15/008,693

(22) Filed: Jan. 28, 2016

(65) Prior Publication Data
US 2016/0147050 A1    May 26, 2016

Related U.S. Application Data

(63) Continuation of application No. PCT/JP2014/067913, filed on Jul. 4, 2014.

(30) Foreign Application Priority Data

Jul. 30, 2013    (JP) ................................ 2013-157775

(51) Int. Cl.
*G02B 15/14* (2006.01)
*G02B 15/177* (2006.01)
(Continued)

(52) U.S. Cl.
CPC .......... *G02B 15/177* (2013.01); *G02B 7/021* (2013.01); *G02B 15/20* (2013.01);
(Continued)

(58) Field of Classification Search
CPC .. G02B 27/0025; G02B 15/20; G02B 15/177; G02B 13/009; G02B 13/18; G02B 15/14;
(Continued)

(56) References Cited

U.S. PATENT DOCUMENTS

| 5,153,776 A | 10/1992 | Nozawa |
| 5,319,405 A | 6/1994 | Ikemori |

(Continued)

FOREIGN PATENT DOCUMENTS

| JP | 02-238418 | 9/1990 |
| JP | 03-059626 | 3/1991 |

(Continued)

OTHER PUBLICATIONS

International Preliminary Report on Patentability, dated Feb. 11, 2016, issued in corresponding International Application No. PCT/JP2014/067913.

(Continued)

*Primary Examiner* — Evelyn A Lester
(74) *Attorney, Agent, or Firm* — Hunton Andrews Kurth LLP

(57) ABSTRACT

A zoom lens includes in order from an object side, a first lens unit having a negative refractive power, a second lens unit having a positive refractive power, and a third lens unit having a negative refractive power, and at the time of zooming, movement of the first lens unit includes at least a movement toward an image side, the second lens unit moves integrally with an aperture stop, and the third lens unit moves toward the object side, and the first lens unit includes at least a negative lens and a positive lens, and the negative lens is disposed nearest to an object, and the following conditional expressions are satisfied:

$$0.75 < (\beta_{2t}/\beta_{2w})/(\beta_{3t}/\beta_{3w}) < 1.38$$

$$-0.70 < \beta_{2w} < -0.32$$

$$0.96 < f_2/f_w < 1.80.$$

18 Claims, 40 Drawing Sheets

(51) Int. Cl.
*G02B 7/02* (2006.01)
*G02B 15/20* (2006.01)
*G02B 27/00* (2006.01)
*H04N 5/232* (2006.01)
*H04N 5/357* (2011.01)
*G02B 9/12* (2006.01)
*G02B 5/00* (2006.01)
*G02B 15/15* (2006.01)
*G02B 15/16* (2006.01)
*G02B 13/18* (2006.01)
*G02B 15/163* (2006.01)
*G02B 13/04* (2006.01)
*G02B 13/00* (2006.01)

(52) U.S. Cl.
CPC ..... *G02B 27/0025* (2013.01); *H04N 5/23209* (2013.01); *H04N 5/3572* (2013.01); *G02B 5/005* (2013.01); *G02B 9/12* (2013.01); *G02B 13/009* (2013.01); *G02B 13/04* (2013.01); *G02B 13/18* (2013.01); *G02B 15/14* (2013.01); *G02B 15/15* (2013.01); *G02B 15/16* (2013.01); *G02B 15/163* (2013.01)

(58) Field of Classification Search
CPC ...... G02B 15/16; G02B 15/163; G02B 13/04; G02B 5/005; G02B 9/12; G02B 15/15
USPC ....... 359/683–685, 689, 695, 716, 740, 753, 359/784
See application file for complete search history.

(56) References Cited

U.S. PATENT DOCUMENTS

| | | | |
|---|---|---|---|
| 7,177,095 | B2 | 2/2007 | Sugiyama et al. |
| 7,212,351 | B2 | 5/2007 | Kawamura |
| 7,339,745 | B2 | 3/2008 | Hozumi et al. |
| 8,736,973 | B2 | 5/2014 | Okubo |
| 8,908,283 | B2 | 12/2014 | Hayakawa et al. |
| 2007/0146897 | A1* | 6/2007 | Hozumi ............... G02B 15/177 359/680 |

FOREIGN PATENT DOCUMENTS

| | | |
|---|---|---|
| JP | 04-097112 A | 3/1992 |
| JP | 08-320435 A | 12/1996 |
| JP | 2002-072093 A | 3/2002 |
| JP | 2002-236254 A | 8/2002 |
| JP | 2005-292348 A | 10/2005 |
| JP | 2006-119193 | 5/2006 |
| JP | 2006-308929 | 11/2006 |
| JP | 2007-171743 | 7/2007 |
| JP | 2009-048012 A | 3/2009 |
| JP | 4840909 | 10/2011 |
| JP | 2012-242739 | 12/2012 |

OTHER PUBLICATIONS

International Search Report, dated Aug. 5, 2014, issued in corresponding International Application No. PCT/JP2014/067913.
Japanese Office Action dated Nov. 30, 2016, issued in corresponding Japanese Patent Application No. 2015-529478.

* cited by examiner

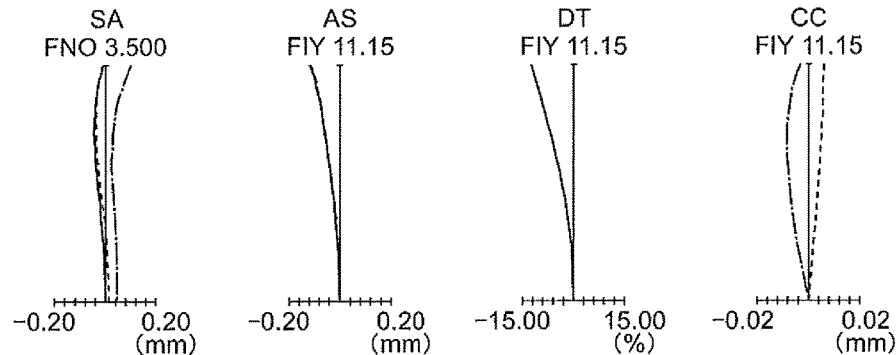
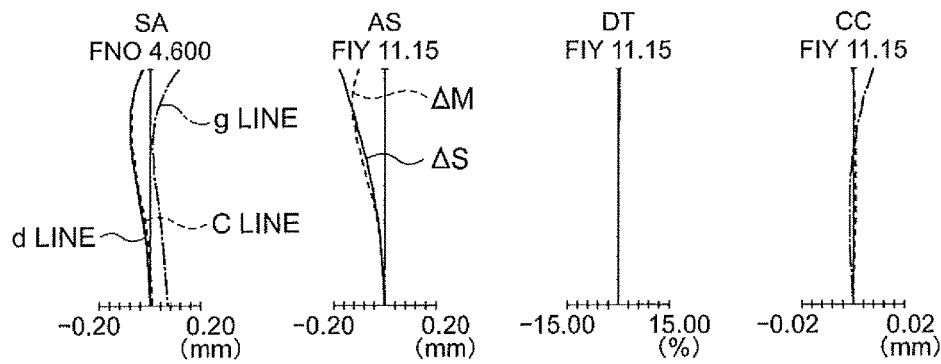
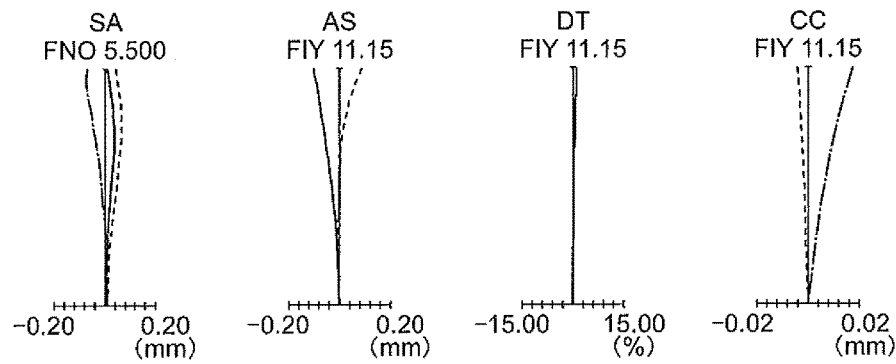

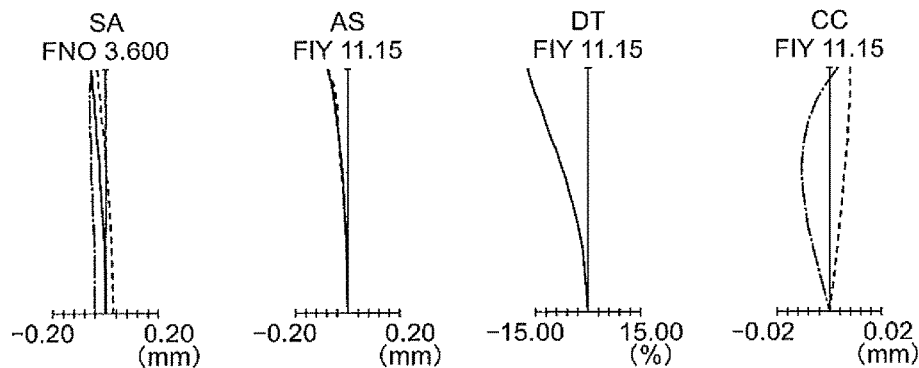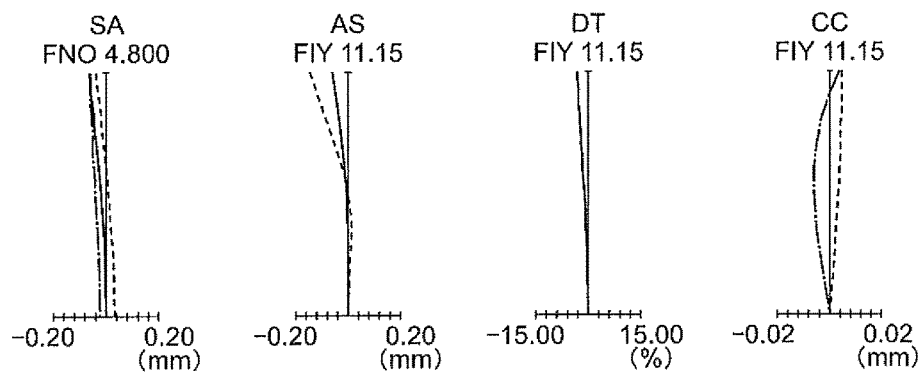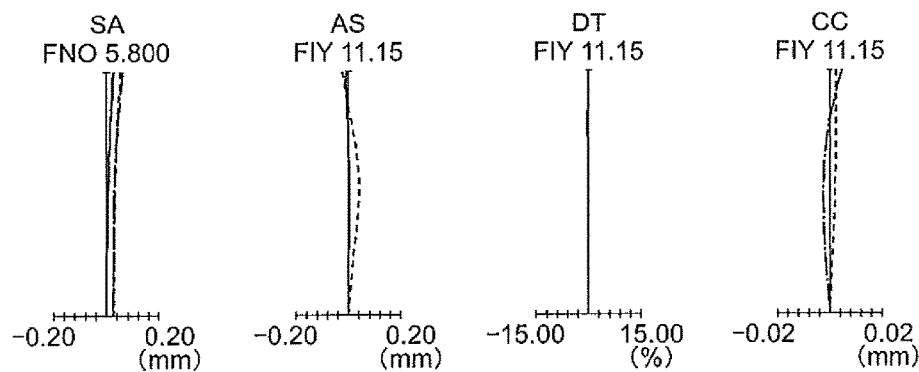

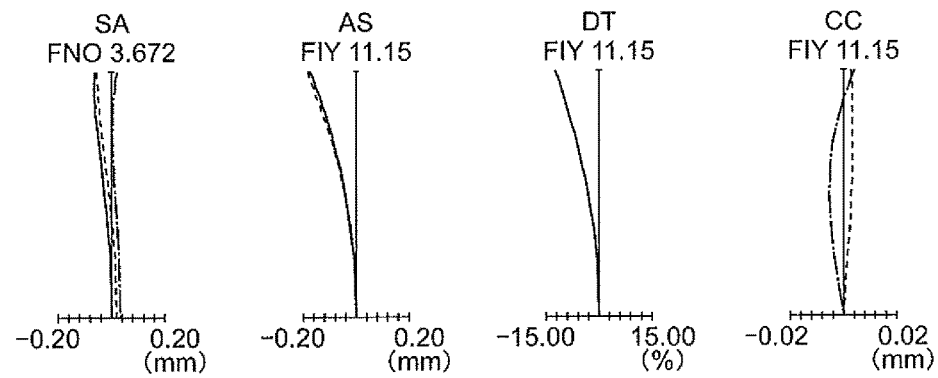
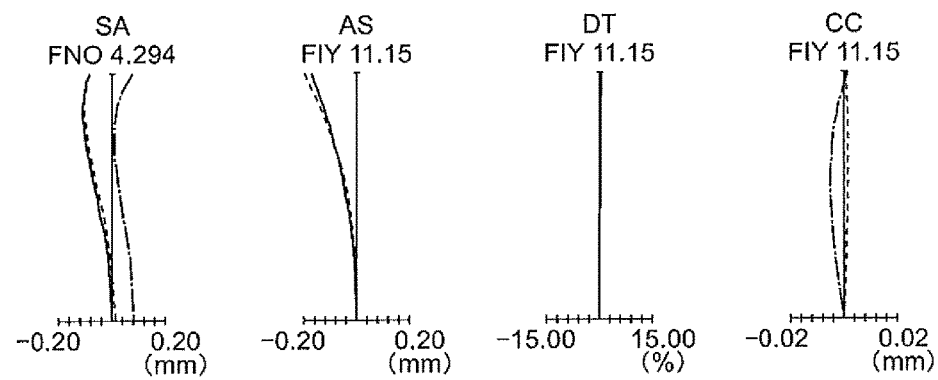
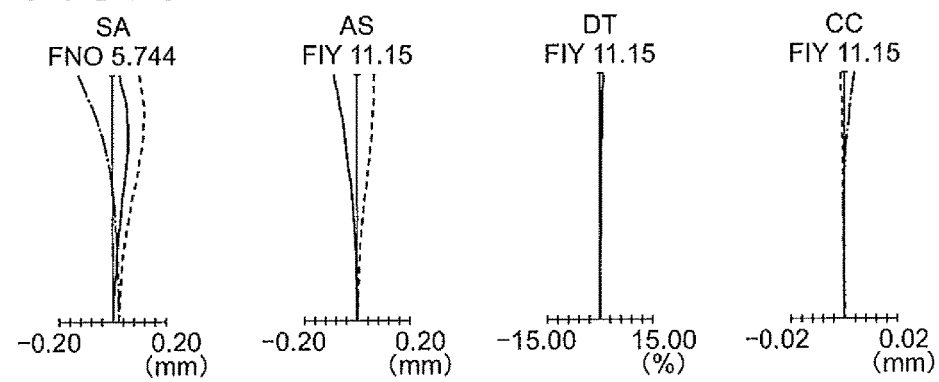

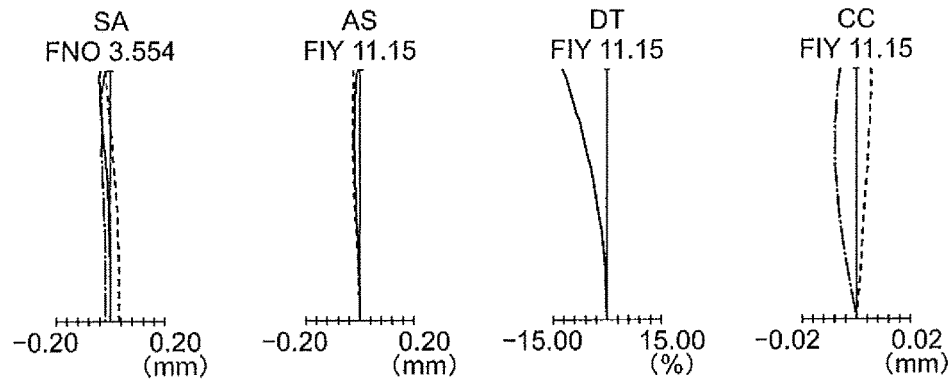
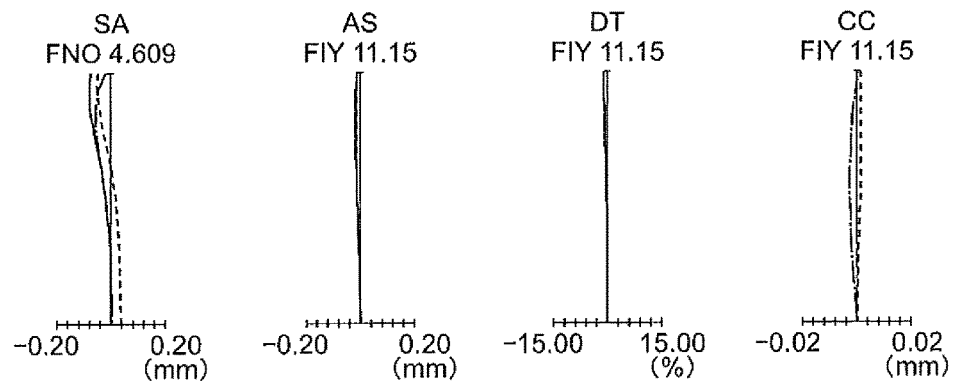
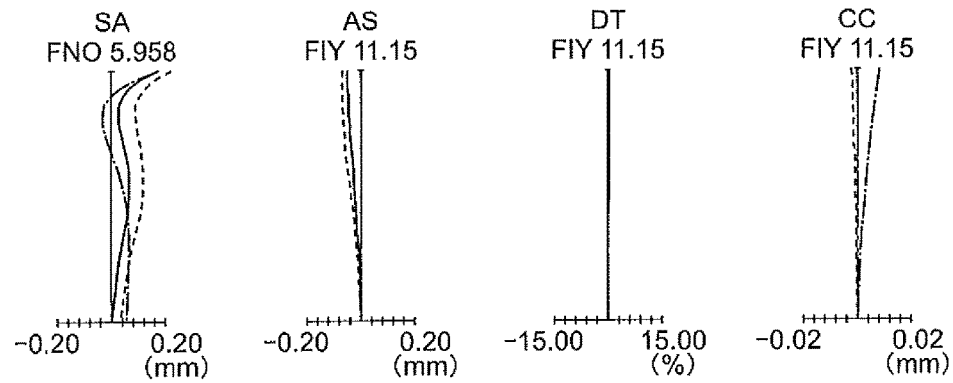

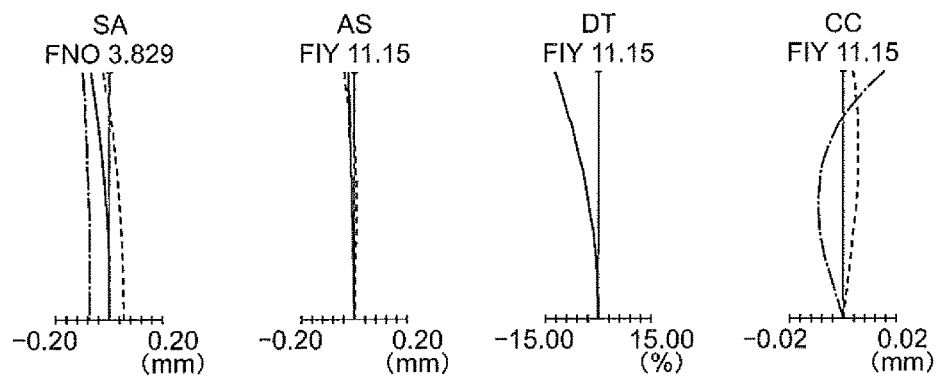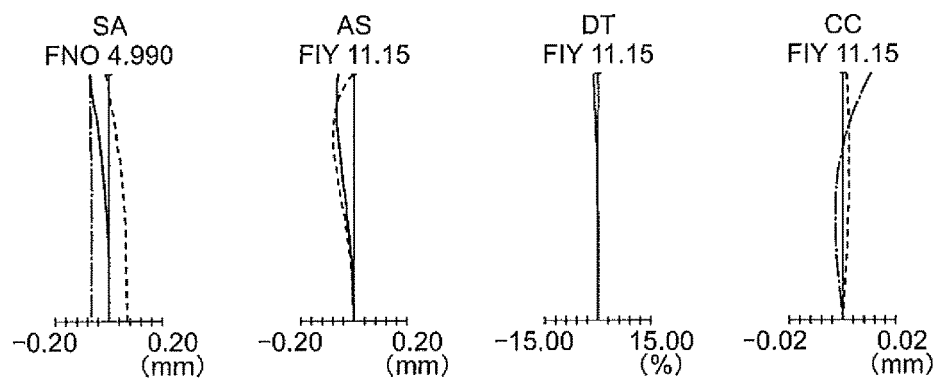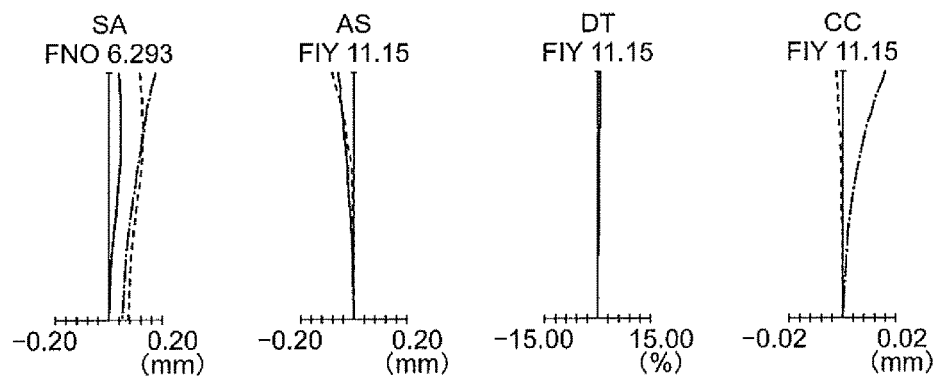

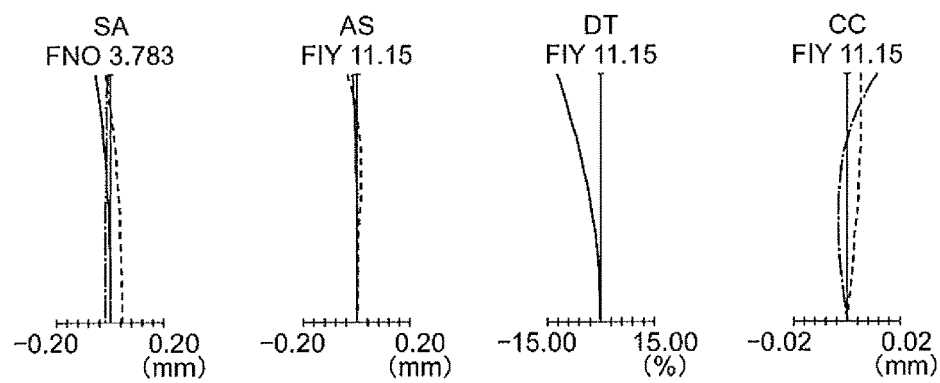
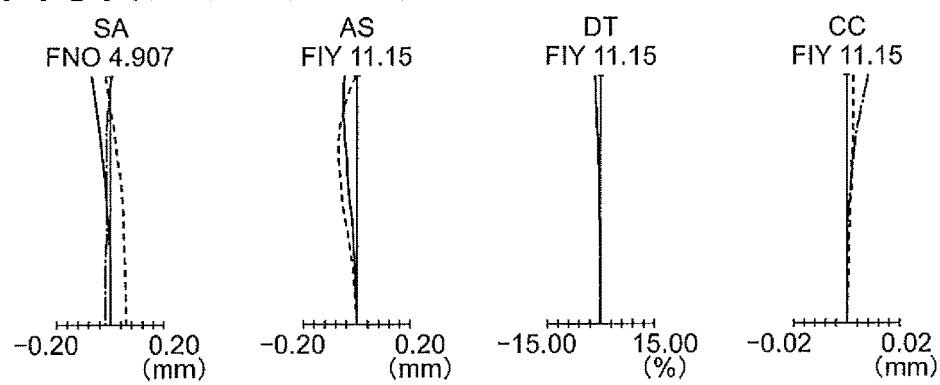
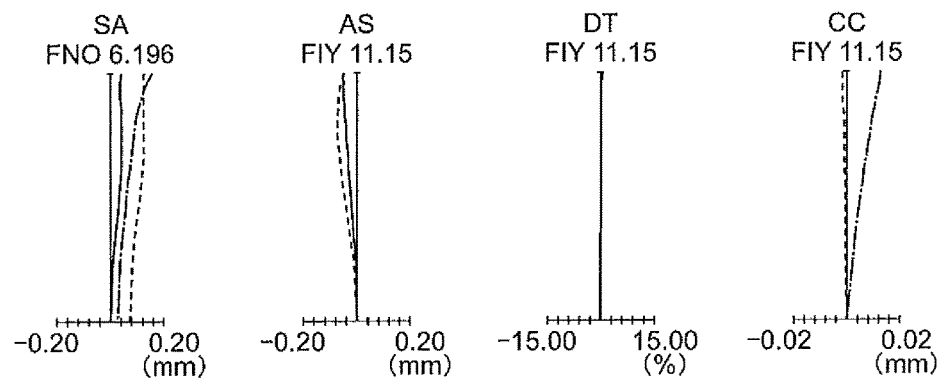

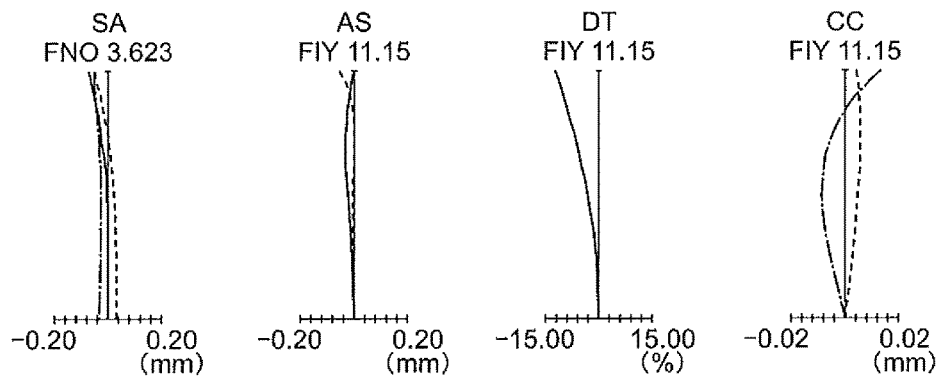
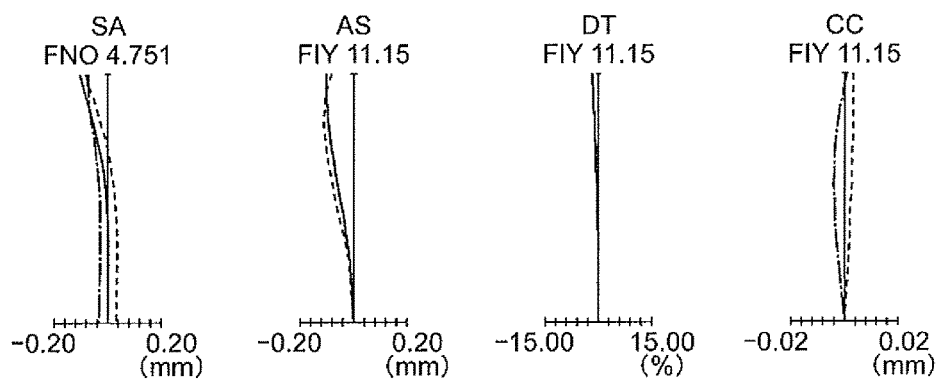
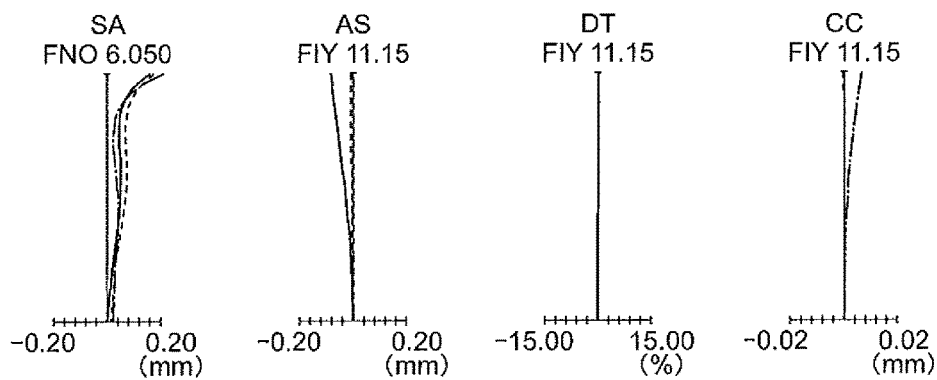

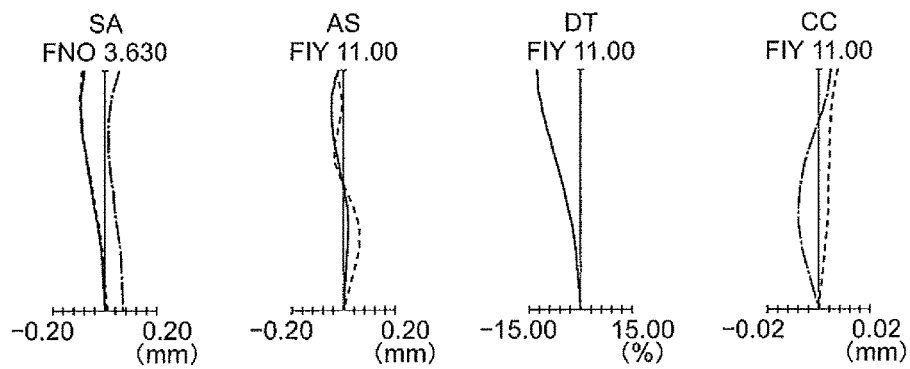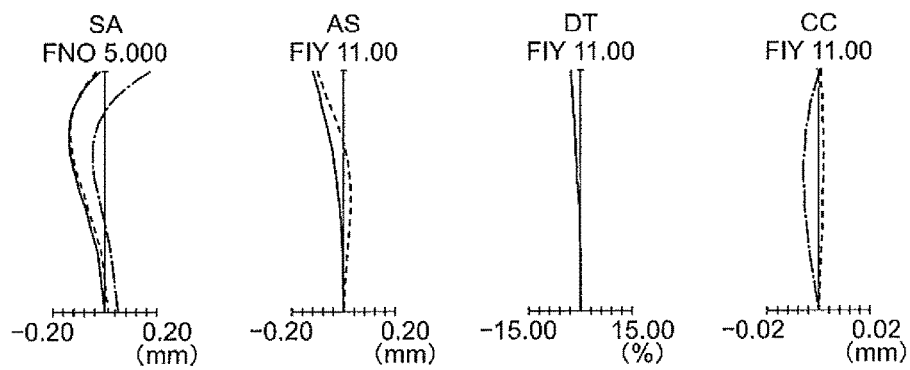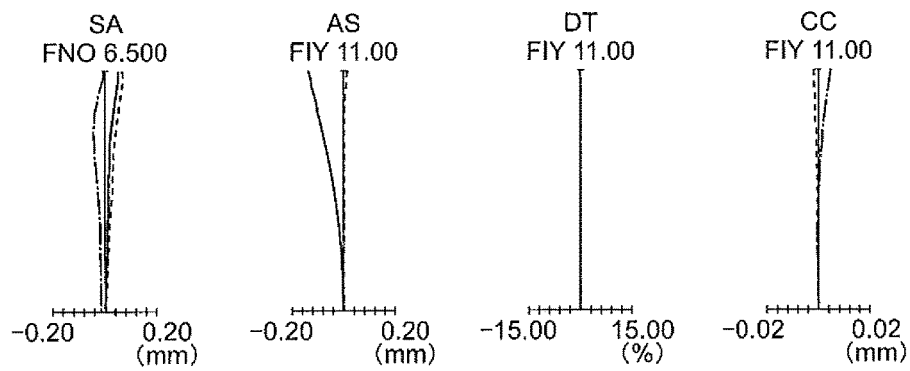

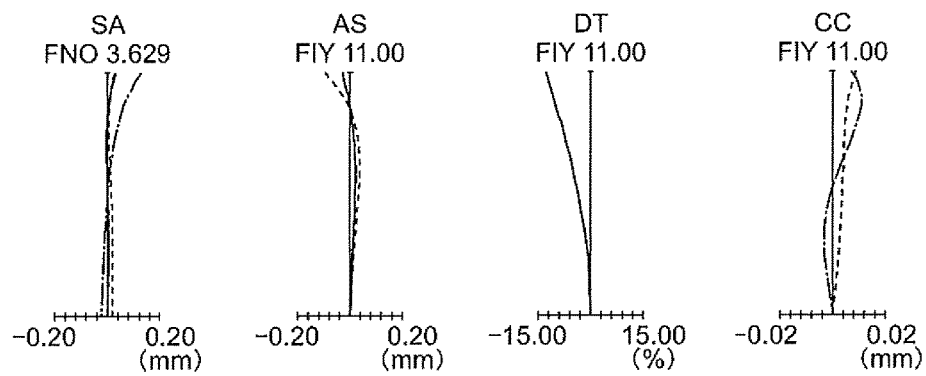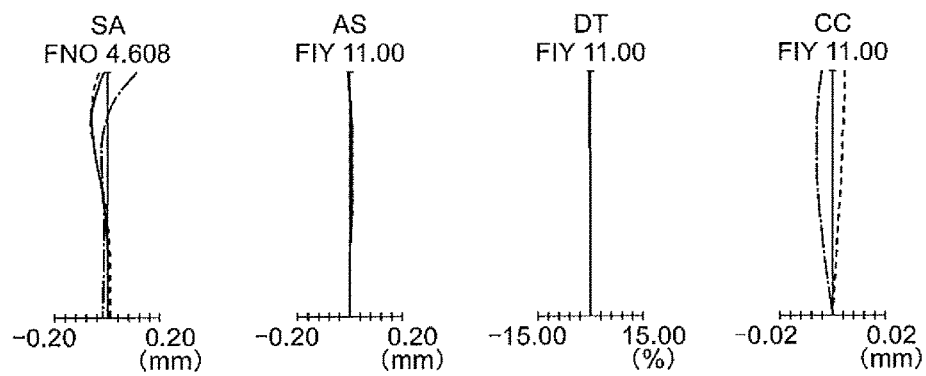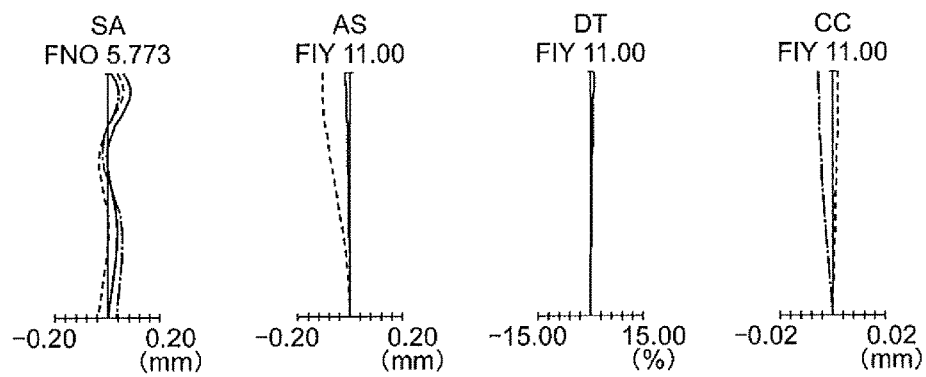

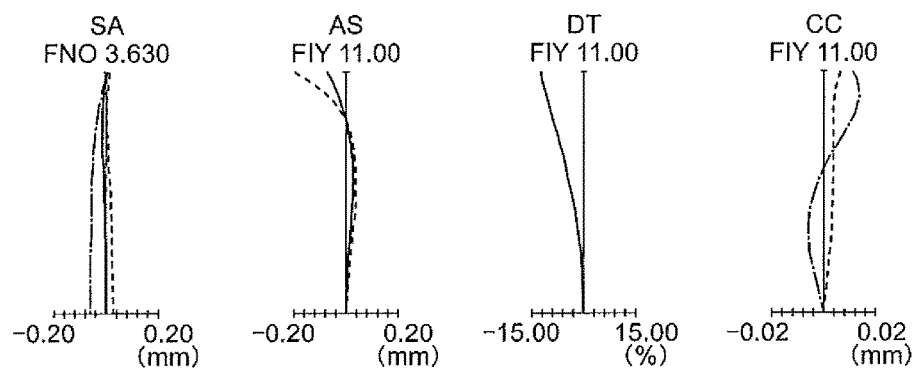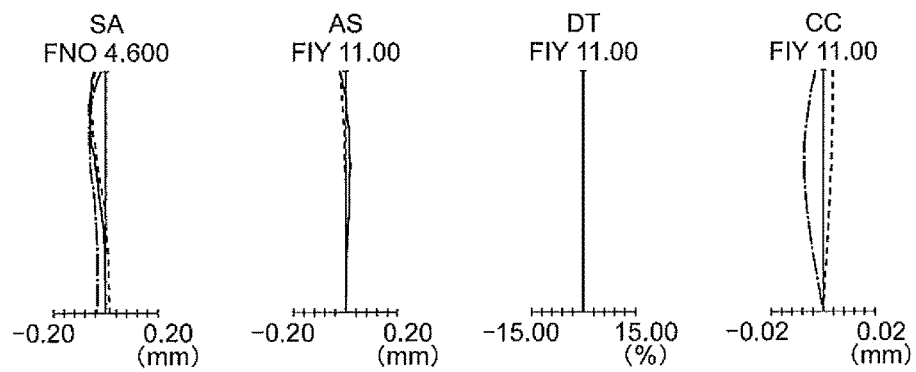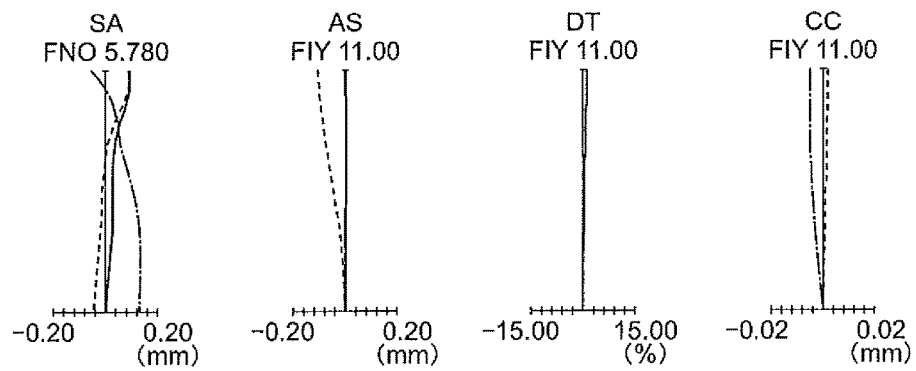

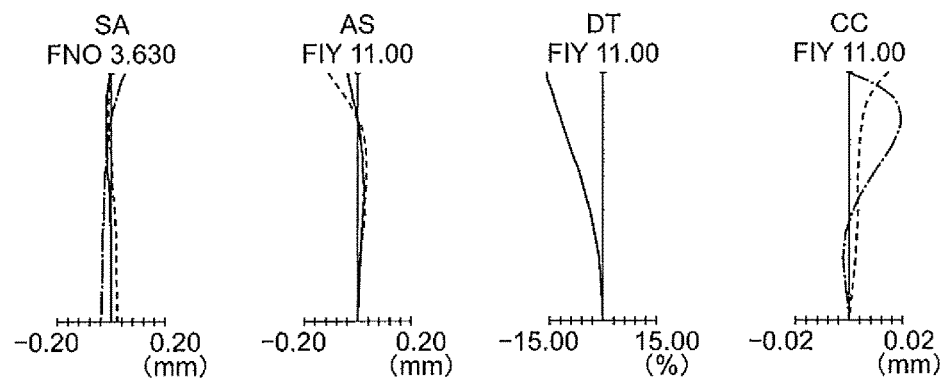
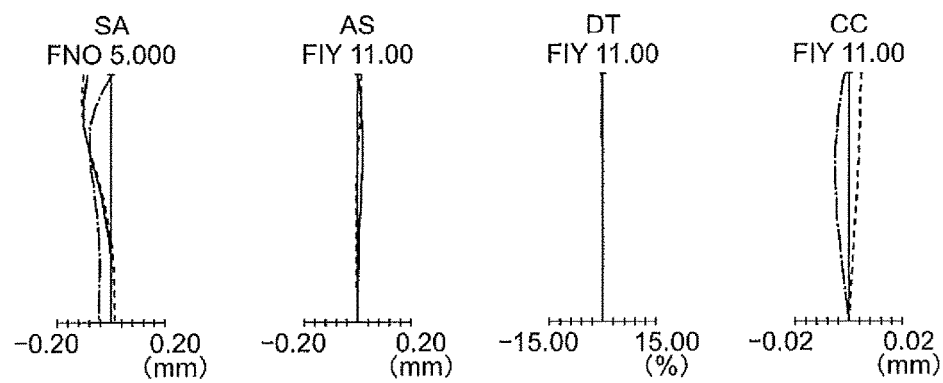
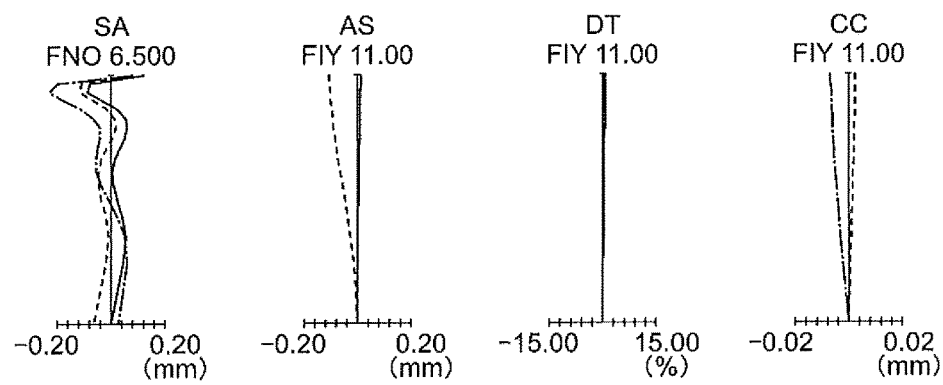

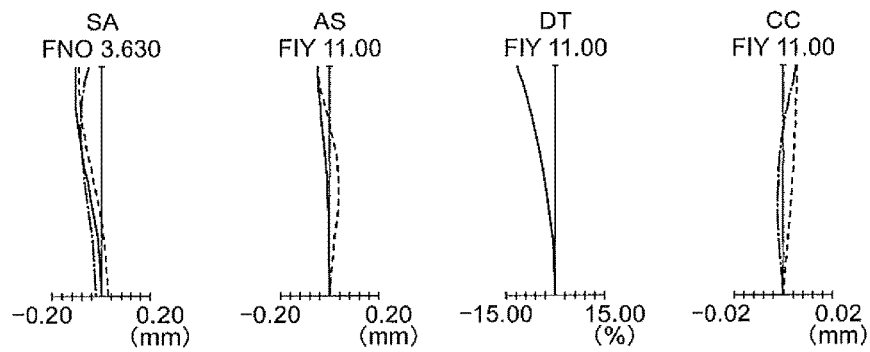
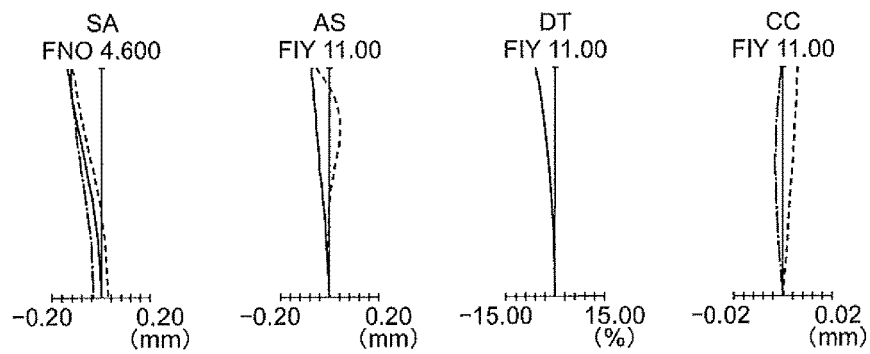
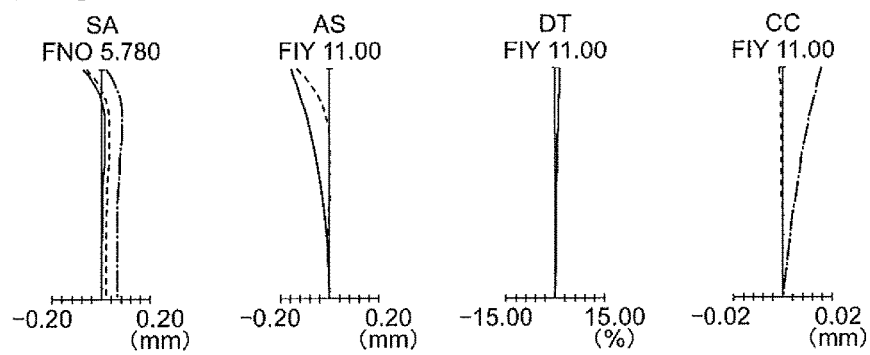

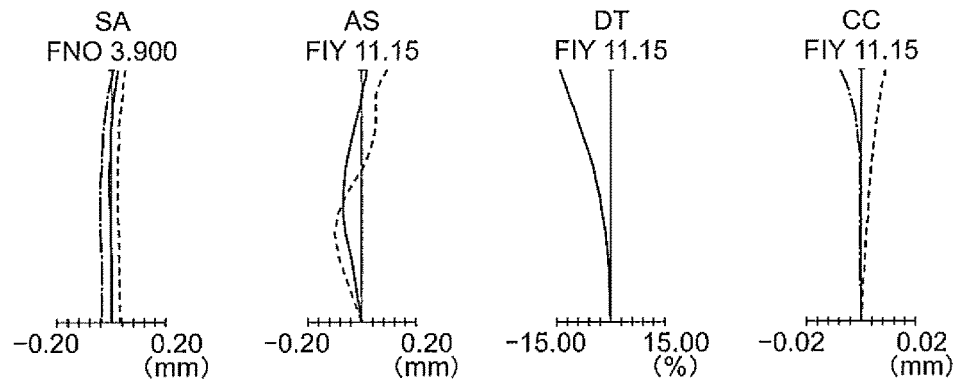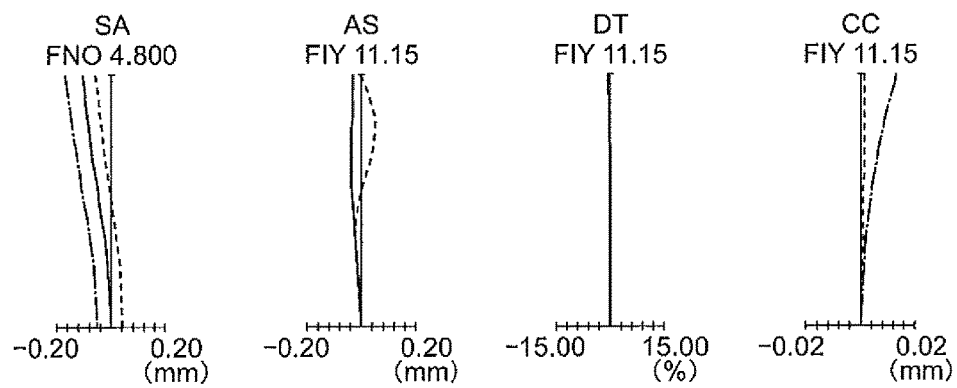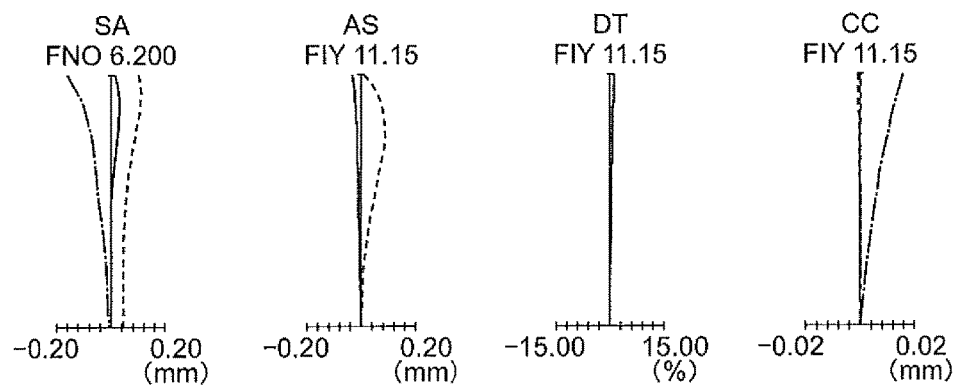

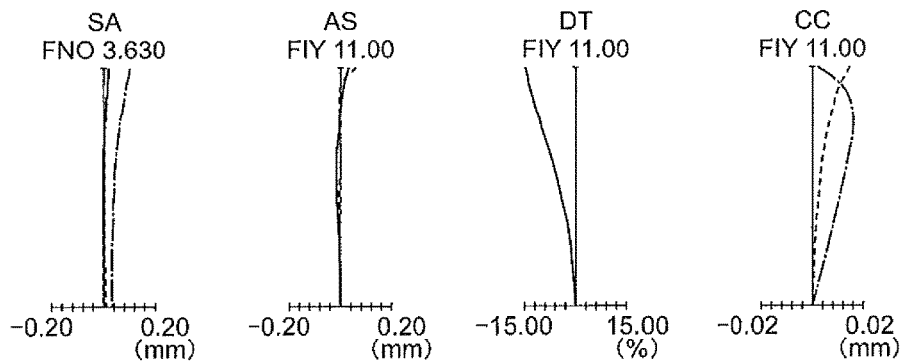
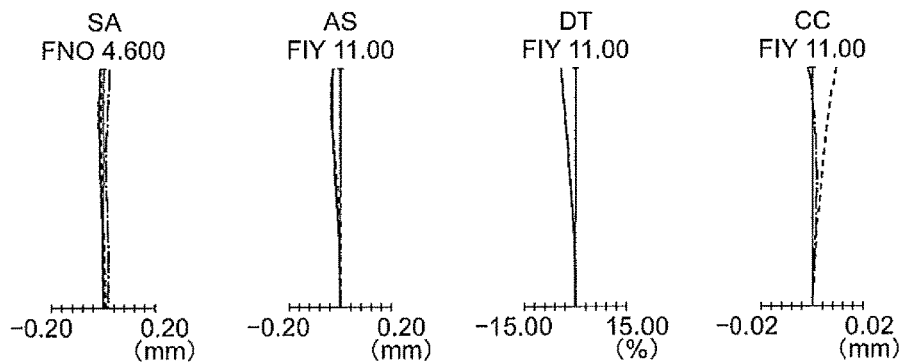
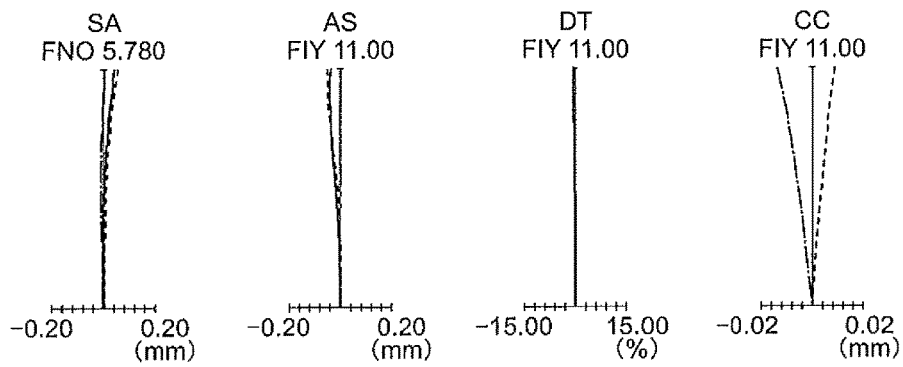

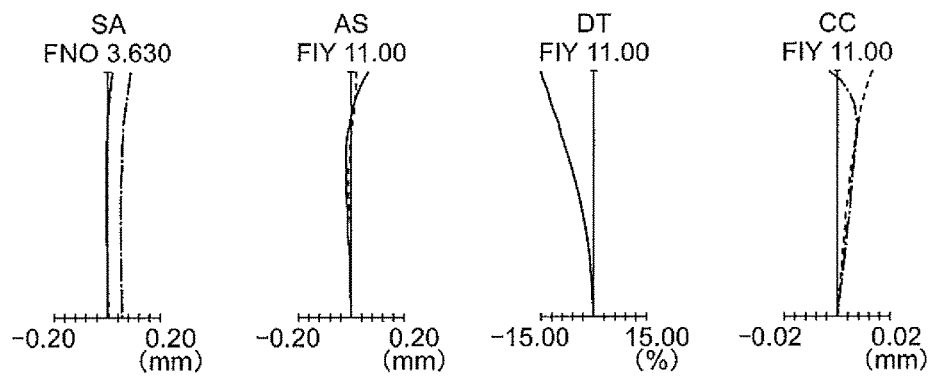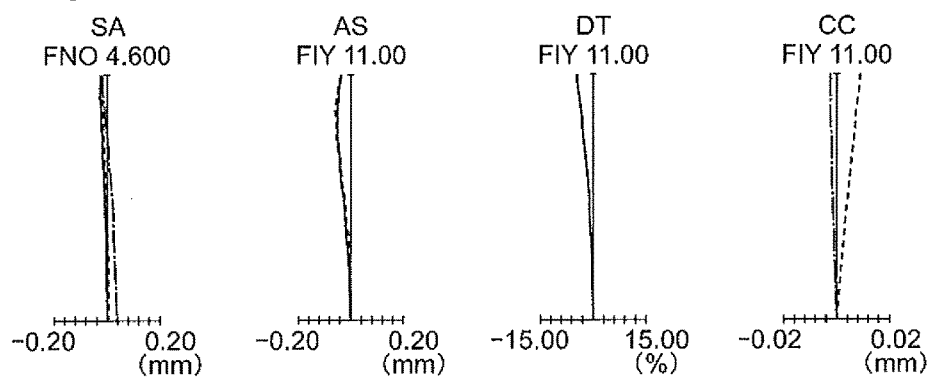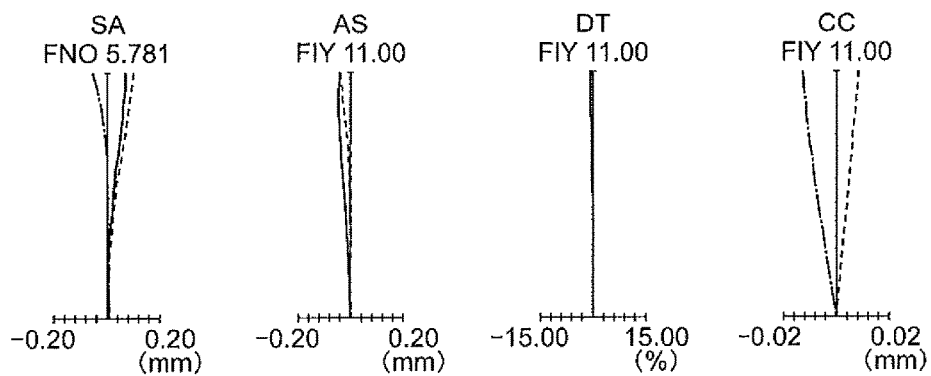

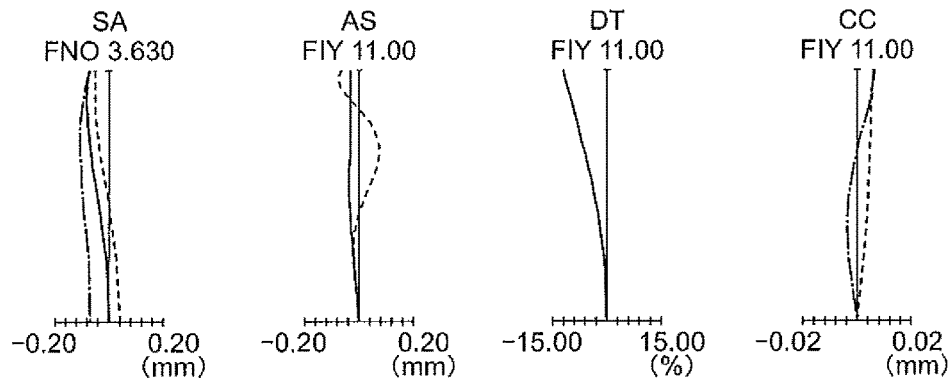
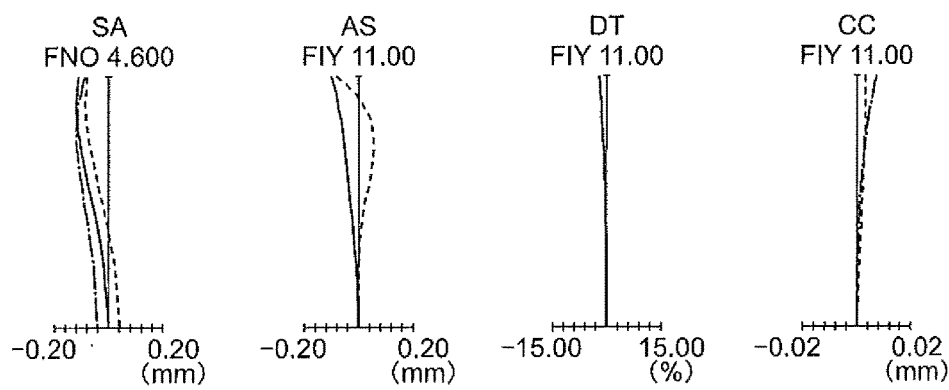
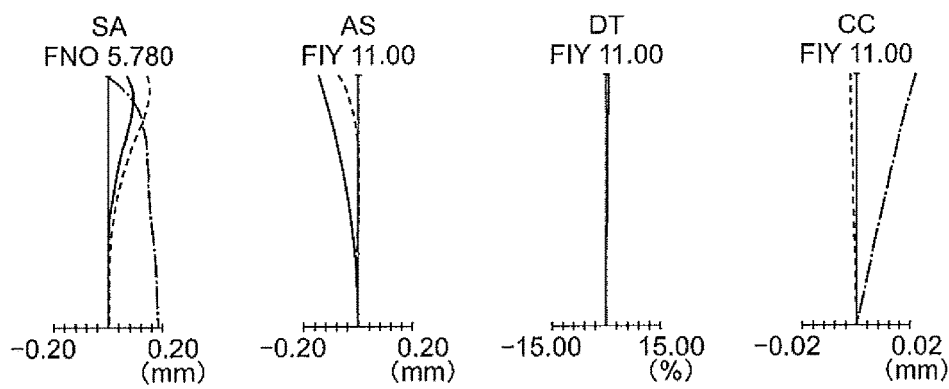

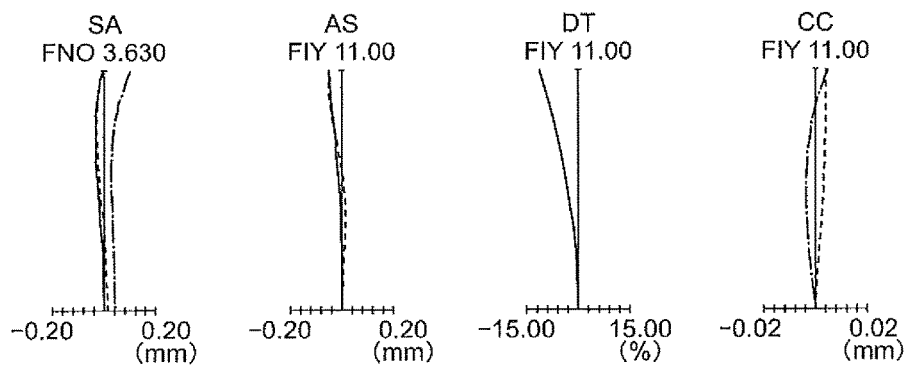
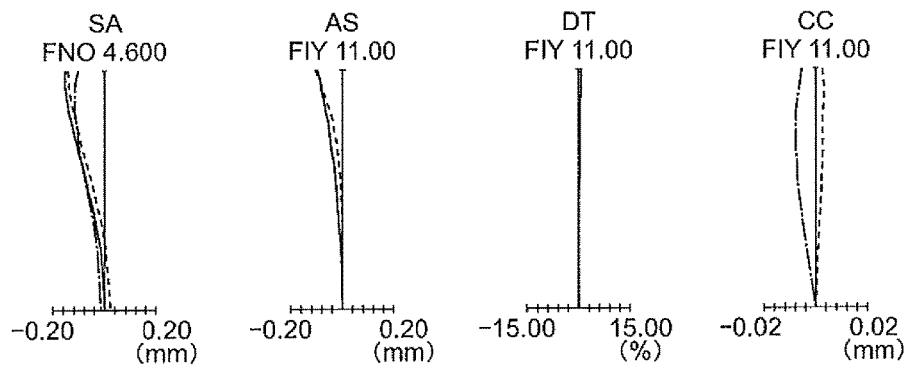
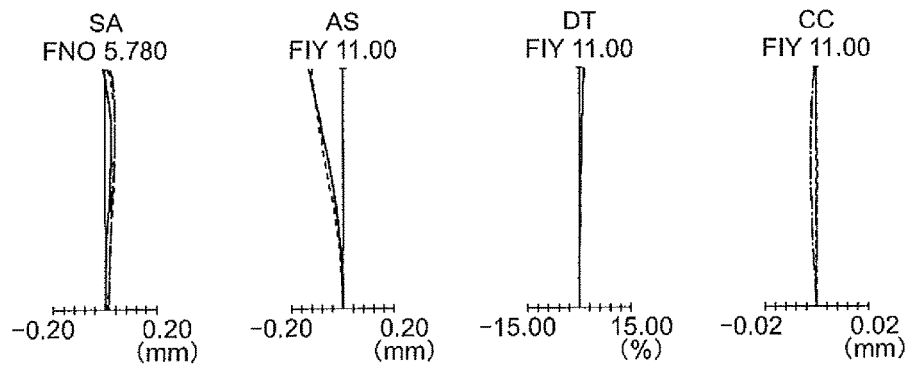

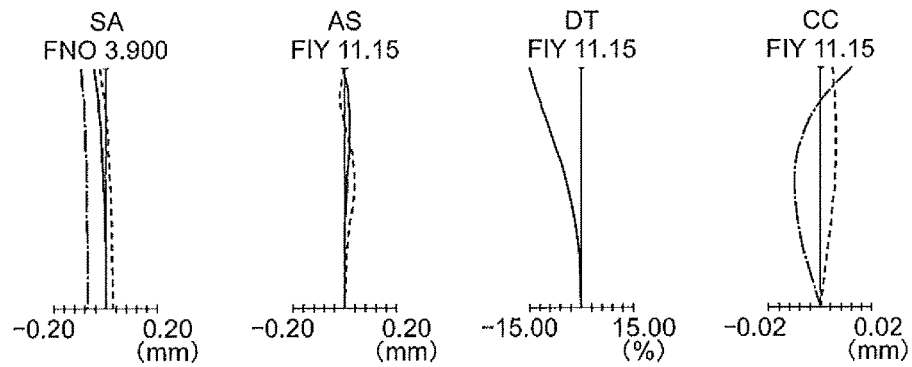
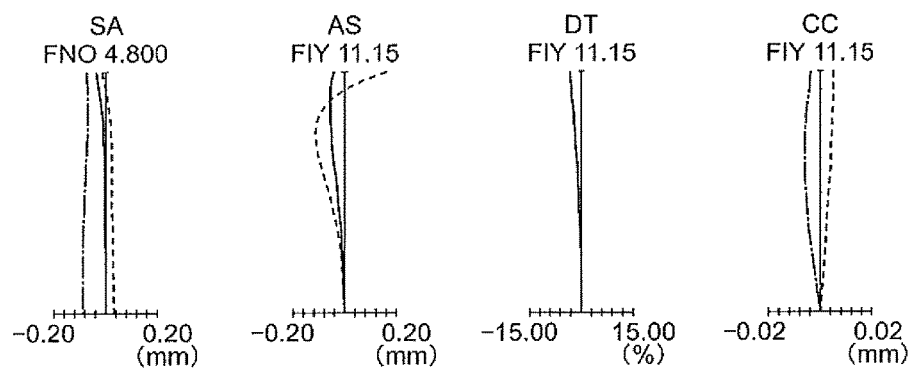
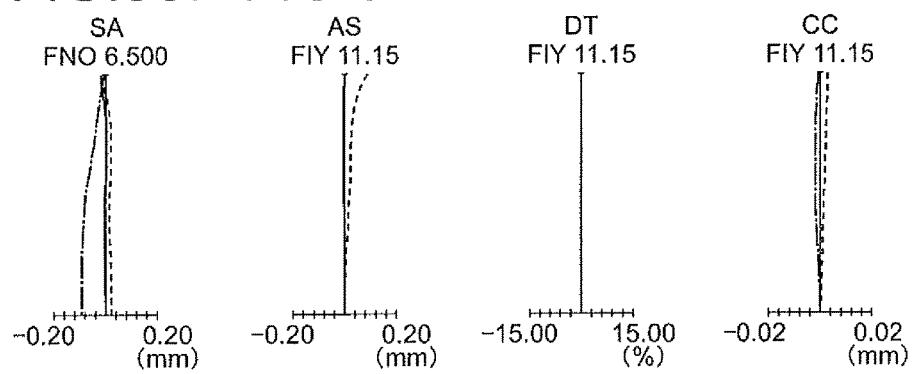

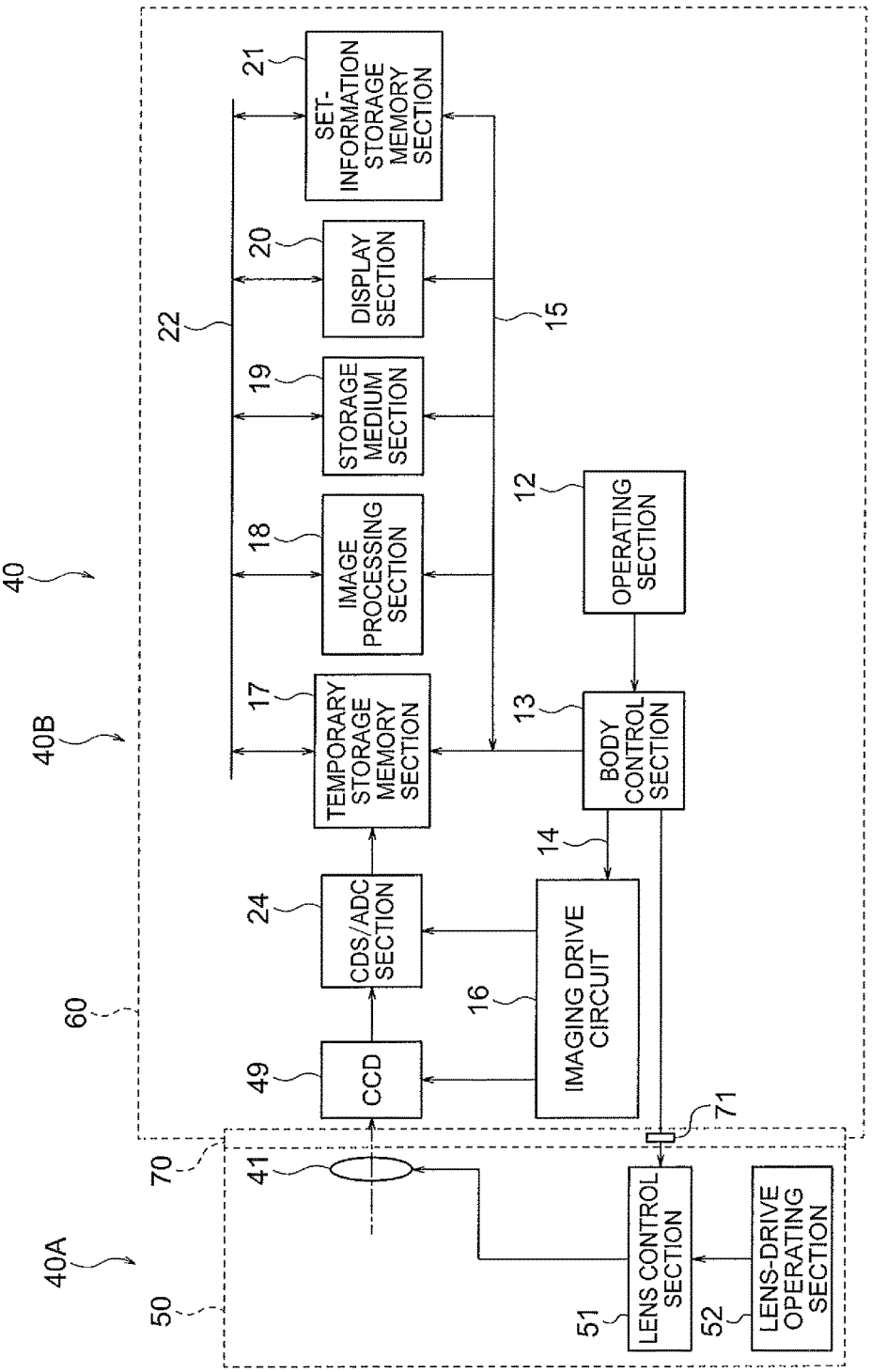

ZOOM LENS AND LENS BARREL AND IMAGE PICKUP APPARATUS USING THE SAME

CROSS-REFERENCE TO RELATED APPLICATION

The present application is a continuation of PCT/JP2014/067913, filed on Jul. 4, 2014 which is based upon and claims the benefit of priority from Japanese Patent Application No. 2013-157775 filed on Jul. 30, 2013; the entire contents of which are incorporated herein by reference.

BACKGROUND OF THE INVENTION

Field of the Invention

The present invention relates to a zoom lens, and a lens barrel and an image pickup apparatus using the same.

Description of the Related Art

A zoom lens to be used in an image pickup apparatus is desired to be a zoom lens which is small-sized and in which, various aberrations are corrected favorably. As a zoom lens which meets such requirements, a zoom lens of a negative-lead type has been known. In the negative-lead type zoom lens, a lens unit having a negative refractive power is disposed nearest to an object.

As a zoom lens which is negative-lead type and which includes three lens units, a zoom lenses disclosed in Japanese Patent Application Laid-open Publication No. Hei 2-238418, and Japanese Patent No. 4840909 are available. The zoom lenses in the Japanese Patent Application Laid-open Publication No. Hei 2-238418 and Japanese Patent No. 4840909 include in order from an object side, a first lens unit having a negative refractive power, a second lens unit having a positive refractive power, and a third lens unit having a negative refractive power.

SUMMARY OF THE INVENTION

A zoom lens according to the present invention comprises in order from an object side, a first lens unit having a negative refractive power,
a second lens unit having a positive refractive power, and
a third lens unit having a negative refractive power, wherein at the time of zooming, a movement of the first lens unit includes at least a movement toward an image side, the second lens unit moves integrally with an aperture stop, and the third lens unit moves toward the object side, and the movement of the first lens unit toward the image side is a movement when the zooming started from a wide angle end, and the movement of the third lens unit toward the object side is a movement at the time of zooming from the wide angle end to a telephoto end, and the first lens unit includes at least a negative lens and a positive lens, and the negative lens is disposed nearest to an object, and the following conditional expressions are satisfied:

$0.75 < (\beta_{2t}/\beta_{2w})/(\beta_{3t}/\beta_{3w}) < 1.38$ $-0.70 < \beta_{2w} < -0.32$ $0.96 < f_2/f_w < 1.80.$ where, $\beta_{2t}$ denotes a lateral magnification of the second lens unit at the telephoto end, $\beta_{2w}$ denotes a lateral magnification of the second lens unit at the wide angle end, $\beta_{3t}$ denotes a lateral magnification of the third lens unit at the telephoto end, and $\beta_{3w}$ denotes a lateral magnification of the third lens unit at the wide angle end, here, each lateral magnification is a lateral magnification at the time of focusing on an infinite object point, and $f_2$ denotes a focal length of the second lens unit, $f_w$ denotes a focal length of the overall zoom lens system at the wide angle end.

A zoom lens according to another aspect of the present invention comprises in order from an object side, a first lens unit having a negative refractive power,
a second lens unit having a positive refractive power, and
a third lens unit having a negative refractive power, wherein at the time of zooming, a movement of the first lens unit includes at least a movement toward an image side, the second lens unit moves integrally with an aperture stop, and the third lens unit moves toward the object side, and the movement of the first lens unit toward the image side is a movement when the zooming started from a wide angle end, and the movement of the third lens unit toward the object side is a movement at the time of zooming from the wide angle end to a telephoto end, and the first lens unit includes at least a negative lens and a positive lens, and the negative lens is disposed nearest to an object, and the third lens unit includes not less than two lenses, and the following conditional expressions are satisfied $0.75 < (\beta_{2t}/\beta_{2w})/(\beta_{3t}/\beta_{3w}) < 2.00$ $0.96 < f_2/f_w < 1.70$ where, $\beta_{2t}$ denotes a lateral magnification of the second lens unit at the telephoto end, $\beta_{2w}$ denotes a lateral magnification of the second lens unit at the wide angle end, $\beta_{3t}$ denotes a lateral magnification of the third lens unit at the telephoto end, and $\beta_{3w}$ denotes a lateral magnification of the third lens unit at the wide angle end, here, each lateral magnification is a lateral magnification at the time of focusing on an infinite object point, and $f_2$ denotes a focal length of the second lens unit, $f_w$ denotes a focal length of the overall zoom lens system at the wide angle end.

Moreover, a zoom lens according to still another aspect of the present invention comprises in order from an object side, a first lens unit having a negative refractive power,
a second lens unit having a positive refractive power, and
a third lens unit having a negative refractive power, wherein at the time of zooming, the first lens unit moves, the second lens unit moves integrally with an aperture stop, and the third lens unit moves toward the object side, and the movement of the third lens unit toward the object side is a movement at the time of zooming from the wide angle end to a telephoto end, and the third lens unit includes one negative lens, and the following conditional expressions are satisfied.

$$0.75<(\beta_{2t}/\beta_{2w})/(\beta_{3t}/\beta_{3w})<1.38$$

$$0.94<f_2/f_w<1.70$$

where, $\beta_{2t}$ denotes a lateral magnification of the second lens unit at the telephoto end, $\beta_{2w}$ denotes a lateral magnification of the second lens unit at the wide angle end, $\beta_{3t}$ denotes a lateral magnification of the third lens unit at the telephoto end, and $\beta_{3w}$ denotes a lateral magnification of the third lens unit at the wide angle end, here, each lateral magnification is a lateral magnification at the time of focusing on an infinite object point, and $f_2$ denotes a focal length of the second lens unit, $f_w$ denotes a focal length of the overall zoom lens system at the wide angle end.

A lens barrel according to the present invention comprises the zoom lens, and a connecting portion for connecting to a casing, wherein an image pickup element which converts an optical image formed by the zoom lens, to an electric signal is disposed in the casing.

Furthermore, an image pickup apparatus according to the present invention comprises the zoom lens, and an image pickup element which converts an optical image formed by the zoom lens, to an electric signal.

BRIEF DESCRIPTION OF THE DRAWINGS

FIG. 1A is a cross-sectional view at a wide angle end, FIG. 1B is a cross-sectional view in an intermediate focal length state, and FIG. 1C is a cross-sectional view at a telephoto end;

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L (hereinafter, 'FIG. 2A to FIG. 2L') are aberration diagrams of the zoom lens according to the example 1 at the time of focusing on an infinite object point;

FIG. 3A is a cross-sectional view at a wide angle end, FIG. 3B is a cross-sectional view in an intermediate focal length state, and FIG. 3C is a cross-sectional view at a telephoto end;

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L (hereinafter, 'FIG. 4A to FIG. 4L') are aberration diagrams of the zoom lens according to the example 2 at the time of focusing on an infinite object point;

FIG. 5A is a cross-sectional view at a wide angle end, FIG. 5B is a cross-sectional view in an intermediate focal length state, and FIG. 5C is a cross-sectional view at a telephoto end;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L (hereinafter, 'FIG. 6A to FIG. 6L') are aberration diagrams of the zoom lens according to the example 3 at the time of focusing on an infinite object point;

FIG. 7A is a cross-sectional view at a wide angle end, FIG. 7B is a cross-sectional view in an intermediate focal length state, and FIG. 7C is a cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L (hereinafter, 'FIG. 8A to FIG. 8L') are aberration diagrams of the zoom lens according to the example 4 at the time of focusing on an infinite object point;

FIG. 9A is a cross-sectional view at a wide angle end, FIG. 9B is a cross-sectional view in an intermediate focal length state, and FIG. 9C is a cross-sectional view at a telephoto end;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L (hereinafter, 'FIG. 10A to FIG. 10L') are aberration diagrams of the zoom lens according to the example 5 at the time of focusing on an infinite object point;

FIG. 11A is a cross-sectional view at a wide angle end, FIG. 11B is a cross-sectional view in an intermediate focal length state, and FIG. 11C is a cross-sectional view at a telephoto end;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L') are aberration diagrams of the zoom lens according to the example 6 at the time of focusing on an infinite object point;

FIG. 13A is a cross-sectional view at a wide angle end; FIG. 13B is a cross-sectional view in an intermediate focal length state, and FIG. 13C is a cross-sectional view at a telephoto end;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L (hereinafter, 'FIG. 14A to FIG. 14L') are aberration diagrams of the zoom lens according to the example 7 at the time of focusing on an infinite object point;

FIG. 15A is a cross-sectional view at a wide angle end, FIG. 15B is a cross-sectional view in an intermediate focal length state, and FIG. 15C is a cross-sectional view at a telephoto end;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L (hereinafter, 'FIG. 16A to FIG. 16L') are aberration diagrams of the zoom lens according to the example 8 at the time of focusing on an infinite object point;

FIG. 17A is a cross-sectional view at a wide angle end, FIG. 17B is a cross-sectional view in an intermediate focal length state, and FIG. 17C is a cross-sectional view at a telephoto end;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L (hereinafter, 'FIG. 18A to FIG. 18L') are aberration diagrams of the zoom lens according to the example 9 at the time of focusing on an infinite object point;

FIG. 19A is a cross-sectional view at a wide angle end, FIG. 19B is a cross-sectional view in an intermediate focal length state, and FIG. 19C is a cross-sectional view at a telephoto end;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L (hereinafter, 'FIG. 20A to FIG. 20L') are aberration diagrams of the zoom lens according to the example 10 at the time of focusing on an infinite object point;

FIG. 21A is a cross-sectional view at a wide angle end, FIG. 21B is a cross-sectional view in an intermediate focal length state, and FIG. 21C is a cross-sectional view at a telephoto end;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L (hereinafter, 'FIG. 22A to FIG. 22L') are aberration diagrams of the zoom lens according to the example 11 at the time of focusing on an infinite object point;

FIG. 23A is a cross-sectional view at a wide angle end, FIG. 23B is a cross-sectional view in an intermediate focal length state, and FIG. 23C is a cross-sectional view at a telephoto end;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L (hereinafter, 'FIG. 24A to FIG. 24L') are aberration diagrams of the zoom lens according to the example 12 at the time of focusing on an infinite object point;

FIG. 25A is a cross-sectional view at a wide angle end, FIG. 25B is a cross-sectional view in an intermediate focal length state, and FIG. 25C is a cross-sectional view at a telephoto end;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L (hereinafter, 'FIG. 26A to FIG. 26L') are aberration diagrams of the zoom lens according to the example 13 at the time of focusing on an infinite object point;

FIG. 27A is a cross-sectional view at a wide angle end, FIG. 27B is a cross-sectional view in an intermediate focal length state, and FIG. 27C is a cross-sectional view at a telephoto end;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L (hereinafter, 'FIG. 28A to FIG. 28L') are aberration diagrams of the zoom lens according to the example 14 at the time of focusing on an infinite object point;

FIG. 29A is a cross-sectional view at a wide angle end, FIG. 29B is a cross-sectional view in an intermediate focal length state, and FIG. 29C is a cross-sectional view at a telephoto end;

FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L (hereinafter, 'FIG. 30A to FIG. 30L') are aberration diagrams of the zoom lens according to the example 15 at the time of focusing on an infinite object point;

FIG. 31A is a cross-sectional view at a wide angle end, FIG. 31B is a cross-sectional view in an intermediate focal length state, and FIG. 31C is a cross-sectional view at a telephoto end;

FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L (hereinafter, 'FIG. 32A to FIG. 32L') are aberration diagrams of the zoom lens according to the example 16 at the time of focusing on an infinite object point;

FIG. 33A is a cross-sectional view at a wide angle end, FIG. 33B is a cross-sectional view in an intermediate focal length state, and FIG. 33C is a cross-sectional view at a telephoto end;

FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L (hereinafter, 'FIG. 34A to FIG. 34L') are aberration diagrams of the zoom lens according to the example 17 at the time of focusing on an infinite object point;

FIG. 35A is a cross-sectional view at a wide angle end, FIG. 35B is a cross-sectional view in an intermediate focal length state, and FIG. 35C is a cross-sectional view at a telephoto end;

FIG. 36A, FIG. 36B, FIG. 36C, FIG. 36D, FIG. 36E, FIG. 36F, FIG. 36G, FIG. 36H, FIG. 36I, FIG. 36J, FIG. 36K, and FIG. 36L (hereinafter, 'FIG. 36A to FIG. 36L') are aberration diagrams of the zoom lens according to the example 18 at the time of focusing on an infinite object point;

FIG. 40 is a diagram showing an internal arrangement of the image pickup apparatus.

DETAILED DESCRIPTION OF THE INVENTION

Figure 1A:
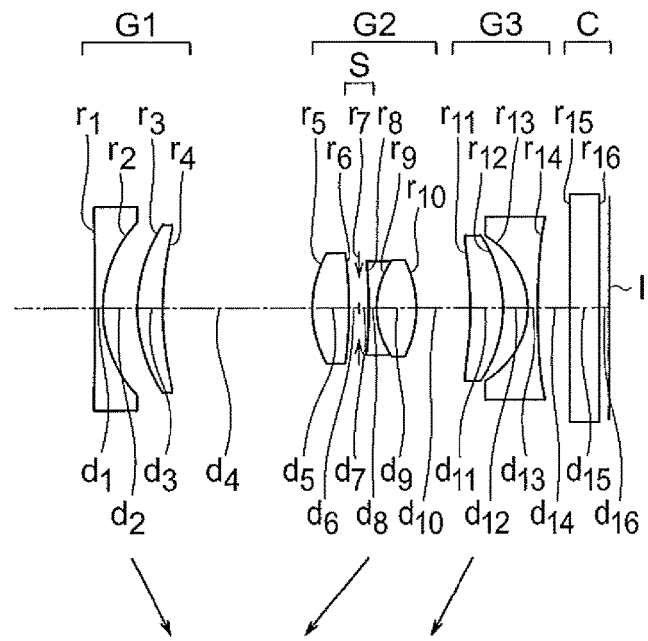
FIG. 1A, FIG. 1B, and FIG. 1C (hereinafter, 'FIG. 1A to FIG. 1C') are cross-sectional views along an optical axis showing an optical arrangement of a zoom lens according to an example 1 at the time of focusing on an infinite object point, where.

Prior to explaining examples, action and effect of embodiments according to certain aspects of the present invention will be described below. An action and effect of the present embodiment will be described specifically by describing concrete examples. However, similar to a case of the examples to be described later, the aspects exemplified thereof are some of the aspects included in the present invention, and there is a large number of variations in these aspects. Therefore, the present invention is not restricted to the aspects that are exemplified.

A zoom lens according to the present embodiment, includes in order from an object side, a first lens unit having a negative refractive power, a second lens unit having a positive refractive power, and a third lens unit having a negative refractive power, and at the time of zooming, the first lens unit moves, the second lens unit moves integrally with an aperture stop, and the third lens unit moves toward the object side, and the movement of the third lens unit toward the object side is a movement at the time of zooming from a wide angle end to a telephoto end, as a basic arrangement.

For making the zoom lens small-sized, it is necessary to shorten an overall length of the zoom lens. When an attempt is made to shorten the overall length of the zoom lens, a refractive power of each lens unit becomes large. In a zoom lens which includes three lens units, as the refractive power of each lens unit is made large, a chromatic aberration of magnification, an astigmatism, and a distortion occur in the first lens unit. When an attempt is made to correct these aberrations in the second lens unit, correction of a spherical aberration and a longitudinal chromatic aberration occurred in the second lens unit becomes difficult.

Therefore, in the basic arrangement, the third lens unit having a negative refractive power is disposed nearest to an image. By disposing the third lens unit nearest to the image, sandwiching the second lens unit, the refractive power becomes negative both on the object side and on the image side. In such manner, in the basic arrangement, since it is possible to make an arrangement of the refractive power symmetrical, it is possible to correct various aberrations favorably.

Concretely, since the correction of the chromatic aberration of magnification, the astigmatism, and the distortion occurred in the first lens unit can be carried out in the third lens unit, it is possible to correct these off-axis aberrations favorably. Furthermore, because of the presence of the third lens unit, it is possible to reduce a load of aberration correction, particularly, a load of correcting an off-axis aberration such as the chromatic aberration of magnification, the astigmatism, and the distortion, on the second lens unit. Therefore, in the second lens unit, it becomes possible to correct mainly the spherical aberration and the longitudinal chromatic aberration. As a result, it is possible to shorten the overall length of the zoom lens while correcting the chromatic aberration of magnification, the astigmatism, the distortion, the spherical aberration, and the longitudinal chromatic aberration.

Moreover, an amount of the chromatic aberration, the distortion, and the astigmatism occurring at the time of zooming changes. Therefore, by moving each lens unit, it is possible to correct these aberrations favorably, and also to shorten the overall length of the zoom lens.

Here, at the time of zooming, the second lens unit moves integrally with the aperture stop. By making such arrangement, it is possible to make a height of a light ray that passes through the second lens unit low at all times. Therefore, it is possible to suppress an occurrence of various aberrations in the second lens unit.

Moreover, at the time of zooming, by moving the third lens unit toward the object side, it is possible to impart a zooming effect also to the third lens unit. Accordingly, it is possible to reduce a load of zooming on the second lens unit. In other words, it is possible to reduce an amount of movement of the second lens unit. As a result, it is possible to shorten the overall length of the zoom lens. It is preferable that the movement of the third lens unit toward the object side is a movement at the time of zooming from the wide angle end to the telephoto end.

Moreover, it is preferable that the movement of the third lens unit toward the object side is a movement when the zooming started from the wide angle end. In other words, in the zooming with the wide angle end as a starting point, as the zooming starts, the third lens unit starts moving from a position at the wide angle end toward the object side. When such an arrangement is made, at the telephoto end, the height of an axial light ray passing through the third lens unit becomes higher than the height at the wide angle end. Therefore, when the spherical aberration and the longitudinal aberration are corrected favorably at the telephoto end, the spherical aberration and the longitudinal aberration are corrected favorably even at the wide angle end at which the height of the axial light ray is low. By moving the third lens unit as aforementioned, it is possible to correct the spherical aberration and the longitudinal chromatic aberration favorably at the telephoto end without the spherical aberration and the longitudinal chromatic aberration at the wide angle end being deteriorated.

Moreover, the zoom lens according to the present embodiment has the aforementioned basic arrangement as well as an arrangement described below, and predetermined conditional expressions are satisfied.

A zoom lens according to a first embodiment has the aforementioned basic arrangement, and in the zoom lens according to the first embodiment, at the time of zooming, a movement of the first lens unit includes at least a movement toward an image side, and the movement of the first lens unit toward the image side is a movement when the zooming started from a wide angle end, and the first lens unit includes at least a negative lens and a positive lens, and the negative lens is disposed nearest to an object, and the following conditional expressions (1), (2), and (3) are satisfied:

$$0.75 < (\beta_2/\beta_{2w})/(\beta_3/\beta_{3w}) < 1.38 \tag{1}$$

$$-0.70 < \beta_{2w} < -0.32 \tag{2}$$

$$0.96 < f_2/f_w < 1.80 \tag{3}$$

where, $\beta_{2t}$ denotes a lateral magnification of the second lens unit at the telephoto end, $\beta_{2w}$ denotes a lateral magnification of the second lens unit at the wide angle end, $\beta_{3t}$ denotes a lateral magnification of the third lens unit at the telephoto end, and $\beta_{3w}$ denotes a lateral magnification of the third lens unit at the wide angle end, here, each lateral magnification is a lateral magnification at the time of focusing on an infinite object point, and $f_2$ denotes a focal length of the second lens unit, and $f_w$ denotes a focal length of the overall zoom lens system at the wide angle end.

In the zoom lens according to the first embodiment, the first lens unit includes at least the negative lens and the positive lens, and the negative lens is disposed nearest to the object.

When an arrangement is made such that the first lens unit includes at least the negative lens and the positive lens, by the negative lens and the positive lens, it is possible to suppress an occurrence of the astigmatism and the chromatic aberration of magnification in the first lens unit. Moreover, by disposing the negative lens nearest to the object in the first lens unit, it is possible to position an entrance pupil further on the object side. Accordingly, since the height of a light ray that passes through the first lens unit becomes low, it is possible to make small a diameter of lenses in the first lens unit. As a result, it is possible to make an optical system small-sized.

Moreover, in the zoom lens according to the present embodiment, at the time of zooming, the movement of the first lens unit includes at least the movement toward the image side, and the movement of the first lens unit toward the image side is a movement when the zooming started from the wide angle end.

At the time of zooming, the movement of the first lens unit includes at least the movement toward the image side. The movement of the first lens unit at the time of zooming is the movement when the zooming started from the wide angle end. Therefore, in the zooming with the wide angle end as the starting point, as the zooming starts, the first lens unit starts moving toward the image from the position at the wide angle end. In such manner, when the zooming started from the wide angle end, as the first lens unit moves from the position at the wide angle end toward the image, it is possible to bring an image point of the first lens unit (an image of the object formed in the first lens unit) closer to the second lens unit. Therefore, it is possible to impart a zooming effect to the second lens unit even while suppressing an increase in an amount of movement of the second lens unit. Moreover, since it is possible to suppress the increase in the amount of movement of the second lens unit, it is possible to suppress a fluctuation in the spherical aberration and the longitudinal chromatic aberration in the second lens unit. As a movement of the first lens unit after having moved toward the image side, there is a movement toward the image side and a movement toward the object side.

Moreover, in the zoom lens according to the first embodiment, conditional expressions (1), (2), and (3) are satisfied. By satisfying conditional expressions (1), (2), and (3), it is possible to correct various aberrations favorably, as well as to shorten the overall length of the zoom lens.

Conditional expression (1) is a conditional expression related to a ratio of a zooming ratio of the second lens unit and a zooming ratio of the third lens unit.

By making so as not to fall below a lower limit value of conditional expression (1), it is possible to make the zooming ratio of the second lens unit large to some extent. Moreover, by the second lens unit having a zooming ratio of an appropriate magnitude, it is possible to suppress an increase in the zooming ratio of the third lens unit. Accordingly, it is possible to suppress an increase in the lateral magnification of the third lens unit at the telephoto end. Accordingly, it is possible to suppress an increase in the lateral magnification of the third lens unit at the telephoto end. Therefore, it is possible to suppress an increase in a distance between the third lens unit at the telephoto end and an image plane (image position). As a result, it is possible to shorten the overall length of the zoom lens at the telephoto end. Moreover, it is possible to suppress an occurrence of the astigmatism and the chromatic aberration of magnification.

By making so as not to exceed an upper limit value of conditional expression (1), it is possible to suppress an increase in the zooming ratio of the second lens unit. Accordingly, it is possible to impart a zooming ratio of an appropriate magnitude to the third lens unit. By the third lens unit having the zooming ratio of the appropriate magnitude, it is possible to correct the spherical aberration and the longitudinal chromatic aberration favorably. Moreover, since it is possible to suppress the increase in the amount of movement of the second lens unit, it is possible to shorten the overall length of the zoom lens.

Conditional expression (2) is a conditional expression related to the lateral magnification of the second lens unit at the wide angle end.

By making so as not to fall below a lower limit value of conditional expression (2), it is possible to make an absolute value of the lateral magnification of the second lens unit at the wide angle end small. Accordingly, it is possible to widen adequately a distance between the first lens unit and the second lens unit at wide angle end. As it is possible to widen the distance between the first lens unit and the second lens unit, it is possible to suppress an increase in the height of an off-axis light ray in the second lens unit. As a result, it is possible to correct the chromatic aberration of magnification and the astigmatism favorably.

By making so as not to exceed an upper limit value of conditional expression (2), it is possible to suppress an increase in the distance between the first lens unit and the second lens unit at the wide angle end. As a result, it is possible to shorten the overall length of the zoom lens. Moreover, since it is possible to suppress an increase in the height of an axial light ray in the second lens unit, it is possible to suppress an occurrence of the spherical aberration.

Conditional expression (3) is a conditional expression related to a ratio of the focal length of the second lens unit and the focal length of the overall zoom lens system at the wide angle end.

By making so as not to fall below a lower limit value of conditional expression (3), it is possible to make the focal length of the second lens unit adequately long (to make the refractive power small). As a result, it is possible to suppress an occurrence of the spherical aberration and the longitudinal chromatic aberration at the telephoto end.

By making so as not to exceed an upper limit value of conditional expression (3), it is possible to make the focal length of the second lens unit adequately short (make the refractive power large). Accordingly, it is possible to suppress an increase in a distance between the second lens unit and the image plane, and moreover, it is possible to suppress an increase in the amount of movement of the second lens unit at the time of zooming. As a result, it is possible to shorten the overall length of the zoom lens at the telephoto end.

It is preferable that the following conditional expression (1') is satisfied instead of conditional expression (1).

$$0.85<(\beta_{2t}/\beta_{2w})/(\beta_{3t}/\beta_{3w})<1.37 \quad (1')$$

Furthermore, it is more preferable that the following conditional expression (1") is satisfied instead of conditional expression (1).

$$0.95<(\beta_{2t}/\beta_{2w})/(\beta_{3t}/\beta_{3w})<1.37 \quad (1'')$$

Moreover, it is preferable that the following conditional expression (2') is satisfied instead of conditional expression (2).

$$-0.65<\beta_{2w}<-0.33 \quad (2')$$

Furthermore, it is more preferable that the following conditional expression (2") is satisfied instead of conditional expression (2).

$$-0.56<\beta_{2w}<-0.33 \quad (2'')$$

Moreover, it is preferable that the following conditional expression (3') is satisfied instead of conditional expression (3).

$$0.98<f_2/f_w \leq 1.70 \quad (3')$$

Furthermore, it is more preferable that the following conditional expression (3") is satisfied instead of conditional expression (3).

$$1.00<f_2/f_w<1.60 \quad (3'')$$

A zoom lens according to a second embodiment of the present invention has the aforementioned basic arrangement, and in the zoom lens according to the second embodiment, at the time of zooming, movement of the first lens unit includes at least a movement toward an image side, and the movement of the first lens unit toward the image side is a movement when the zooming started from a wide angle end, and the first lens unit includes at least a negative lens and a positive lens, and the negative lens is disposed nearest to an object, and the third lens unit includes not less than two lenses, and the following conditional expressions (1-1) and (3-1) are satisfied:

$$0.75<(\beta_{2t}/\beta_{2w})/(\beta_{3t}/\beta_{3w})<2.00 \quad (1-1)$$

$$0.96<f_2/f_w<1.70 \quad (3-1)$$

where, $\beta_{2t}$ denotes a lateral magnification of the second lens unit at the telephoto end, $\beta_{2w}$ denotes a lateral magnification of the second lens unit at the wide angle end, $\beta_{3t}$ denotes a lateral magnification of the third lens unit at the telephoto end, and $\beta_{3w}$ denotes a lateral magnification of the third lens unit at the wide angle end, here, each lateral magnification is a lateral magnification at the time of focusing on an infinite object point, $f_2$ denotes a focal length of the second lens unit, and $f_w$ denotes a focal length of the overall zoom lens system at the wide angle end.

In the zoom lens according to the second embodiment, the third lens unit includes not less than two lenses. By making such an arrangement, it is possible to suppress an occurrence of the astigmatism and the chromatic aberration of magnification in the third lens unit.

In the zoom lens according to the second embodiment, the first lens unit includes at least the negative lens and the positive lens, and the negative lens is disposed nearest to the object, and at the time of zooming, movement of the first lens unit includes at least the movement toward the image side, and the movement of the first lens unit at the time of zooming is the movement when zooming started from the wide angle end. This arrangement is same as the arrangement in the zoom lens according to the first embodiment. Moreover, description of a technical significance of this arrangement has already been made in the description of the zoom lens according to the first embodiment. Therefore, the description thereof is omitted here.

Moreover, technical significance of conditional expression (1-1) and conditional expression (3-1) is same as the technical significance of conditional expression (1) and conditional expression (3) respectively. Description of the technical significance of conditional expression (1) and conditional expression (3) has been made in the description of the zoom lens according to the first embodiment. Therefore, the description thereof is omitted here.

It is preferable that the following conditional expression (1-1') is satisfied instead of conditional expression (1-1).

$$0.85<(\beta_{2t}/\beta_{2w})/(\beta_{3t}/\beta_{3w})<1.70 \quad (1-1')$$

Furthermore, it is more preferable that the following conditional expression (1-1") is satisfied instead of conditional expression (1-1).

$$0.95<(\beta_{2t}/\beta_{2w})/(\beta_{3t}/\beta_{3w})<1.40 \quad (1-1'')$$

It is preferable that the following conditional expression (3-1') is satisfied instead of conditional expression (3-1).

$$0.98<f_2/f_w<1.50 \quad (3-1')$$

Furthermore, it is more preferable that the following conditional expression (3-1") is satisfied instead of conditional expression (3-1).

$$1.00<f_2/f_w<1.40 \quad (3-1'')$$

A zoom lens according to a third embodiment of the present invention has the aforementioned basic arrangement, and in the zoom lens according to the third embodiment, the third lens unit includes one negative lens, and the following conditional expressions (1) and (3-2) are satisfied:

$$0.75<(\beta_{2t}/\beta_{2w})/(\beta_{3t}/\beta_{3w})<1.38 \quad (1)$$

$$0.94<f_2/f_w<1.70 \quad (3-2)$$

where, $\beta_{2t}$ denotes a lateral magnification of the second lens unit at the telephoto end, $\beta_{2w}$ denotes a lateral magnification of the second lens unit at the wide angle end, $\beta_{3t}$ denotes a lateral magnification of the third lens unit at the telephoto end, and $\beta_{3w}$ denotes a lateral magnification of the third lens unit at the wide angle end, here, each lateral magnification is a lateral magnification at the time of focusing on an infinite object point, $f_2$ denotes a focal length of the second lens unit, and $f_w$ denotes a focal length of the overall zoom lens system at the wide angle end.

In the zoom lens according to the third embodiment, the third lens unit includes one negative lens. By making such arrangement, it is possible to make the third lens unit small-sized.

Moreover, technical significance of conditional expression (3-2) is same as the technical significance of conditional expression (3). Here, description of the technical significance of conditional expression (1) and conditional expression (3) has been made in the description of the zoom lens according to the first embodiment. Therefore, the description thereof is omitted here.

It is preferable that the following conditional expression (1''') is satisfied instead of conditional expression (1).

$$0.85 < (\beta_{2t}/\beta_{2w})/(\beta_{3t}/\beta_{3w}) < 1.33 \quad (1''')$$

Furthermore, it is more preferable that the following conditional expression (1'''') is satisfied instead of conditional expression (1).

$$0.95 < (\beta_{2t}/\beta_{2w})/(\beta_{3t}/\beta_{3w}) < 1.31 \quad (1'''')$$

It is preferable that the following conditional expression (3-2') is satisfied instead of conditional expression (3-2).

$$1.00 < f_2/f_w < 1.50 \quad (3\text{-}2')$$

Furthermore, it is more preferable that the following conditional expression (3.2") is satisfied instead of conditional expression (3-2).

$$1.10 < f_2/f_w < 1.40 \quad (3\text{-}2'')$$

Moreover, in the zoom lens according to the second embodiment and the zoom lens according to the third embodiment, it is preferable that the following conditional expression (2) is satisfied:

$$-0.70 < \beta_2 < -0.32 \quad (2)$$

where,
$\beta_{2w}$ denotes the lateral magnification of the second lens unit at the time of focusing on an infinite object point at the wide angle end.

Technical significance of conditional expression (2) has been described in the description of the zoom lens according to the first embodiment. Therefore, the description thereof is omitted here.

It is more preferable that the aforementioned conditional expression (2') is satisfied instead of conditional expression (2).

Furthermore, it is even more preferable that the aforementioned conditional expression (2") is satisfied instead of conditional expression (2).

Moreover, in the zoom lens according to the aforementioned embodiment, it is preferable that the following conditional expression (4) is satisfied:

$$1.05 < \beta_{3w} < 1.35 \quad (4)$$

where,
$\beta_{3w}$ denotes the lateral magnification of the third lens unit at the time of focusing on an infinite object point at the wide angle end.

Conditional expression (4) is a conditional expression related to the lateral magnification of the third lens unit at the wide angle end.

By making so as not to fall below a lower limit value of conditional expression (4), it is possible to position a principal point of the overall optical system further on the object side. Accordingly, it is possible to improve a telephoto performance of the optical system. As a result, it is possible to shorten the overall length of the zoom lens while correcting various aberrations favorably.

By making so as not to exceed an upper limit value of conditional expression (4), it is possible to suppress an increase in the lateral magnification of the third lens unit at the wide angle end. Accordingly, since it is possible to suppress an increase in the lateral magnification of the third lens unit also at the telephoto end, it is possible to shorten the overall length of the zoom lens. Moreover, it is possible to correct the chromatic aberration of magnification favorably, the distortion, and the astigmatism occurred in the first lens unit and the second lens unit while suppressing an occurrence of the spherical aberration in third lens unit. Moreover, since it is possible to shorten a distance between the third lens unit and an image plane, it is possible to shorten the overall length of the zoom lens.

It is more preferable that the following conditional expression (4') is satisfied instead of conditional expression (4).

$$1.10 < \beta_{3w} < 1.34 \quad (4')$$

Furthermore, it is even more preferable that the following conditional expression (4") is satisfied instead of conditional expression (4).

$$1.15 < \beta_{3w} < 1.33 \quad (4'')$$

Moreover, in the zoom lens according to the aforementioned embodiment, it is preferable that the following conditional expression (5) is satisfied:

$$1.70 < \beta_{3t} < 3.00 \quad (5)$$

where,
$\beta_{3t}$ denotes the lateral magnification of the third lens unit at the time of focusing on an infinite object point at the telephoto end.

Conditional expression (5) is conditional expression related to the lateral magnification of the third lens unit at the telephoto end.

By making so as not to fall below a lower limit value of conditional expression (5), it is possible to position a principal point of the overall optical system further on the object side. Accordingly, it is possible to improve a telephoto performance of the optical system. As a result, it is possible to shorten the overall length of the zoom lens while correcting various aberrations favorably.

By making so as not to exceed an upper limit value of conditional expression (5), it is possible to suppress an occurrence of the spherical aberration and the longitudinal chromatic aberration in the third lens unit. Moreover, since it is possible to shorten a distance between a lens positioned nearest to the image in the third lens unit and the image plane, it is possible to shorten the overall length of the zoom lens.

It is more preferable that the following conditional expression (5') is satisfied instead of conditional expression (5).

$$1.75 < \beta_{3t} < 2.90 \quad (5')$$

Furthermore, it is even more preferable that the following conditional expression (5") is satisfied instead of conditional expression (5).

$$1.80 < \beta_{3t} < 2.80 \quad (5'')$$

Moreover, in the zoom lens according to the present embodiment, it is preferable that the following conditional expression (6) is satisfied:

$$-2.50 < f_1/f_w < -1.49 \quad (6)$$

where,
$f_1$ denotes a focal length of the first lens unit, and
$f_w$ denotes the focal length of the overall zoom lens system at the wide angle end.

Conditional expression (6) is a conditional expression related to a ratio of the focal length of the first lens unit and the focal length of the overall zoom lens system at the wide angle end.

By making so as not to fall below a lower limit value of conditional expression (6), it is possible to make the focal length of the first lens unit adequately short (make the refractive index large). In this case, since it is possible to position the entrance pupil further on the object side, it is possible to make a diameter of the lenses in the first lens unit small. As a result, it is possible to make the optical system small-sized.

Moreover, by making the focal length of the first lens unit adequately short, it is possible to position an image point of the first lens unit further on the image side. In this case, an object point of the second lens unit (the image point of the first lens unit) is also brought nearer to the second lens unit. Therefore, it is possible to make the lateral magnification of the second lens unit at the wide angle end large. As a result, it is possible to shorten the overall length of the zoom lens at the wide angle end.

By making so as not to exceed an upper limit value of conditional expression (6), it is possible to make the focal length of the first lens unit adequately long (make the refractive power small). Accordingly, it is possible to suppress an occurrence of the astigmatism and the chromatic aberration of magnification at the wide angle end, and moreover, it is possible to suppress an occurrence of the chromatic aberration of magnification at the telephoto end.

It is more preferable that the following conditional expression (6') is satisfied instead of conditional expression (6).

$$-2.40 < f_1/f_w - 1.52 \quad (6')$$

Furthermore, it is even more preferable that the following conditional expression (6") is satisfied instead of conditional expression (6).

$$-2.30 < f_1/f_w - 1.55 \quad (6'')$$

Moreover, in the zoom lens according to the present embodiment, it is preferable that the following conditional expression (7) is satisfied:

$$-2.50 < f_3/f_w < -1.50 \quad (7)$$

where, $f_3$ denotes a focal length of the third lens unit, and $f_w$ denotes the focal length of the overall zoom lens system at the wide angle end.

Conditional expression (7) is a conditional expression related to a ratio of the focal length of the third lens unit and the focal length of the overall zoom lens system at the wide angle end.

By making so as not to fall below a lower limit value of conditional expression (7), it is possible to make the focal length of the third lens unit adequately short (make the refractive power large). Accordingly, it is possible to make a diameter of a lens positioned nearest to the image in the third lens unit small. Moreover, it is possible to correct the spherical aberration and the longitudinal chromatic aberration at the telephoto end favorably.

By making so as not to exceed an upper limit value of conditional expression (7), it is possible to make the focal length of the third lens unit adequately long (make the refractive power small). Accordingly, it is possible to suppress an occurrence of the astigmatism and the chromatic aberration of magnification at the wide angle end.

It is preferable that the following conditional expression (7') is satisfied instead of conditional expression (7).

$$-2.40 < f_3/f_w - 1.55 \quad (7')$$

Furthermore, it is even more preferable that the following conditional expression (7") is satisfied instead of conditional expression (7).

$$-2.30 < f_3/f_w - 1.60 \quad (7'')$$

Moreover, in the zoom lens according to the present embodiment, it is preferable that the following conditional expression (8) is satisfied.

$$0.46 < (\beta_{2t}/\beta_{2w})/(f_t/f_w) < 0.80 \quad (8)$$

where, $\beta_{2t}$ denotes the lateral magnification of the second lens unit at the telephoto end, $\beta_{2w}$ denotes the lateral magnification of the second lens unit at the wide angle end, here, each lateral magnification is a lateral magnification at the time of focusing on an infinite object point, $f_t$ denotes the focal length of the overall zoom lens system at the telephoto end, and $f_w$ denotes the focal length of the overall zoom lens system at the wide angle end.

Conditional expression (8) is a conditional expression related to a zooming ratio of the second lens unit.

By making so as not to fall below a lower limit value of conditional expression (8), it is possible to make the zooming ratio of the second lens unit adequately large. Since the second lens unit includes an aperture stop, the height of an off-axis light ray is lower as compared to the height of an off-axis light ray in the first lens unit and the third lens unit. Therefore, by imparting the zooming ratio of a certain magnitude, it is possible to suppress an occurrence of the chromatic aberration of magnification, the astigmatism, and the distortion.

By making so as not to exceed an upper limit value of conditional expression (8), it is possible to suppress an increase in the zooming ratio of the second lens unit. Accordingly, it is possible to suppress an increase in the amount of movement of the second lens unit. As a result, it is possible to shorten the overall length of the zoom lens. Moreover, by suppressing the increase in the amount of movement of the second lens unit, it is possible to make a difference in the height of an axial light ray that passes through the second lens unit at the wide angle end and at the telephoto end small. As a result, it is possible to suppress a fluctuation in the spherical aberration at the time of zooming.

It is more preferable that the following conditional expression (8') is satisfied instead of conditional expression (8).

$$0.50 < (\beta_{2t}/\beta_{2w})/(f_t/f_w) < 0.75 \quad (8')$$

Furthermore, it is even more preferable that the following conditional expression (8") is satisfied instead of conditional expression (8).

$$0.55 < (\beta_{2t}/\beta_{2w})/(f_t/f_w) < 0.70 \quad (8'')$$

Moreover, in the zoom lens according to the present embodiment, it is preferable that the following conditional expression (9) is satisfied.

$$1.00 < D_{aiw}/(\tan \omega_t \times f_t) < 2.90 \quad (9)$$

where, $D_{aiw}$ denotes a distance between the aperture stop and an image plane at the wide angle end, $\omega_t$ denotes a half angle of view at the telephoto end, and $f_t$ denotes a focal length of the overall zoom lens system at the telephoto end.

Conditional expression (9) is a conditional expression in which, a ratio of a distance between the aperture stop and the image plane at the wide angle end, and a product of the half angle of view at the telephoto end and the focal length of the overall zoom lens system at the telephoto end, is taken.

By making so as not to fall below a lower limit value of conditional expression (9), it is possible to separate a position of the aperture stop adequately apart from the image plane. By making such arrangement, at the wide angle, it is possible to dispose the first lens unit near the aperture stop. Accordingly, it is possible to lower the height of an off-axis light ray that passes through the first lens unit. Therefore, it is possible to make a diameter of a lens in the first lens unit small. As a result, it is possible to make the optical system small-sized. Moreover, it is possible to correct an off-axis aberration such as the distortion and the astigmatism at the wide angle end favorably.

By making so as not to exceed an upper limit value of conditional expression (9), it is possible to shorten the distance between the aperture stop and the image plane at the wide angle end. As a result, it is possible to shorten the overall length of the zoom lens at the wide angle end.

Moreover, at the time of zooming from the wide angle end to the telephoto end, as the aperture stop moves toward the object side, the aperture stop is positioned nearest to the object at the telephoto end. Therefore, the overall length of the zoom lens is susceptible to become long at the telephoto end. Therefore, by making so as not to exceed an upper limit value of conditional expression (9), at the wide angle end, it is possible to bring the position of the aperture stop near to the image plane. As a result, even at the telephoto end at which, the overall length is susceptible to become long, it is possible to shorten the overall length of the zoom lens.

Moreover, by positioning the aperture stop nearest to the object at the telephoto end, it is possible to make the refractive power of the lens units on two sides of the aperture stop to be symmetrical sandwiching the aperture stop. Accordingly, at the telephoto end, it is possible to correct the distortion and the chromatic aberration of magnification favorably.

It is more preferable that the following conditional expression (9') is satisfied instead of conditional expression (9).

$$1.30 < D_{aiw}/(\tan \omega_t \times f_t) < 2.80 \tag{9'}$$

Furthermore, it is even more preferable that the following conditional expression (9") is satisfied instead of conditional expression (9).

$$1.50 < D_{aiw}/(\tan \omega_t \times f_t) < 2.70 \tag{9''}$$

Moreover, in the zoom lens according to the present embodiment, it is preferable that the following conditional expression (10) is satisfied:

$$1.00 < EXP_W/(\tan \omega_t \times f_t) < 4.50 \tag{10}$$

where, $EXP_W$ denotes a distance between an image plane and an exit pupil, $\omega_t$ denotes the half angle of view at the telephoto end, and $f_t$ denotes the focal length of the overall zoom lens system at the telephoto end.

Conditional expression (10) is a conditional expression in which, a ratio of a distance between the image plane and the exit pupil at the wide angle end, and a product of the half angle of view at the telephoto end and the focal length of the overall zoom lens system at the telephoto end, is taken.

By making so as not to fall below a lower limit value of conditional expression (10), it becomes possible to separate the position of the exist pupil adequately apart from the image plane. Accordingly, it is possible to dispose a lens necessary for correction of the distortion and the astigmatism at the wide angle end between the aperture stop and the image plane. As a result, it is possible to correct the distortion and the astigmatism at the wide angle end favorably.

By making so as not to exceed an upper limit value of conditional expression (10), it is possible not to let the position of the exit pupil be separated apart excessively from the image plane (to be brought adequately closer to the image plane). When such an arrangement is made, at the wide angle end, it is possible to shorten the distance between the aperture stop and the image plane. As a result, it is possible to shorten the overall length of the zoom lens at the wide angle end.

Moreover, it is possible to make an angle of incidence of a light ray incident on an image pickup element large. Accordingly, it is possible not to let a diameter of a lens positioned nearest to the image in the third lens unit to be excessively larger with respect to a size of the image pickup element. As a result, it is possible to make the optical system small-sized.

It is more preferable that the following conditional expression (10') is satisfied instead of conditional expression (10).

$$1.80 < EXP_W/(\tan \omega_t \times f_t) < 4.00 \tag{10'}$$

Furthermore, it is even more preferable that the following conditional expression (10") is satisfied instead of conditional expression (10).

$$2.30 < EXP_W/(\tan \omega_t \times f_t) < 3.60 \tag{10''}$$

In the zoom lens according to the present embodiment, it is preferable that, at the time of focusing, only the third lens unit moves.

In the zoom lens according to the present embodiment, it is possible to form the third lens unit by a small number of lenses. Therefore, by moving the third lens unit at the time of focusing, high-speed focusing with a small driving sound is possible.

In the first lens unit of the zoom lens according to the embodiments from the first embodiment to the third embodiment, it is preferable that a lens positioned nearest to the object is a negative meniscus lens having a convex surface directed toward the object side (having a concave surface directed toward the image side). Moreover, in the first lens unit, it is preferable that a lens positioned nearest to the image is a positive meniscus lens having a convex surface directed toward the object side (having a concave surface directed toward the image side).

Moreover, in the third lens unit of the zoom lens according to the second embodiment, it is preferable that a lens positioned nearest to the object has a positive refractive power, and a lens positioned nearest to the image has a negative refractive power. Moreover, in the third lens unit of the zoom lens according to the second embodiment, it is preferable that the lens positioned nearest to the object is a positive meniscus lens having a convex surface directed toward the image side (having a concave surface directed toward the object side). Furthermore, in the third lens unit of the zoom lens according to the third embodiment, it is preferable that the lens positioned nearest to the image is a negative meniscus lens having a convex surface directed toward the image side (having a concave surface directed toward the object side).

Moreover, in the zoom lens according to the embodiments from the first embodiment to the third embodiment, it is preferable that, at the time of zooming from the wide angle end to the telephoto end, the second lens unit (or the aperture stop) moves toward the object side. Moreover, in the zoom lens according to the second embodiment, it is preferable that at the time of zooming from the wide angle end to the telephoto end, the first lens unit, after moving toward the image side, moves toward the object side.

Moreover, a lens barrel according to the present embodiment includes one of the aforementioned zoom lenses, and a connecting portion for connecting a casing, and an image pickup element, which converts an optical image formed by the zoom lens to an electric signal, is disposed in the casing.

By making such arrangement, it is possible to provide a lens barrel which includes a zoom lens with a short overall length and a small-size, and in which, various aberrations are corrected favorably.

Moreover, an image pickup apparatus according to the present embodiment includes one of the aforementioned zoom lenses, and an image pickup element which converts an optical image formed by the zoom lens to an electric signal.

By making such arrangement, it is possible to provide an image pickup apparatus which includes a zoom lens with a short overall length and small-size, and in which, various aberrations are corrected favorably.

Moreover, the image pickup apparatus according to the present embodiment includes an image converting section, and the image converting section converts an electric signal that includes a distortion due to the zoom lens, to an image signal in which, the distortion has been corrected by image processing.

In a case in which, the zoom lens has a distortion, an optical image also has a distortion. When such optical image is picked up by the image pickup element, an electric signal converted by the image pickup element includes distortion. Therefore, it is preferable to convert the electric signal that includes distortion, to an image signal in which, the distortion has been corrected by image processing, by using the image converting section (image processing section).

By correcting the distortion electrically, it is possible to reduce a load of aberration correction on the zoom lens. Moreover, securing a refractive power of appropriate magnitude with respect to the negative refractive power of the first lens unit becomes easy. For such reasons, the electrical correction of the distortion is advantageous for small-sizing and achieving high zooming ratio of the optical system. Moreover, an amount of distortion correction may be changed for each color signal, and the chromatic aberration of magnification may also be corrected by image processing.

Regarding each conditional expression, it is preferable to make that function more assured by restricting one of or both of the lower limit value and the upper limit value. Moreover, regarding each conditional expression, only an upper limit value or a lower limit value of a numerical range of a further restricted conditional expression may be restricted. For restricting the numerical range of a conditional expression, the upper limit value or the lower limit value of each conditional expression may be let to be the upper limit value or the lower limit value of the other conditional expression.

Examples of zoom lenses according to certain aspects of the present embodiment will be described below in detail by referring to the accompanying diagrams. However, the present invention is not restricted to the examples described below. Moreover, as to whether the refractive power is a positive refractive power or a negative refractive power is based on a paraxial radius of curvature.

Figure 1B:
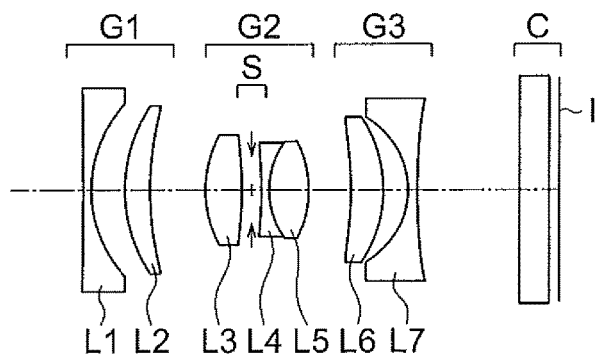
Figure 1C:
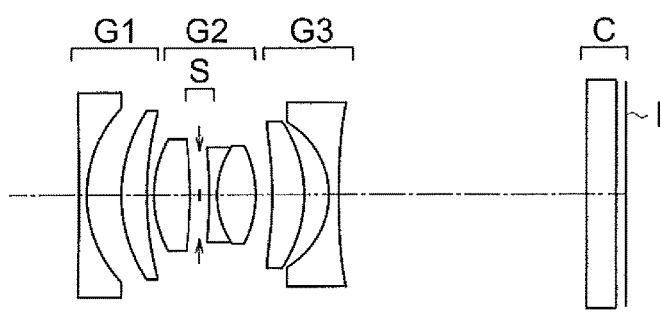

A zoom lens according to an example 1 of the present invention will be described below. FIG. 1A to FIG. 1C are cross-sectional views (lens cross-sectional views) along an optical axis showing an optical arrangement of the zoom lens according to the example 1 at the time of focusing on an infinite object point, where, FIG. 1A is a cross-sectional view at a wide-angle end, FIG. 1B is a cross-sectional view in an intermediate focal length state, and FIG. 1C is a cross-sectional view at a telephoto end. In all the examples that follow, in cross-sectional views, C denotes a cover glass, and I denotes an image pickup surface of an image pickup element.

FIG. 2A to FIG. 2L are aberration diagrams of the zoom lens according to the example 1 at the time of focusing on the infinite object point. Here, FIY denotes the maximum image height. Reference numerals in aberration diagrams are common for all the examples that will be described later.

Moreover, in these aberration diagrams, FIG. 2A, FIG. 4A, FIG. 6A, FIG. 8A, FIG. 10A, FIG. 12A, FIG. 14A, FIG. 16A, FIG. 18A, FIG. 20A, FIG. 22A, FIG. 24A, FIG. 26A, FIG. 28A, FIG. 30A, FIG. 32A, FIG. 34A, and FIG. 36A show a spherical aberration (SA) at the wide angle end.

FIG. 2B, FIG. 4B, FIG. 6B, FIG. 8B, FIG. 10B, FIG. 12B, FIG. 14B, FIG. 16B, FIG. 18B, FIG. 20B, FIG. 22B, FIG. 24B, FIG. 26B, FIG. 28B, FIG. 30B, FIG. 32B, FIG. 34B, and FIG. 36B show an astigmatism (AS) at the wide angle end.

FIG. 2C, FIG. 4C, FIG. 6C, FIG. 8C, FIG. 10C, FIG. 12C, FIG. 14C, FIG. 16C, FIG. 18C, FIG. 20C, FIG. 22C, FIG. 24C, FIG. 26C, FIG. 28C, FIG. 30C, FIG. 32C, FIG. 34C, and FIG. 36C show a distortion (DT) at the wide angle end.

FIG. 2D, FIG. 4D, FIG. 6D, FIG. 8D, FIG. 10D, FIG. 12D, FIG. 14D, FIG. 16D, FIG. 18D, FIG. 20D, FIG. 22D, FIG. 24D, FIG. 26D, FIG. 28D, FIG. 30D, FIG. 32D, FIG. 34D, and FIG. 36D show a chromatic aberration of magnification (CC) at the wide angle end.

Moreover, FIG. 2E, FIG. 4E, FIG. 6E, FIG. 8E, FIG. 10E, FIG. 12E, FIG. 14E, FIG. 16E, FIG. 18E, FIG. 20E, FIG. 22E, FIG. 24E, FIG. 26E, FIG. 28E, FIG. 30E, FIG. 32E, FIG. 34E, and FIG. 36E show a spherical aberration (SA) in the intermediate focal length state.

FIG. 2F, FIG. 4F, FIG. 6F, FIG. 8F, FIG. 10F, FIG. 12F, FIG. 14F, FIG. 16F, FIG. 18F, FIG. 20F, FIG. 22F, FIG. 24F, FIG. 26F, FIG. 28F, FIG. 30F, FIG. 32F, FIG. 34F, and FIG. 36F show an astigmatism (AS) in the intermediate focal length state.

FIG. 2G, FIG. 4G, FIG. 6G, FIG. 8G, FIG. 10G, FIG. 12G, FIG. 14G, FIG. 16G, FIG. 18G, FIG. 20G, FIG. 22G, FIG. 24G, FIG. 26G, FIG. 28G, FIG. 30G, FIG. 32G, FIG. 34G, and FIG. 36G show a distortion (DT) in the intermediate focal length state.

FIG. 2H, FIG. 4H, FIG. 6H, FIG. 8H, FIG. 10H, FIG. 12H, FIG. 14H, FIG. 16H, FIG. 18H, FIG. 20H, FIG. 22H, FIG. 24H, FIG. 26H, FIG. 28H, FIG. 30H, FIG. 32H, FIG. 34H, and FIG. 36H show a chromatic aberration of magnification (CC) in the intermediate focal length state.

Moreover, FIG. 2I, FIG. 4I, FIG. 6I, FIG. 8I, FIG. 10I, FIG. 12I, FIG. 14I, FIG. 16I, FIG. 18I, FIG. 20I, FIG. 22I, FIG. 24I, FIG. 26I, FIG. 28I, FIG. 30I, FIG. 32I, FIG. 34I, and FIG. 36I show a spherical aberration (SA) at the telephoto end.

FIG. 2J, FIG. 4J, FIG. 6J, FIG. 8J, FIG. 10J, FIG. 12J, FIG. 14J, FIG. 16J, FIG. 18J, FIG. 20J, FIG. 22J, FIG. 24J, FIG. 26J, FIG. 28J, FIG. 30J, FIG. 32J, FIG. 34J, and FIG. 36J show an astigmatism (AS) at the telephoto end.

FIG. 2K, FIG. 4K, FIG. 6K, FIG. 8K, FIG. 10K, FIG. 12K, FIG. 14K, FIG. 16K, FIG. 18K, FIG. 20K, FIG. 22K, FIG. 24K, FIG. 26K, FIG. 28K, FIG. 30K, FIG. 32K, FIG. 34K, and FIG. 36K show a distortion (DT) at the telephoto end.

FIG. 2L, FIG. 4L, FIG. 6L, FIG. 8L, FIG. 10L, FIG. 12L, FIG. 14L, FIG. 16L, FIG. 18L, FIG. 20L, FIG. 22L, FIG. 24L, FIG. 26L, FIG. 28L, FIG. 30L, FIG. 32L, FIG. 34L, and FIG. 36L show a chromatic aberration of magnification (CC) at the telephoto end.

The zoom lens of the example 1, as shown in FIG. 1A to FIG. 1C, includes in order from an object side, a first lens unit G1 having a negative refractive power, a second lens unit G2 having a positive refractive power, and a third lens unit G3 having a negative refractive power.

The first lens unit G1 includes a biconcave negative lens L1, and a positive meniscus lens L2 having a convex surface directed toward the object side.

The second lens unit G2 includes a biconvex positive lens L3, a biconcave negative lens L4, and a biconvex positive lens L5. Here, the biconcave negative lens L4 and the biconvex positive lens L5 are cemented.

The third lens unit G3 includes a positive meniscus lens L6 having a convex surface directed toward an image side, and a biconcave negative lens L7.

Moreover, an aperture stop S is disposed in the second lens unit G2. More specifically, the aperture stop S is disposed between the biconvex positive lens L3 and the biconcave negative lens L4.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the positive meniscus lens L6 and the biconcave negative lens L7 move toward the image side.

An aspheric surface is provided to a total of five surfaces namely, both surfaces of the biconvex positive lens L3, an object-side surface of the positive meniscus lens L6, and both surfaces of the biconcave negative lens L7.

Figure 3A:
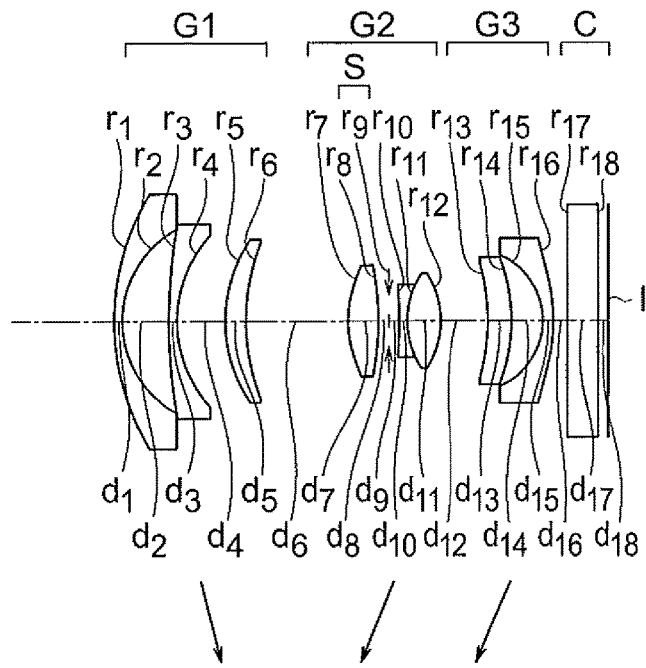
FIG. 3A, FIG. 3B, and FIG. 3C (hereinafter, 'FIG. 3A to FIG. 3C') are cross-sectional views along an optical axis showing an optical arrangement of a zoom lens according to an example 2 at the time of focusing on an infinite object point, where, FIG.
Figure 3B:
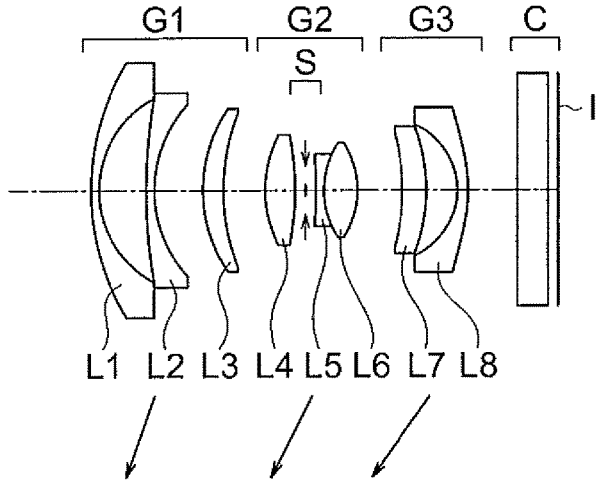
Figure 3C:
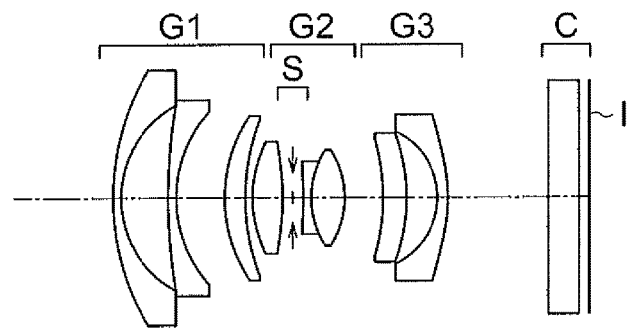

Next, a zoom lens according to an example 2 of the present invention will be described below. FIG. 3A to FIG. 3C are cross-sectional views along an optical axis showing an optical arrangement of the zoom lens according to the example 2 at the time of focusing on an infinite object point. FIG. 4A to FIG. 4L are aberration diagrams of the zoom lens according to the example 2 at the time of focusing on the infinite object point.

The zoom lens of the example 2, as shown in FIG. 3A to FIG. 3C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a negative meniscus lens L2 having a convex surface directed toward the object side, and a positive meniscus lens L3 having a convex surface directed toward the object side.

The second lens unit G2 includes a biconvex positive lens L4, a biconcave negative lens L5, and a biconvex positive lens L6. Here, the biconcave negative lens L5 and the biconvex positive lens L6 are cemented.

The third lens unit G3 includes a positive meniscus lens L7 having a convex surface directed toward an image side and a negative meniscus lens L8 having a convex surface directed toward the image side.

Moreover, an aperture stop S is disposed in the second lens unit G2. More specifically, the aperture stop S is disposed between the biconvex positive lens L4 and the biconcave negative lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the positive meniscus lens L7 and the negative meniscus lens L8 move toward the image side.

An aspheric surface is provided to a total of five surfaces namely, an image-side surface of the negative meniscus lens L1, both surfaces of the biconvex positive lens L4, and both surfaces of the negative meniscus lens L8.

Figure 5A:
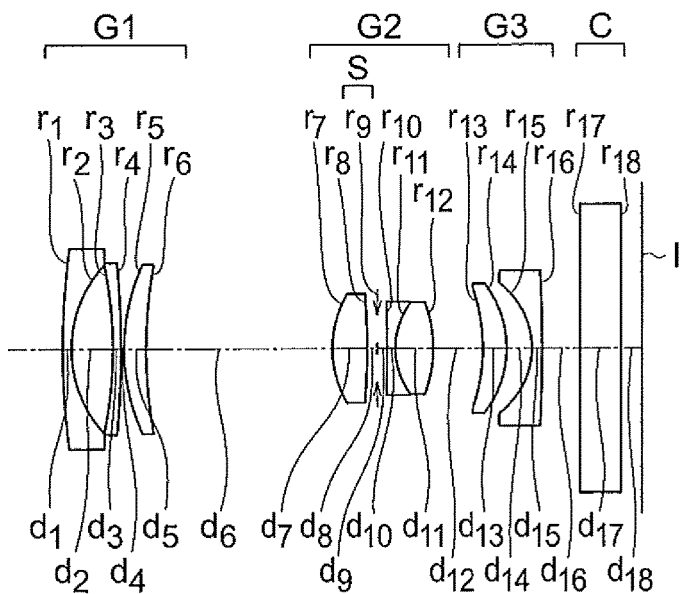
FIG. 5A, FIG. 5B, and FIG. 5C (hereinafter, 'FIG. 5A to FIG. 5C') are cross-sectional views along an optical axis showing an optical arrangement of a zoom lens according to an example 3 at the time of focusing on an infinite object point, where.
Figure 5B:
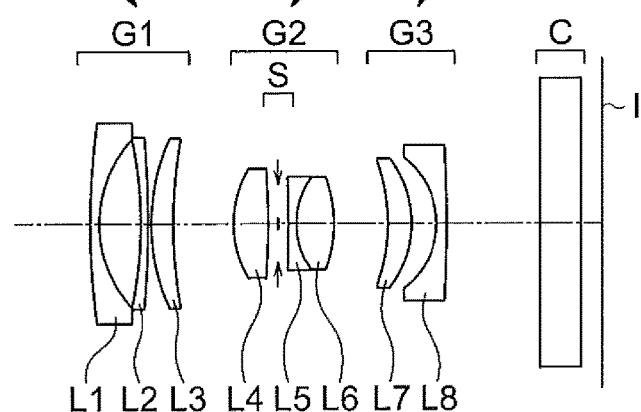
Figure 5C:
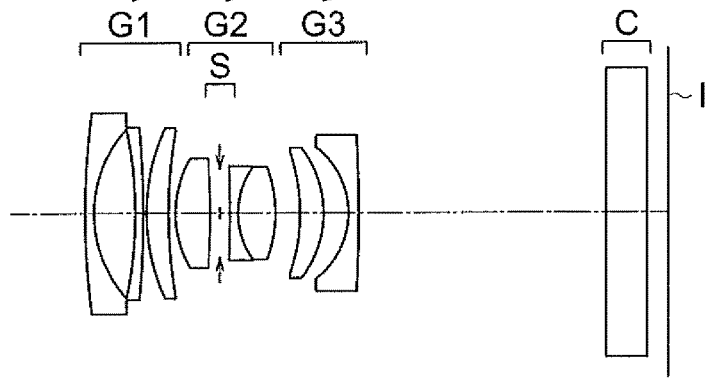

Next, a zoom lens according to an example 3 of the present invention will be described below. FIG. 5A to FIG. 5C are cross-sectional views along an optical axis showing an optical arrangement of the zoom lens according to the example 3 at the time of focusing on an infinite object point. FIG. 6A to FIG. 6L are aberration diagrams of the zoom lens according to the example 3 at the time of focusing on the infinite object point.

The zoom lens of the example 3, as shown in FIG. 5A to FIG. 5C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a negative meniscus lens L2 having a convex surface directed toward an image side, and a positive meniscus lens L3 having a convex surface directed toward the object side.

The second lens unit G2 includes a biconvex positive lens L4, a biconcave negative lens L5, and a biconvex positive lens L6. Here, the biconcave negative lens L5 and the biconvex positive lens L6 are cemented.

The third lens unit G3 includes a positive meniscus lens L7 having a convex surface directed toward the image side and a negative meniscus lens L8 having a convex surface directed toward the image side.

Moreover, an aperture stop S is disposed in the second lens unit G2. More specifically, the aperture stop S is disposed between the biconvex positive lens L4 and the biconcave negative lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the positive meniscus lens L7 and the negative meniscus lens L8 move toward the image side.

An aspheric surface is provided to a total of four surfaces namely, both surfaces of the biconvex positive lens L4 and both surfaces of the negative meniscus lens L8.

Figure 7A:
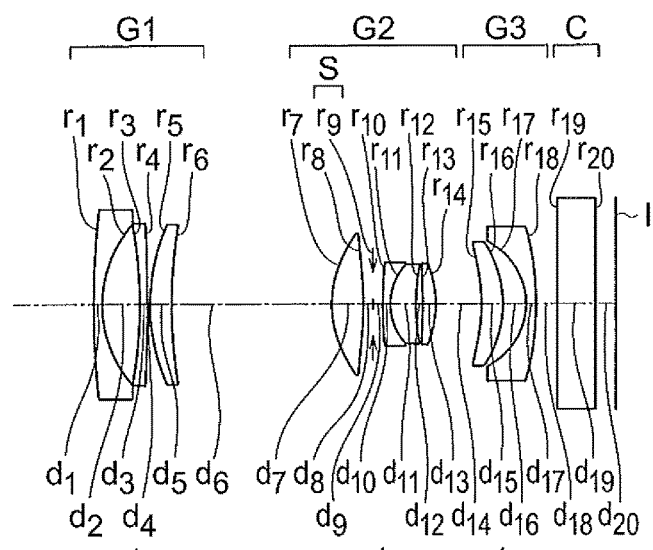
FIG. 7A, FIG. 7B, and FIG. 7C (hereinafter, 'FIG. 7A to FIG. 7C') are cross-sectional views along an optical axis showing an optical arrangement of a zoom lens according to an example 4 at the time of focusing on an infinite object point, where.
Figure 7B:
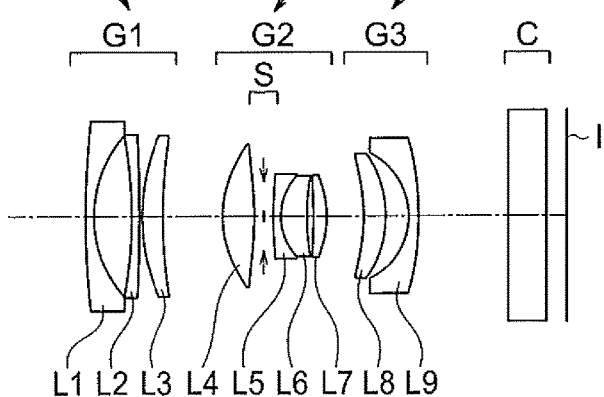
Figure 7C:
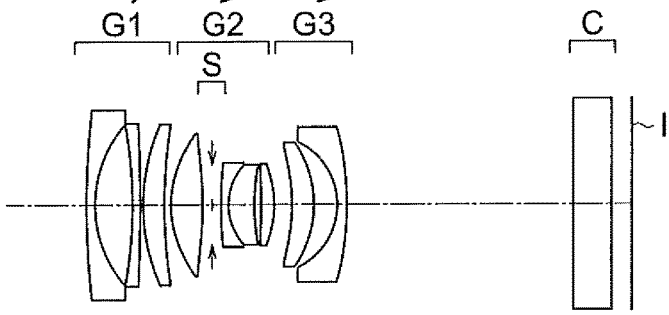

Next, a zoom lens according to an example 4 of the present invention will be described below. FIG. 7A to FIG. 7C are cross-sectional views along an optical axis showing an optical arrangement of the zoom lens according to the example 4 at the time of focusing on an infinite object point. FIG. 8A to FIG. 8L are aberration diagrams of the zoom lens according to the example 4 at the time of focusing on the infinite object point. The zoom lens of the example 4, as shown in FIG. 7A to FIG. 7C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a negative meniscus lens L2 having a convex surface directed toward an image side, and a positive meniscus lens L3 having a convex surface directed toward the object side.

The second lens unit G2 includes a biconvex positive lens L4, a negative meniscus lens L5 having a convex surface directed toward the object side, a positive meniscus lens L6 having a convex surface directed toward the object side, and a positive meniscus lens L7 having a convex surface directed toward the image side. Here, the negative meniscus lens L5 and the positive meniscus lens L6 are cemented.

The third lens unit G3 includes a positive meniscus lens L8 having a convex surface directed toward the image side, and a negative meniscus lens L9 having a convex surface directed toward the image side.

Moreover, an aperture stop S is disposed in the second lens unit G2. More specifically, the aperture stop S is disposed between the biconvex positive lens L4 and the negative meniscus lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the positive meniscus lens L8 and the negative meniscus lens L9 move toward the image side.

An aspheric surface is provided to a total of six surfaces namely, both surfaces of the biconvex positive lens L4, both surfaces of the biconvex positive lens L7, an object-side surface of the positive meniscus lens L8, and an image-side surface of the negative meniscus lens L9.

Figure 9A:
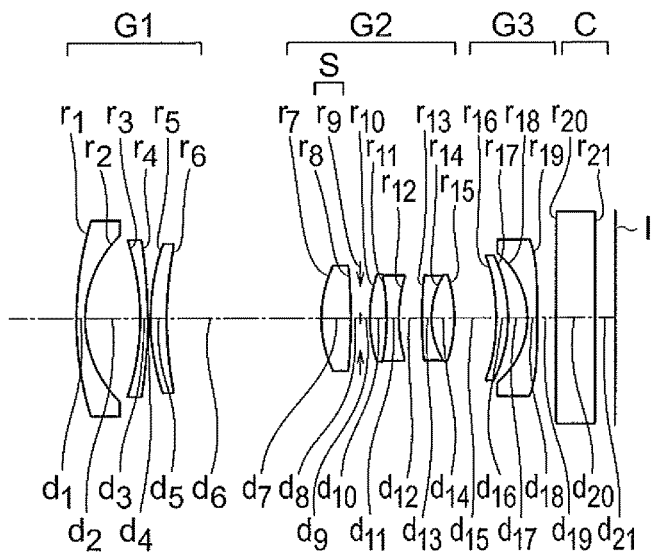
FIG. 9A, FIG. 9B, and FIG. 9C (hereinafter, 'FIG. 9A to FIG. 9C') are cross-sectional views along an optical axis showing an optical arrangement of a zoom lens according to an example 5 at the time of focusing on an infinite object point, where.
Figure 9B:
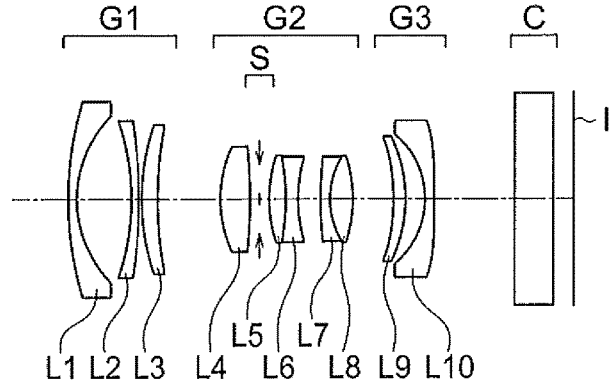
Figure 9C:
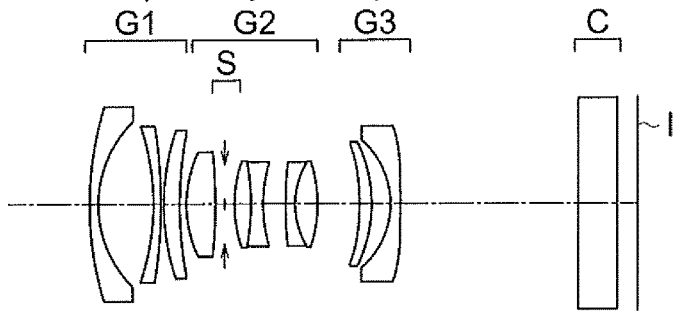

Next, a zoom lens according to an example 5 of the present invention will be described below. FIG. 9A to FIG. 9C are cross-sectional views along an optical axis showing an optical arrangement of the zoom lens according to the example 5 at the time of focusing on an infinite object point. FIG. 10A to FIG. 10L are aberration diagrams of the zoom lens according to the example 5 at the time of focusing on the infinite object point.

The zoom lens of the example 5, as shown in FIG. 9A to FIG. 9C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a negative meniscus lens L2 having a convex surface directed toward an image side, and a positive meniscus lens L3 having a convex surface directed toward the object side.

The second lens unit G2 includes a biconvex positive lens L4, a biconvex positive lens L5, a biconcave negative lens L6, a negative meniscus lens L7 having a convex surface directed toward the object side, and a biconvex positive lens L8. Here, the biconvex positive lens L5 and the biconcave negative lens L6 are cemented. Moreover, the negative meniscus lens L7 and the biconvex positive lens L8 are cemented.

The third lens unit G3 includes a positive meniscus lens L9 having a convex surface directed toward the image side and a biconcave negative lens L10.

Moreover, an aperture stop S is disposed in the second lens unit G2. More specifically, the aperture stop S is disposed between the biconvex positive lens L4 and the biconvex positive lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the positive meniscus lens L9 and the biconcave negative lens L10 move toward the image side.

An aspheric surface is provided to a total of four surfaces namely, both surfaces of the biconvex positive lens L4, an object-side surface of the positive meniscus lens L9, and an image-side surface of the biconcave negative lens L10.

Figure 11A:
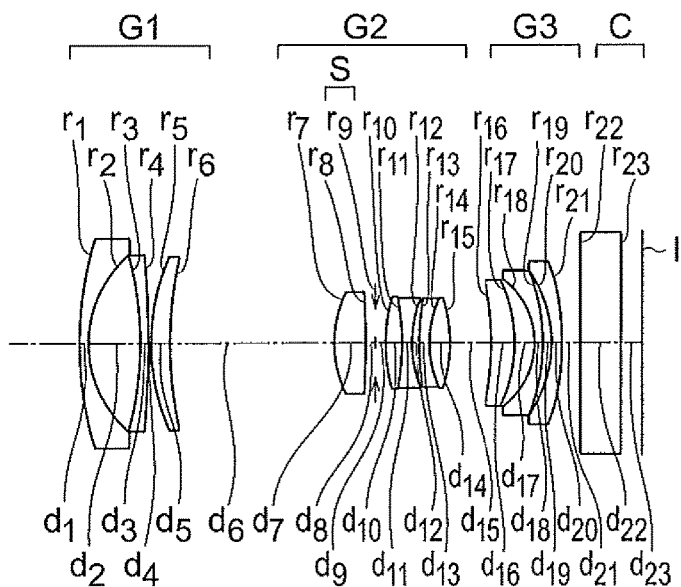
FIG. 11A, FIG. 11B, and FIG. 11C (hereinafter, 'FIG. 11A to FIG. 11C') are cross-sectional views along an optical axis showing an optical arrangement of a zoom lens according to an example 6 at the time of focusing on an infinite object point, where.
Figure 11B:
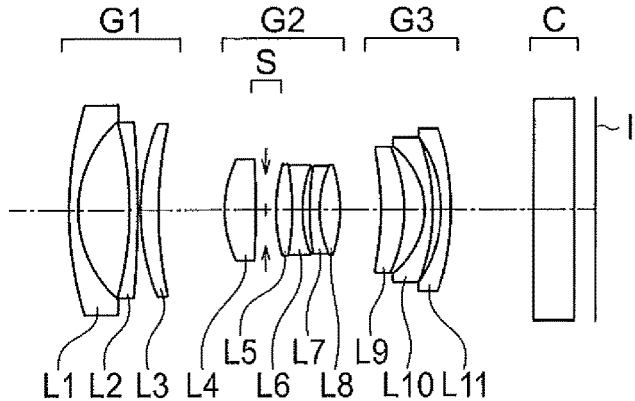
Figure 11C:
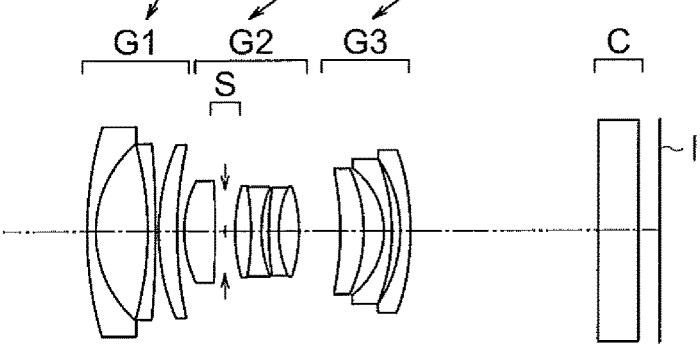

Next, a zoom lens according to an example 6 of the present invention will be described below. FIG. 11A to FIG. 11C are cross-sectional views along an optical axis showing an optical arrangement of the zoom lens according to the example 6 at the time of focusing on an infinite object point.

FIG. 12A to FIG. 12L are aberration diagrams of the zoom lens according to the example 6 at the time of focusing on the infinite object point.

The zoom lens of the example 6, as shown in FIG. 11A to FIG. 11C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a negative meniscus lens L2 having a convex surface directed toward an image side, and a positive meniscus lens L3 having a convex surface directed toward the object side.

The second lens unit G2 includes a biconvex positive lens L4, a biconvex positive lens L5, a biconcave negative lens L6, a negative meniscus lens L7 having a convex surface directed toward the object side, and a biconvex positive lens L8. Here, the biconvex positive lens L5 and the biconcave negative lens L6 are cemented. Moreover, the negative meniscus lens L7 and the biconvex positive lens L8 are cemented.

The third lens unit G3 includes a positive meniscus lens L9 having a convex surface directed toward the image side, a negative meniscus lens L10 having a convex surface directed toward the image side, and a negative meniscus lens L11 having a convex surface directed toward the image side.

Moreover, an aperture stop S is disposed in the second lens unit G2. More specifically, the aperture stop S is disposed between the biconvex positive lens L4 and the biconvex positive lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the positive meniscus lens L9, the negative meniscus lens L10, and the negative meniscus lens L11 move toward the image side.

An aspheric surface is provided to a total of four surfaces namely, both surfaces of the biconvex positive lens L4, an object-side surface of the positive meniscus lens L9, and an image-side surface of the negative meniscus lens L11.

Figure 13A:
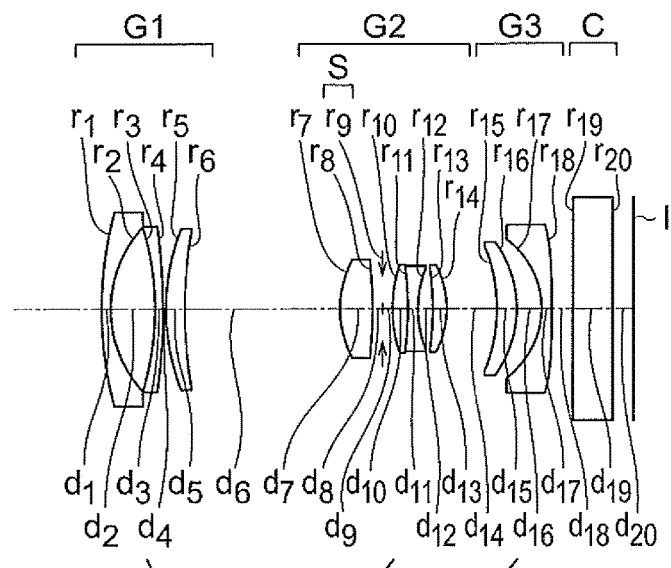
FIG. 13A, FIG. 13B, and FIG. 13C (hereinafter, 'FIG. 13A to FIG. 13C') are cross-sectional views along an optical axis showing an optical arrangement of a zoom lens according to an example 7 at the time of focusing on an infinite object point, where.
Figure 13B:
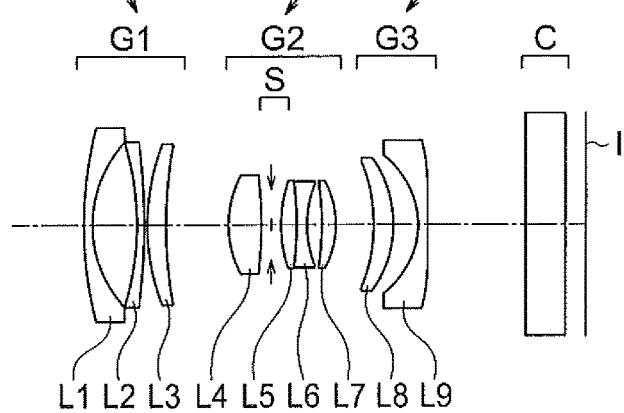
Figure 13C:
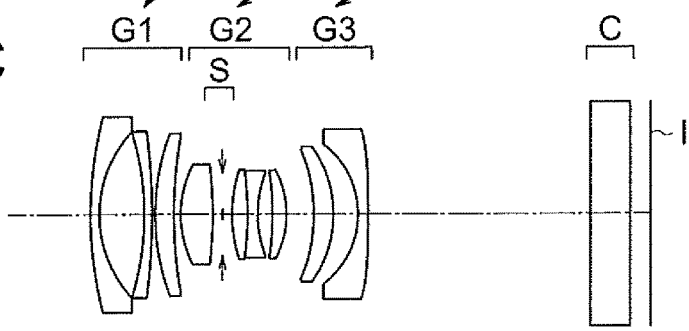

Next, a zoom lens according to an example 7 of the present invention will be described below. FIG. 13A to FIG. 13C are cross-sectional views along an optical axis showing an optical arrangement of the zoom lens according to the example 7 at the time of focusing on an infinite object point. FIG. 14A to FIG. 14L are aberration diagrams of the zoom lens according to the example 7 at the time of focusing on the infinite object point.

The zoom lens of the example 7, as shown in FIG. 13A to FIG. 13C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a negative meniscus lens L2 having a convex surface directed toward an image side, and a positive meniscus lens L3 having a convex surface directed toward the object side.

The second lens unit G2 includes a biconvex positive lens L4, a biconvex positive lens L5, a biconcave negative lens L6, and a positive meniscus lens L7 having a convex surface directed toward the image side. Here, the biconvex positive lens L5 and the biconcave negative lens L6 are cemented.

The third lens unit G3 includes a positive meniscus lens L8 having a convex surface directed toward the image side and a negative meniscus lens L9 having a convex surface directed toward the image side.

Moreover, an aperture stop S is disposed in the second lens unit G2. More specifically, the aperture stop S is disposed between the biconvex positive lens L4 and the biconvex positive lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the positive meniscus lens L8 and the negative meniscus lens L9 move toward the image side.

An aspheric surface is provided to a total of five surfaces namely, both surfaces of the biconvex positive lens L4, an image-side surface of the positive meniscus lens L7, an object-side surface of the positive meniscus lens L8, and an image side surface of the negative meniscus lens L9.

Figure 15A:
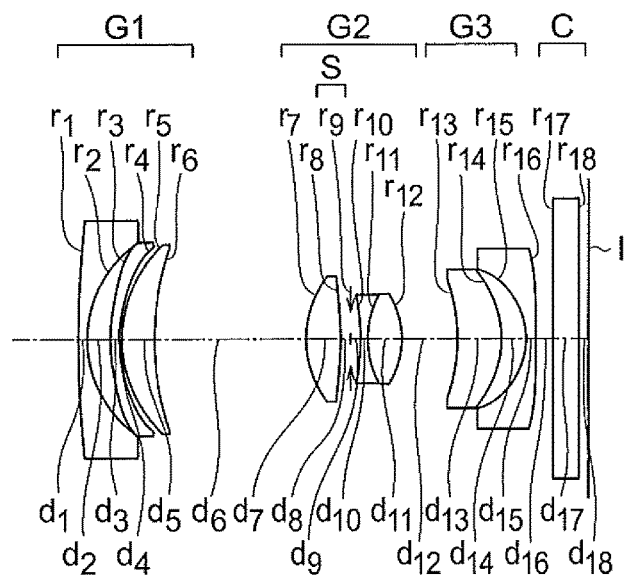
FIG. 15A, FIG. 15B, and FIG. 15C (hereinafter, 'FIG. 15A to FIG. 15C') are cross-sectional views along an optical axis showing an optical arrangement of a zoom lens according to an example 8 at the time of focusing on an infinite object point, where.
Figure 15B:
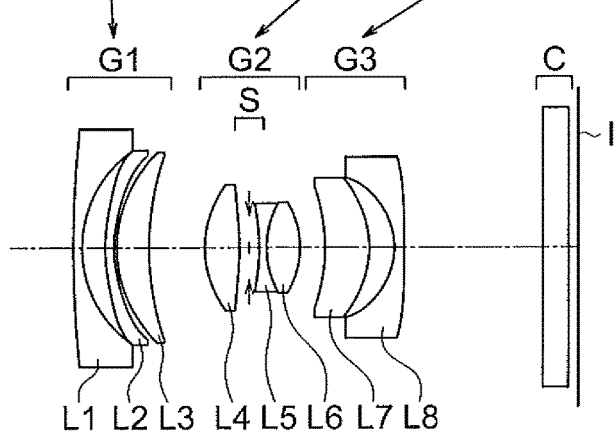
Figure 15C:
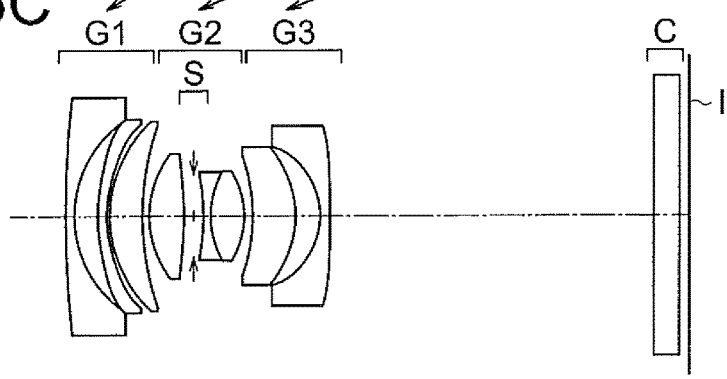

Next, a zoom lens according to an example 8 of the present invention will be described below. FIG. 15A to FIG. 15C are cross-sectional views along an optical axis showing an optical arrangement of the zoom lens according to the example 8 at the time of focusing on an infinite object point. FIG. 16A to FIG. 16L are aberration diagrams of the zoom lens according to the example 8 at the time of focusing on the infinite object point.

The zoom lens of the example 8, as shown in FIG. 15A to FIG. 15C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a negative meniscus lens L2 having a convex surface directed toward the object side, and a positive meniscus lens L3 having a convex surface directed toward the object side.

The second lens unit G2 includes a biconvex positive lens L4, a biconcave negative lens L5, and a biconvex positive lens L6. Here, the biconcave negative lens L5 and the biconvex positive lens L6 are cemented.

The third lens unit G3 includes a positive meniscus lens L7 having a convex surface directed toward an image side and a negative meniscus lens L8 having a convex surface directed toward the image side.

Moreover, an aperture stop S is disposed in the second lens unit G2. More specifically, the aperture stop S is disposed between the biconvex positive lens L4 and the biconcave negative lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the positive meniscus lens L7 and the negative meniscus lens L8 move toward the image side.

An aspheric surface is provided to a total of eight surfaces namely, both surfaces of the negative meniscus lens L2, both surfaces of the biconvex positive lens L4, an image-side surface of the biconvex positive lens L6, an image-side surface of the positive meniscus lens L7, and both surface of the negative meniscus lens L8.

Figure 17A:
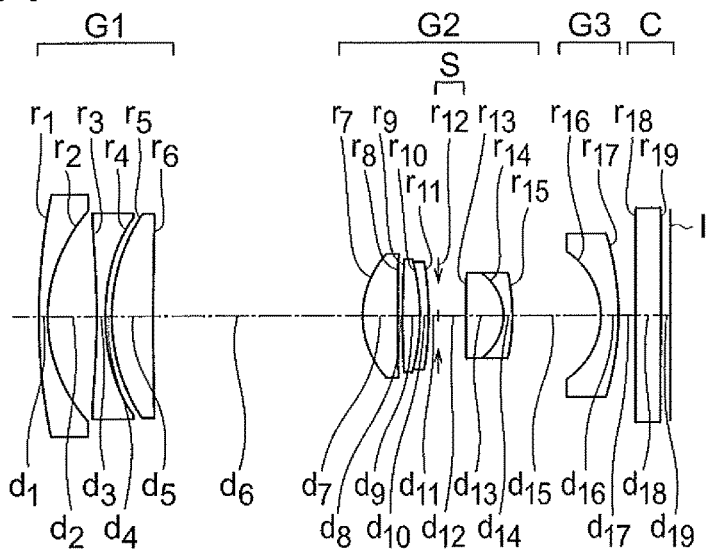
FIG. 17A, FIG. 17B, and FIG. 17C (hereinafter, 'FIG. 17A to FIG. 17C') are cross-sectional views along an optical axis showing an optical arrangement of a zoom lens according to an example 9 at the time of focusing on an infinite object point, where.
Figure 17B:
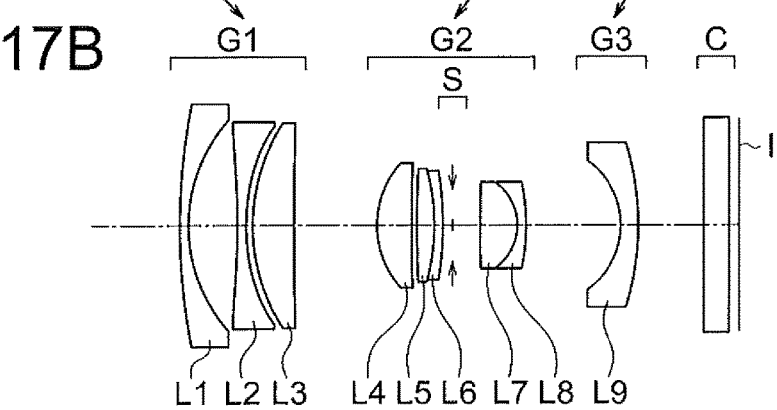
Figure 17C:
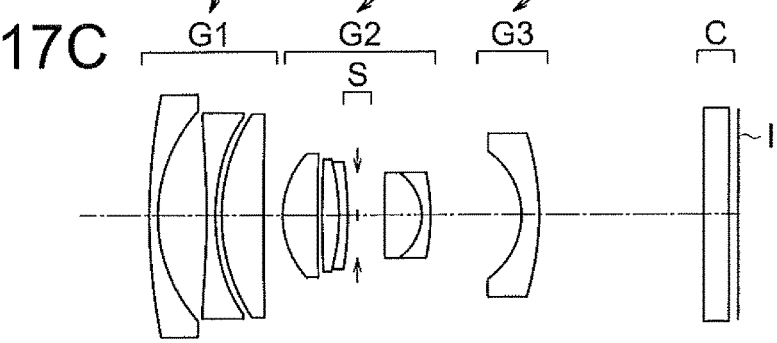

Next, a zoom lens according to an example 9 of the present invention will be described below. FIG. 17A to FIG. 17C are cross-sectional views along an optical axis showing an optical arrangement of the zoom lens according to the example 9 at the time of focusing on an infinite object point. FIG. 18A to FIG. 18L are aberration diagrams of the zoom lens according to the example 9 at the time of focusing on the infinite object point.

The zoom lens of the example 9, as shown in FIG. 17A to FIG. 17C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a biconvex positive lens L5, a negative meniscus lens L6 having a convex surface directed toward an image side, a positive meniscus lens L7 having a convex surface directed toward the image side, and a negative meniscus lens L8 having a convex surface directed toward the image side. Here, the biconvex positive lens L5 and the negative meniscus lens L6 are cemented. Moreover, the positive meniscus lens L7 and the negative meniscus lens L8 are cemented.

The third lens unit G3 includes a negative meniscus lens L9 having a convex surface directed toward the image side.

Moreover, an aperture stop S is disposed in the second lens unit G2. More specifically, the aperture stop S is disposed between the negative meniscus lens L6 and the positive meniscus lens L7.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the negative meniscus lens L9 moves toward the image side.

An aspheric surface is provided to a total of six surfaces namely, both surfaces of the biconcave negative lens L2, both surfaces of the biconvex positive lens L4, an object-side surface of the positive meniscus lens L7, and an image-side surface of the negative meniscus lens L9.

Figure 19A:
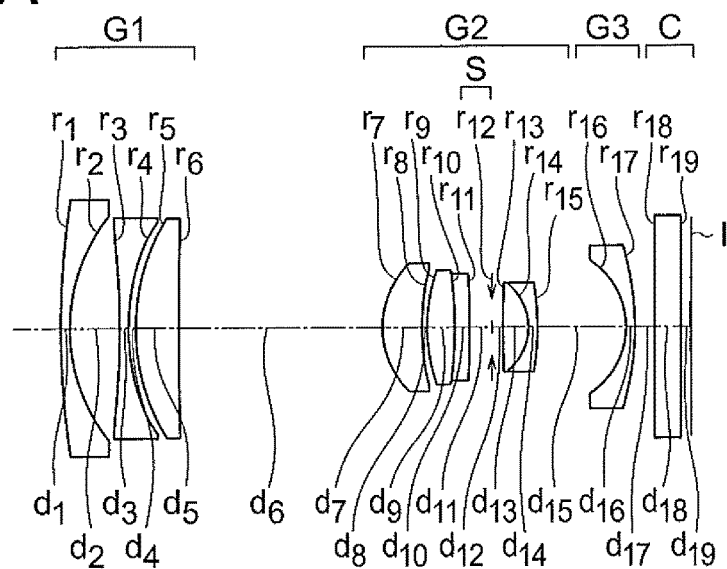
FIG. 19A, FIG. 19B, and FIG. 19C (hereinafter, 'FIG. 19A to FIG. 19C') are cross-sectional views along an optical axis showing an optical arrangement of a zoom lens according to an example 10 at the time of focusing on an infinite object point, where.
Figure 19B:
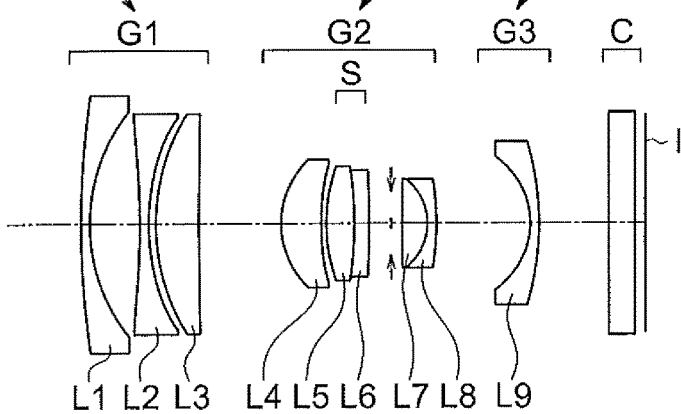
Figure 19C:
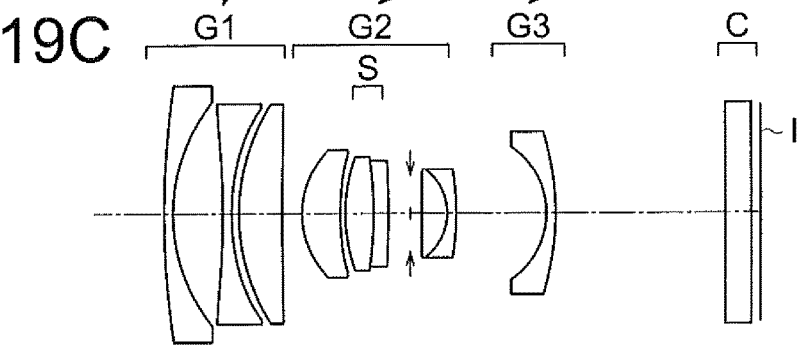

Next, a zoom lens according to an example 10 of the present invention will be described below. FIG. 19A to FIG. 19C are cross-sectional views along an optical axis showing an optical arrangement of the zoom lens according to the example 10 at the time of focusing on an infinite object point. FIG. 20A to FIG. 20L are aberration diagrams of the zoom lens according to the example 10 at the time of focusing on the infinite object point.

The zoom lens of the example 10, as shown in FIG. 19A to FIG. 19C, includes in order from an object side, a first lens unit having a negative refractive power, a second lens unit G2 having a positive refractive power, and a third lens unit G3 having a negative refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side, a biconvex positive lens L5, a negative meniscus lens L6 having a convex surface directed toward an image side, a biconvex positive lens L7, and a negative meniscus lens L8 having a convex surface directed toward the image side. Here, the biconvex positive lens L5 and the negative meniscus lens L6 are cemented. Moreover, the biconvex positive lens L7 and the negative meniscus lens L8 are cemented.

The third lens unit G3 includes a negative meniscus lens L9 having a convex surface directed toward the image side.

Moreover, an aperture stop S is disposed in the second lens unit G2. More specifically, the aperture stop S is disposed between the negative meniscus lens L6 and the biconvex positive lens L7.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the negative meniscus lens L9 moves toward the image side.

An aspheric surface is provided to a total of six surfaces namely, both surfaces of the biconcave negative lens L2, both surfaces of the positive meniscus lens L4, an object-side surface of the biconvex positive lens L7, and an image-side surface of the negative meniscus lens L9.

Figure 21A:
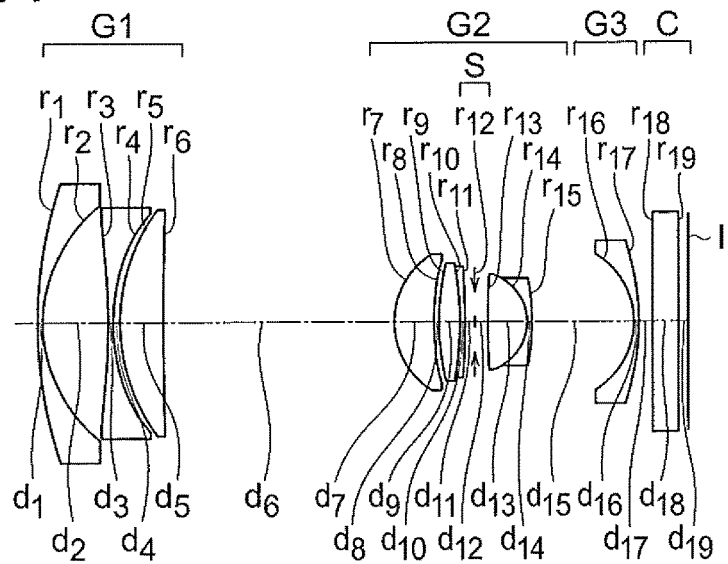
FIG. 21A, FIG. 21B, and FIG. 21C (hereinafter, 'FIG. 21A to FIG. 21C') are cross-sectional views along an optical axis showing an optical arrangement of a zoom lens according to an example 11 at the time of focusing on an infinite object point, where.
Figure 21B:
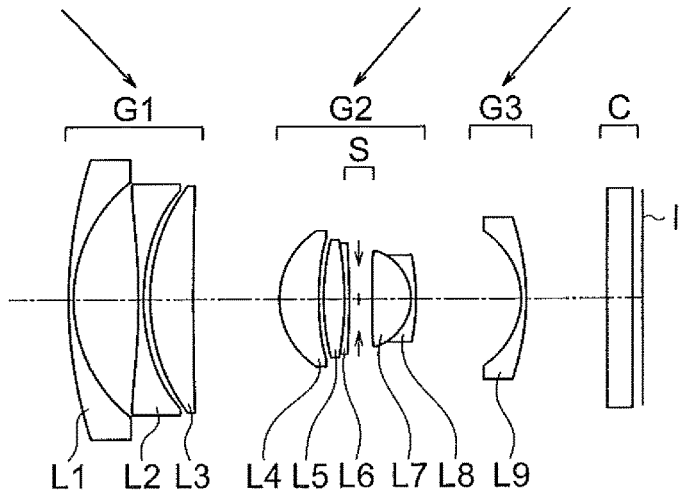
Figure 21C:
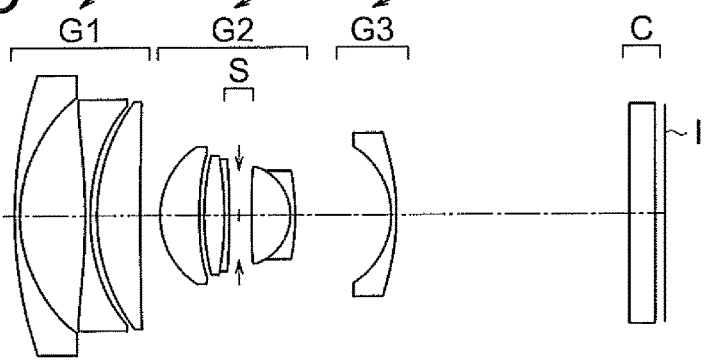

Next, a zoom lens according to an example 11 of the present invention will be described below. FIG. 21A to FIG. 21C are cross-sectional views along an optical axis showing an optical arrangement of the zoom lens according to the example 11 at the time of focusing on an infinite object point. FIG. 22A to FIG. 22L are aberration diagrams of the zoom lens according to the example 11 at the time of focusing on the infinite object point.

The zoom lens of the example 11, as shown in FIG. 21A to FIG. 21C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side, a biconvex positive lens L5, a negative meniscus lens L6 having a convex surface directed toward an image side, a biconvex positive lens L7, and a negative meniscus lens L8 having a convex surface directed toward the image side. Here, the biconvex positive lens L5 and the negative meniscus lens L6 are cemented. Moreover, the biconvex positive lens L7 and the negative meniscus lens L8 are cemented.

The third lens unit G3 includes a negative meniscus lens L9 having a convex surface directed toward the image side.

Moreover, an aperture stop S is disposed in the second lens unit G2. More specifically, the aperture stop S is disposed between the negative meniscus lens L6 and the biconvex positive lens L7.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the negative meniscus lens L9 moves toward the image side.

An aspheric surface is provided to a total of six surfaces namely, both surfaces of the biconcave negative lens L2, both surfaces of the positive meniscus lens L4, an object-side surface of the biconvex positive lens L7, and an image-side surface of the negative meniscus lens L11.

Figure 23A:
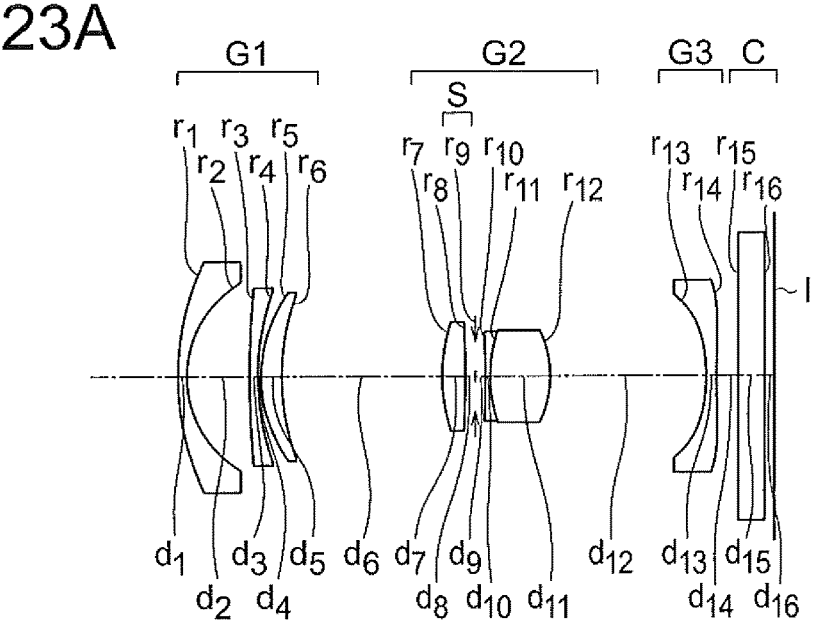
FIG. 23A, FIG. 23B, and FIG. 23C (hereinafter, 'FIG. 23A to FIG. 23C') are cross-sectional views along an optical axis showing an optical arrangement of a zoom lens according to an example 12 at the time of focusing on an infinite object point, where.
Figure 23B:
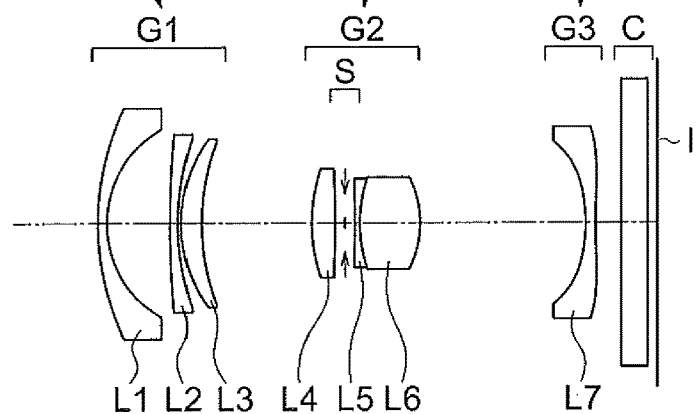
Figure 23C:
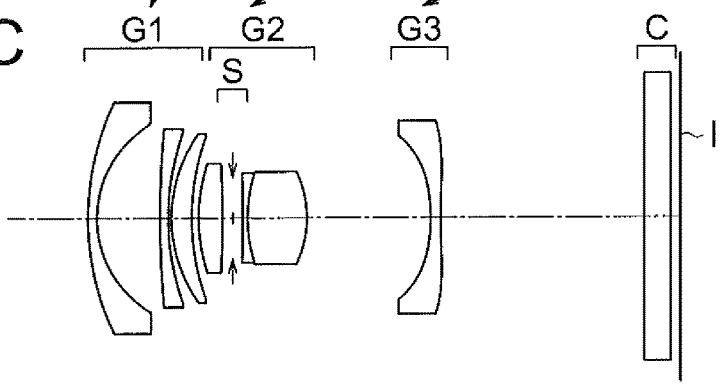

Next, a zoom lens according to an example 12 of the present invention will be described below. FIG. 23A to FIG. 23C are cross-sectional views along an optical axis showing an optical arrangement of the zoom lens according to the example 12 at the time of focusing on an infinite object point. FIG. 24A to FIG. 24L are aberration diagrams of the zoom lens according to the example 12 at the time of focusing on the infinite object point.

The zoom lens of the example 12, as shown in FIG. 23A to FIG. 23C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a negative meniscus lens L2 having a convex surface directed toward the object side, and a positive meniscus lens L3 having a convex surface directed toward the object side.

The second lens unit G2 includes a biconvex positive lens L4, a biconcave negative lens L5, and a biconvex positive lens L6. Here, the biconcave negative lens L5 and the biconvex positive lens L6 are cemented.

The third lens unit G3 includes a biconcave negative lens L7.

Moreover, an aperture stop S is disposed in the second lens unit G2. More specifically, the aperture stop S is disposed between the biconvex positive lens L4 and the biconcave negative lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the biconcave negative lens L7 moves toward the image side.

An aspheric surface is provided to a total of six surfaces namely, an image-side surface of the negative meniscus lens L2, both surfaces of the biconvex positive lens L4, an image-side surface of the biconvex positive lens L6, and both surfaces of the biconcave negative lens L7.

Figure 25A:
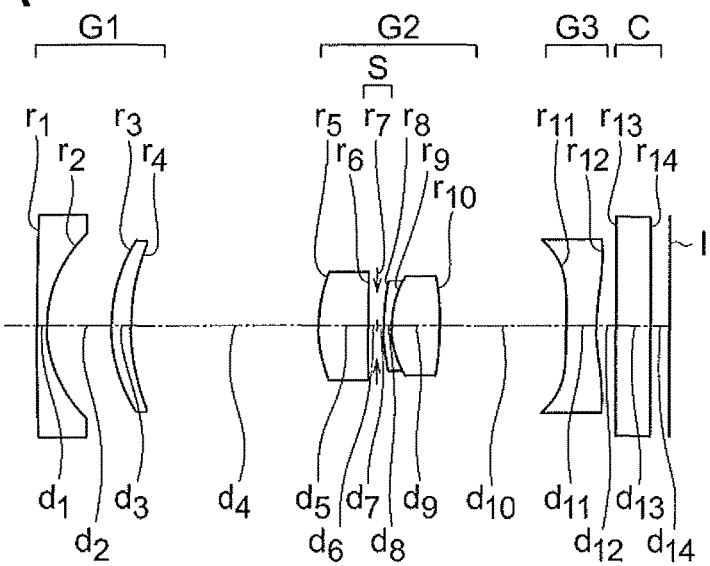
FIG. 25A, FIG. 25B, and FIG. 25C (hereinafter, 'FIG. 25A to FIG. 25C') are cross-sectional views along an optical axis showing an optical arrangement of a zoom lens according to an example 13 at the time of focusing on an infinite object point, where.
Figure 25B:
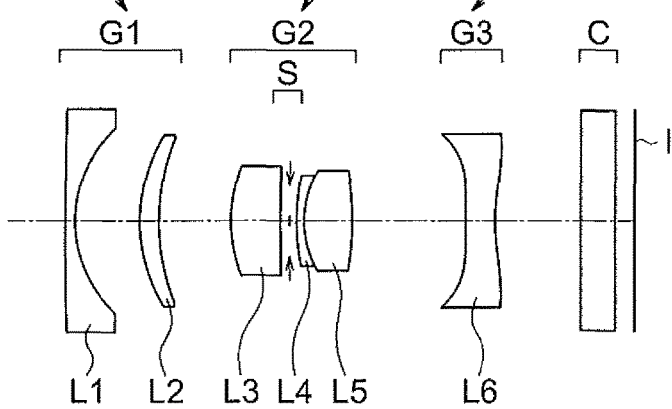
Figure 25C:
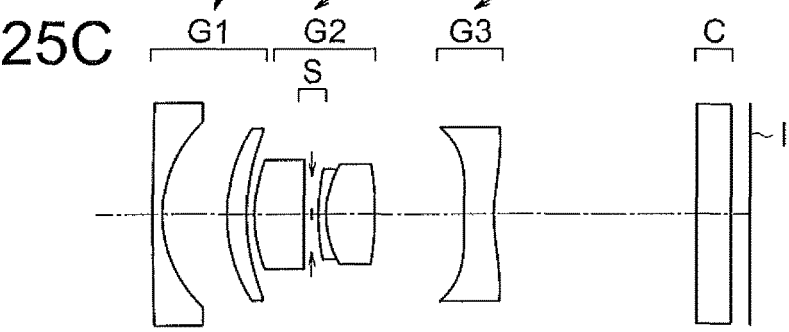

Next, a zoom lens according to an example 13 of the present invention will be described below. FIG. 25A to FIG. 25C are cross-sectional views along an optical axis showing an optical arrangement of the zoom lens according to the example 13 at the time of focusing on an infinite object point. FIG. 26A to FIG. 26L are aberration diagrams of the zoom lens according to the example 13 at the time of focusing on the infinite object point.

The zoom lens of the example 13, as shown in FIG. 25A to FIG. 25C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side and a positive meniscus lens L2 having a convex surface directed toward the object side.

The second lens unit G2 includes a positive meniscus lens L3 having a convex surface directed toward the object side, a negative meniscus lens L4 having a convex surface directed toward the object side, and a biconvex positive lens L5. Here, the negative meniscus lens L4 and the biconvex positive lens L5 are cemented.

The third lens unit G3 includes a negative meniscus lens L6 having a convex surface directed toward the object side.

Moreover, an aperture stop S is disposed in the second lens unit G2. More specifically, the aperture stop S is disposed between the positive meniscus lens L3 and the negative meniscus lens L4.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the negative meniscus lens L6 moves toward the image side.

An aspheric surface is provided to a total of seven surfaces namely, both surfaces of the negative meniscus lens L1, both surfaces of the positive meniscus lens L3, an image-side surface of the biconvex positive lens L5, and both surfaces of the negative meniscus lens L6.

Figure 27A:
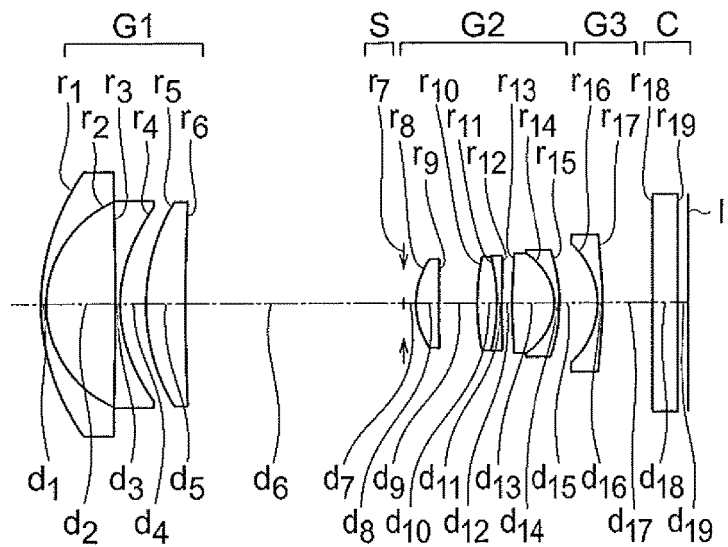
FIG. 27A, FIG. 27B, and FIG. 27C (hereinafter, 'FIG. 27A to FIG. 27C') are cross-sectional views along an optical axis showing an optical arrangement of a zoom lens according to an example 14 at the time of focusing on an infinite object point, where.
Figure 27B:
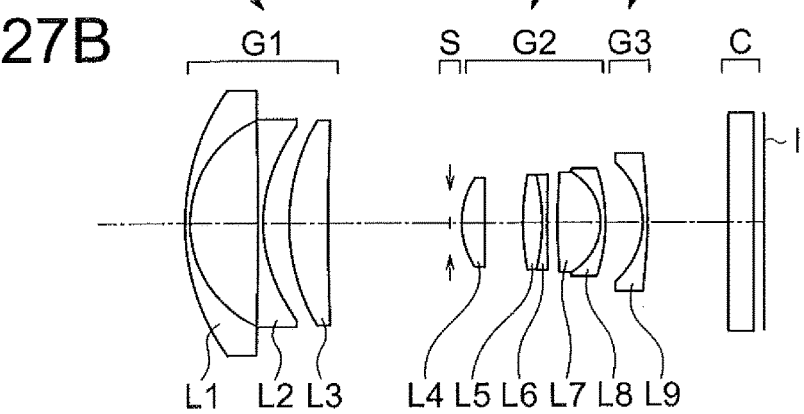
Figure 27C:
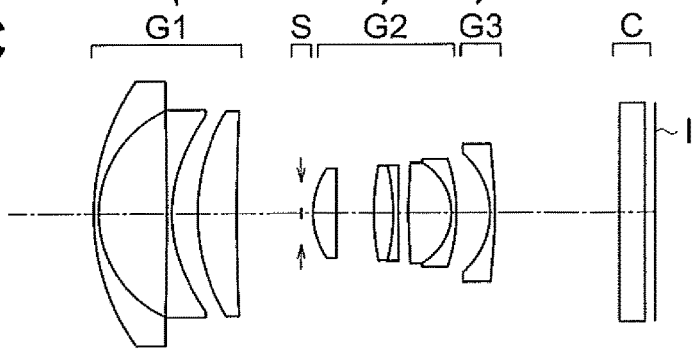

Next, a zoom lens according to an example 14 of the present invention will be described below. FIG. 27A to FIG. 27C are cross-sectional views along an optical axis showing an optical arrangement of the zoom lens according to the example 14 at the time of focusing on an infinite object point. FIG. 28A to FIG. 28L are aberration diagrams of the zoom lens according to the example 14 at the time of focusing on the infinite object point.

The zoom lens of the example 14, as shown in FIG. 27A to FIG. 27C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a biconvex positive lens L5, a biconcave negative lens L6, a biconvex positive lens L7, and a negative meniscus lens L8 having a convex surface directed toward an image side. Here, the biconvex positive lens L5 and the biconcave negative lens L6 are cemented. Moreover, the biconvex positive lens L7 and the negative meniscus lens L8 are cemented.

The third lens unit G3 includes a negative meniscus lens L9 having a convex surface directed toward the image side.

Moreover, an aperture stop S is disposed between the first lens unit G1 and the second lens unit G2. More specifically, the aperture stop S is disposed on the object side of the biconvex positive lens L4 (between the positive meniscus lens L3 and the biconvex positive lens L4).

At the time of zooming, each lens unit moves. At the time of zooming from a wide angle end to a telephoto end, the first lens unit G1 moves toward the image side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the negative meniscus lens L9 moves toward the image side.

An aspheric surface is provided to a total of six surfaces namely, both surfaces of the biconcave negative lens L2, both surfaces of the biconvex positive lens L4, an object-side surface of the biconvex positive lens L7, and an image-side surface of the negative meniscus lens L9.

Figure 29A:
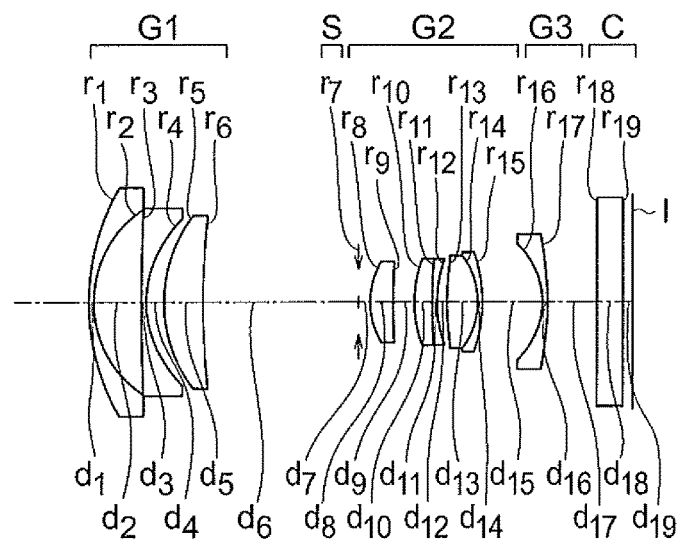
FIG. 29A, FIG. 29B, and FIG. 29C (hereinafter, 'FIG. 29A to FIG. 29C') are cross-sectional views along an optical axis showing an optical arrangement of a zoom lens according to an example 15 at the time of focusing on an infinite object point, where.
Figure 29B:
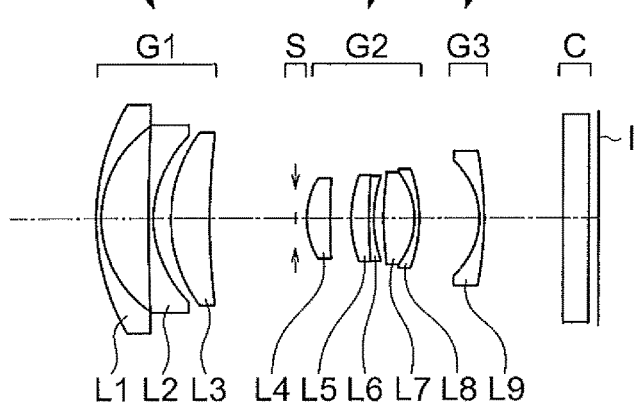
Figure 29C:
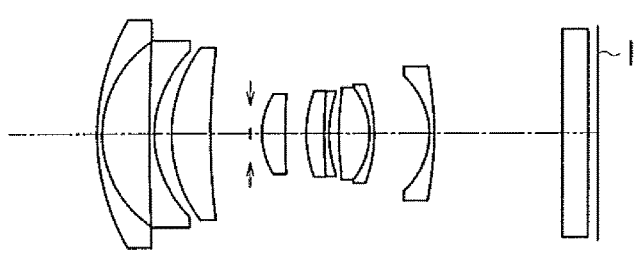

Next, a zoom lens according to an example 15 of the present invention will be described below. FIG. 29A to FIG. 29C are cross-sectional views along an optical axis showing an optical arrangement of the zoom lens according to the example 15 at the time of focusing on an infinite object point. FIG. 30A to FIG. 30L are aberration diagrams of the zoom lens according to the example 15 at the time of focusing on the infinite object point.

The zoom lens of the example 15, as shown in FIG. 29A to FIG. 29C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a negative meniscus lens L2 having a convex surface directed toward the object side, and a positive meniscus lens L3 having a convex surface directed toward the object side.

The second lens unit G2 includes a positive meniscus lens L4 having a convex surface directed toward the object side, a positive meniscus lens L5 having a convex surface directed toward the object side, a negative meniscus lens L6 having a convex surface directed toward the object side, a biconvex positive lens L7, and a negative meniscus lens L8 having a convex surface directed toward an image side. Here, the positive meniscus lens L5 and the negative meniscus lens L6 are cemented. Moreover, the biconvex positive lens L7 and the negative meniscus lens L8 are cemented.

The third lens unit G3 includes a negative meniscus lens L9 having a convex surface directed toward the image side.

Moreover, an aperture stop S is disposed between the first lens unit G1 and the second lens unit G2. More specifically, the aperture stop S is disposed on the object side of the positive meniscus lens L4 (between the positive meniscus lens L3 and the positive meniscus lens L4).

At the time of zooming, each lens unit moves. At the time of zooming from a wide angle end to a telephoto end, the first lens unit G1 moves toward the image side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the negative meniscus lens L9 moves toward the image side.

An aspheric surface is provided to a total of six surfaces namely, both surfaces of the biconcave negative lens L2, both surfaces of the positive meniscus lens L4, an object-side surface of the biconvex positive lens L7, and an image-side surface of the negative meniscus lens L9.

Figure 31A:
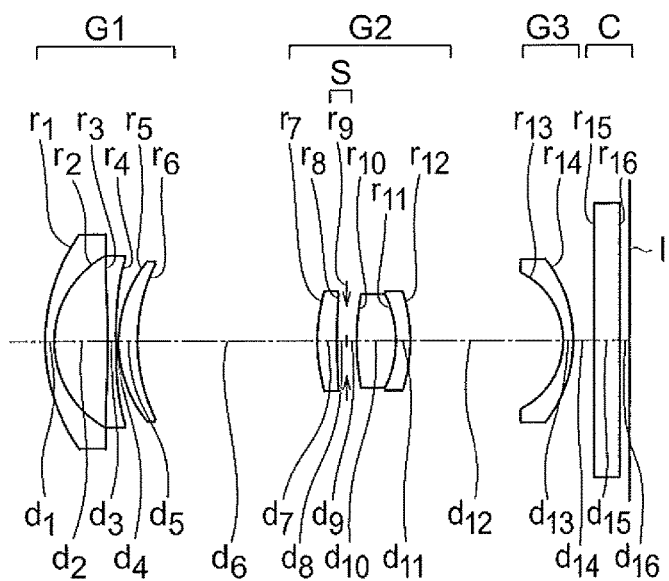
FIG. 31A, FIG. 31B, and FIG. 31C (hereinafter, 'FIG. 31A to FIG. 31C') are cross-sectional views along an optical axis showing an optical arrangement of a zoom lens according to an example 16 at the time of focusing on an infinite object point, where.
Figure 31B:
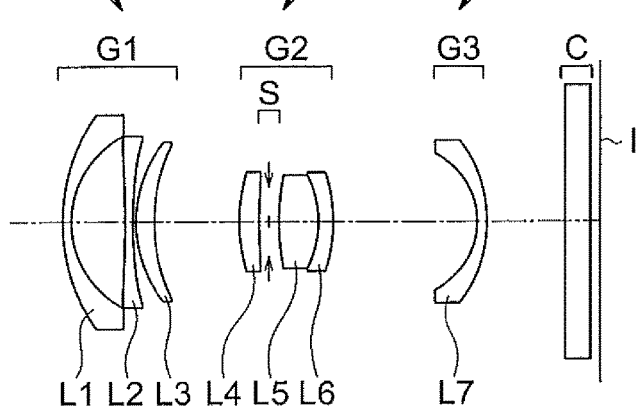
Figure 31C:
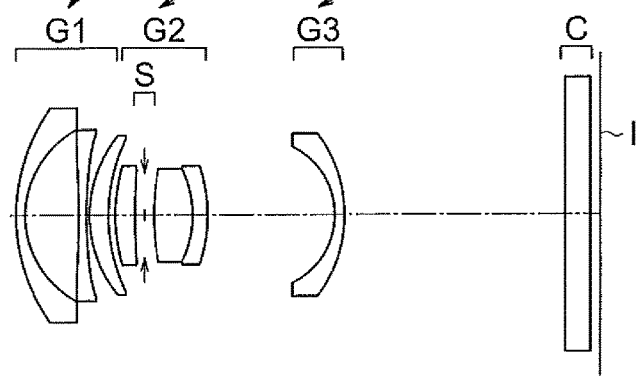

Next, a zoom lens according to an example 16 of the present invention will be described below. FIG. 31A to FIG. 31C are cross-sectional views along an optical axis showing an optical arrangement of the zoom lens according to the example 16 at the time of focusing on an infinite object point. FIG. 32A to FIG. 32L are aberration diagrams of the zoom lens according to the example 16 at the time of focusing on the infinite object point.

The zoom lens of the example 16, as shown in FIG. 31A to FIG. 31C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side, a biconvex positive lens L5, and a negative meniscus lens L6 having a convex surface directed toward an image side. Here, the biconvex positive lens L5 and the negative meniscus lens L6 are cemented.

The third lens unit G3 includes a negative meniscus lens L7 having a convex surface directed toward the image side.

Moreover, an aperture stop S is disposed in the second lens unit. More specifically, the aperture stop S is disposed between the positive meniscus lens L4 and the biconvex positive lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the negative meniscus lens L7 moves toward the image side.

An aspheric surface is provided to a total of seven surfaces namely, both surfaces of the biconcave negative lens L2, both surfaces of the positive meniscus lens L4, an object-side surface of the biconvex positive lens L5, and both surfaces of the negative meniscus lens L7.

Figure 33A:
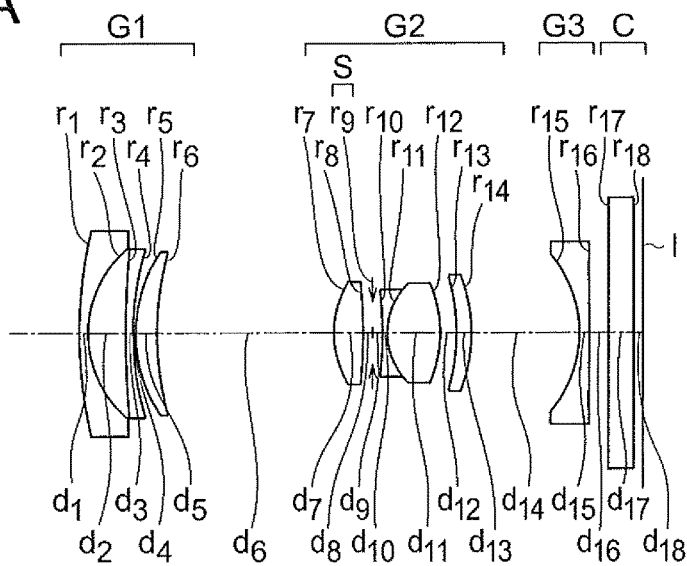
FIG. 33A, FIG. 33B, and FIG. 33C (hereinafter, 'FIG. 33A to FIG. 33C') are cross-sectional views along an optical axis showing an optical arrangement of a zoom lens according to an example 17 at the time of focusing on an infinite object point, where.
Figure 33B:
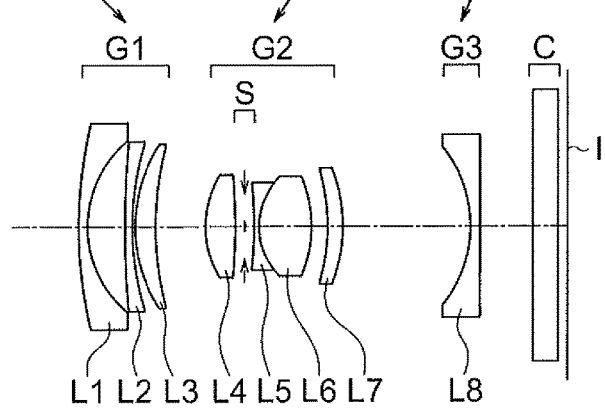
Figure 33C:
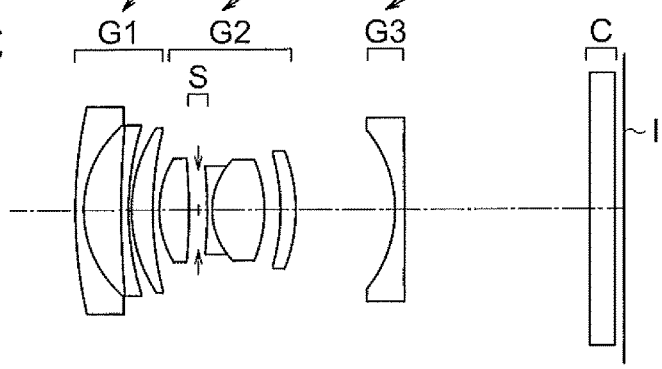

Next, a zoom lens according to an example 17 of the present invention will be described below. FIG. 33A to FIG. 33C are cross-sectional views along an optical axis showing an optical arrangement of the zoom lens according to the example 17 at the time of focusing on an infinite object point. FIG. 34A to FIG. 34L are aberration diagrams of the zoom lens according to the example 17 at the time of focusing on the infinite object point.

The zoom lens of the example 17, as shown in FIG. 33A to FIG. 33C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a negative meniscus lens L2 having a convex surface directed toward the object side, and a positive meniscus lens L3 having a convex surface directed toward the object side.

The second lens unit G2 includes a biconvex positive lens L4, a biconcave negative lens L5, a biconvex positive lens L6, and a positive meniscus lens L7 having a convex surface directed toward an image side. Here, the biconcave negative lens L5 and the biconvex positive lens L6 are cemented.

The third lens unit G3 includes a negative meniscus lens L8 having a convex surface directed toward the image side.

Moreover, an aperture stop S is disposed in the second lens unit G2. More specifically, the aperture stop S is disposed between the biconvex positive lens L4 and the biconcave negative lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the negative meniscus lens L8 moves toward the image side.

An aspheric surface is provided to a total of six surfaces namely, an image-side surface of the negative meniscus lens L2, both surfaces of the biconvex positive lens L4, an image-side surface of the biconvex positive lens L6, and both surfaces of the negative meniscus lens L8.

Figure 35A:
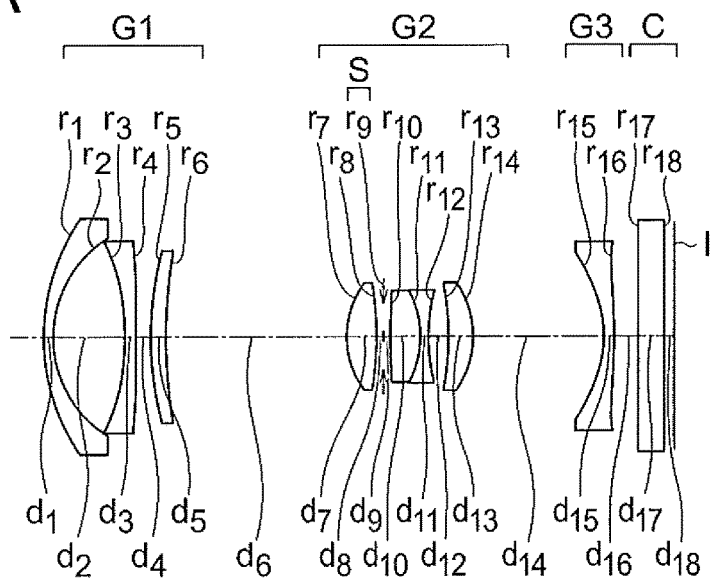
FIG. 35A, FIG. 35B, and FIG. 35C (hereinafter, 'FIG. 35A to FIG. 35B') are cross-sectional views along an optical axis showing an optical arrangement of a zoom lens according to an example 18 at the time of focusing on an infinite object point, where.
Figure 35B:
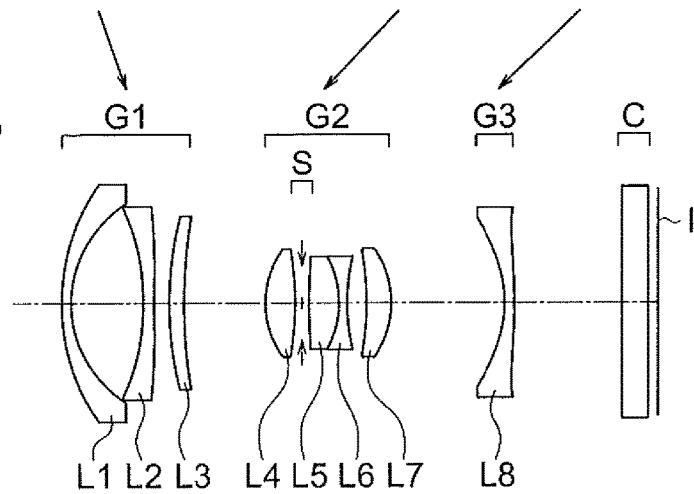
Figure 35C:
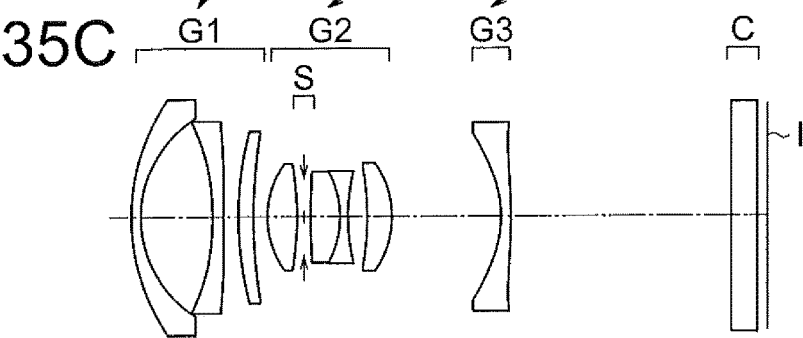

Next, a zoom lens according to an example 18 of the present invention will be described below. FIG. 35A to FIG. 35C are cross-sectional views along an optical axis showing an optical arrangement of the zoom lens according to the example 18 at the time of focusing on an infinite object point. FIG. 36A to FIG. 36L are aberration diagrams of the zoom lens according to the example 18 at the time of focusing on the infinite object point.

The zoom lens of the example 18, as shown in FIG. 35A to FIG. 35C, includes in order from an object side, a first lens unit G1 having a negative refractive power, a second lens unit G2 having a positive refractive power, and a third lens unit G3 having a negative refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a biconvex positive lens L5, a biconcave negative lens L6, and a positive meniscus lens L7 having a convex surface directed toward an image side. Here, the biconvex positive lens L5 and the biconcave negative lens L6 are cemented.

The third lens unit G3 includes a negative meniscus lens L8 having a convex surface directed toward the image side.

Moreover, an aperture stop S is disposed in the second lens unit G2. More specifically, the aperture stop S is disposed between the biconvex positive lens L4 and the biconvex positive lens L5.

At the time of zooming, each lens unit moves. At the time of zooming from a wide angle end to a telephoto end, the first lens unit G1, after moving toward the image side, moves toward the object side. The second lens unit G2 moves toward the object side. The third lens unit G3 moves toward the object side. The aperture stop S moves integrally with the second lens unit G2 toward the object side. In such manner, for the first lens unit G1, when the zooming started from the wide angle end, the direction of movement from a position at the wide angle end is a direction toward the image side.

Moreover, the focusing to an object is carried out by the movement of the third lens unit G3. At the time of focusing from an infinite object point to an object point at a close distance, the negative meniscus lens L8 moves toward the image side.

An aspheric surface is provided to a total of nine surfaces namely, both surfaces of the biconcave negative lens L2, both surfaces of the biconvex positive lens L4, an object-side surface of the biconvex positive lens L5, both surfaces of the positive meniscus lens L7, and both surfaces of the negative meniscus lens L8.

In the examples from the example 1 to the example 8, the third lens unit G3 includes not less than two lenses. Whereas, in the examples from the example 9 to the example 18, the third lens unit G3 includes one lens.

Moreover, at the time of zooming from the wide angle end to the telephoto end, a change in distances between the lenses is as follows.

A distance between the first lens unit and the second lens unit narrows (example 1 to example 18).

A distance between the second lens unit and the third lens unit narrows (example 1, example 2, example 4, example 7, example 8, example 13, example 14, example 16, and example 18).

The distance between the second lens unit and the third lens unit widens and then narrows (example 3, example 9 to example 12, example 15, and example 17).

A distance between the second lens unit and the third lens unit narrows and then widens (example 5 and example 6).

A distance between the third lens unit and the image plane widens (example 1 to example 18).

Next, numerical data of optical components comprising the imaging optical system of each above example are shown. In numerical data of each example, r1, r2, . . . stands for a curvature radius of each lens surface, d1, d2, . . . stands for a thickness of each lens or an air distance between adjacent lens surfaces, nd1, nd2, . . . stands for a refractive index of each lens for d-line, v1, vd2, . . . stands for an Abbe number of each lens, * stands for an aspheric surface. Further, in Zoom data, WE denotes a wide angle end, ST denotes a intermediate focal length state, TE denotes a telephoto end, f denotes a focal length of the overall zoom lens system, Fno. denotes an F number, ω denotes a half angle of view, IH denotes a maximum image height, BF denotes a back focus, each of f1, f2 . . . is a focal length of each lens unit. LTL denotes a lens total length of the optical system. The lens total length is a distance from a frontmost lens surface to the rearmost lens surface plus the back focus. The back focus is a unit which is expressed upon air conversion of a distance from a rearmost lens surface to a paraxial image surface. The image height is a height in a case in which, the distortion is not corrected electrically. The image height, in a case in which, it is presupposed that the distortion is to be corrected electrically, will be described later.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z = (y^2/r)/\left[1 + \{1-(1+k)(y/r)^2\}^{1/2}\right] + A4\,y^4 + A6\,y^6 + A8\,y^8 + A10\,y^{10}$$

Further, in the aspherical surface coefficients, 'e-n' (where, n is an integral number) indicates '$10^{-n}$'. Moreover, these symbols are commonly used in the following numerical data for each example.

EXAMPLE 1

| Unit mm | | | | |
|---|---|---|---|---|
| Surface data | | | | |
| Surface no. | r | d | nd | vd |
| Object plane | ∞ | ∞ | | |
| 1 | −551.041 | 0.80 | 1.80139 | 45.45 |
| 2 | 13.150 | 3.50 | | |
| 3 | 15.705 | 2.59 | 1.63493 | 23.90 |
| 4 | 33.110 | Variable | | |
| 5* | 11.433 | 3.74 | 1.74320 | 49.34 |
| 6* | −35.917 | 1.00 | | |
| 7 (Stop) | ∞ | 1.00 | | |
| 8 | −47.718 | 0.80 | 1.90366 | 31.32 |
| 9 | 8.733 | 4.00 | 1.49700 | 81.61 |
| 10 | −11.341 | Variable | | |
| 11* | −37.072 | 3.30 | 1.63493 | 23.90 |
| 12 | −13.586 | 2.50 | | |
| 13* | −8.492 | 1.00 | 1.53071 | 55.69 |
| 14* | 67.596 | Variable | | |
| 15 | ∞ | 3.00 | 1.51633 | 64.14 |
| 16 | ∞ | 1.00 | | |
| Image plane (Image pickup surface) | ∞ | | | |

Aspherical surface data

5th surface k = 0.000
A4 = −5.74668e−05, A6 = −2.85515e−07

6th surface k = 0.225
A4 = 9.81038e−05, A6 = −9.17744e−08

11th surface k = 0.000
A4 = 5.10472e−06, A6 = 1.06606e−06

13th surface k = 0.000
A4 = 6.39301e−06, A6 = 7.09436e−07

14th surface k = 0.000
A4 = −3.88771e−05, A6 = 1.00042e−06, A8 = −4.58923e−09

| Zoom data Zoom ratio 2.87 | | | |
|---|---|---|---|
| | WE | ST | TE |
| f | 14.79 | 24.93 | 42.52 |
| Fno. | 3.50 | 4.60 | 5.50 |
| 2ω | 81.45 | 48.00 | 29.11 |
| IH | 11.15 | 11.15 | 11.15 |
| BF (in air) | 6.25 | 13.37 | 28.15 |
| LTL (in air) | 51.42 | 47.54 | 54.75 |
| d4 | 15.39 | 5.67 | 0.70 |
| d10 | 5.55 | 4.28 | 1.67 |
| d14 | 3.25 | 10.34 | 25.18 |

| Unit focal length | | |
|---|---|---|
| f1 = −27.08 | f2 = 15.80 | f3 = −27.61 |

EXAMPLE 2

| Unit mm | | | | |
|---|---|---|---|---|
| Surface data | | | | |
| Surface no. | r | d | nd | vd |
| Object plane | ∞ | ∞ | | |
| 1 | 24.241 | 0.80 | 1.80139 | 45.45 |
| 2* | 10.305 | 4.67 | | |
| 3 | 54.715 | 0.80 | 1.72916 | 54.68 |
| 4 | 12.746 | 4.73 | | |
| 5 | 14.608 | 2.00 | 1.84666 | 23.78 |
| 6 | 21.299 | Variable | | |
| 7* | 11.088 | 2.96 | 1.74320 | 49.34 |
| 8* | −24.868 | 1.00 | | |
| 9 (Stop) | ∞ | 1.00 | | |
| 10 | −55.769 | 0.80 | 1.90366 | 31.32 |
| 11 | 8.696 | 3.26 | 1.49700 | 81.61 |
| 12 | −8.898 | Variable | | |
| 13 | −21.306 | 2.30 | 1.63493 | 23.90 |
| 14 | −18.159 | 3.05 | | |
| 15* | −6.991 | 1.00 | 1.53071 | 55.69 |
| 16* | −16.979 | Variable | | |
| 17 | ∞ | 3.00 | 1.51633 | 64.14 |
| 18 | ∞ | 1.00 | | |
| Image plane (Image pickup surface) | ∞ | | | |

Aspherical surface data

2nd surface $k = 0.000$
$A4 = -3.94816e-06, A6 = -3.59209e-08$

7th surface $k = 0.000$
$A4 = -1.48954e-04, A6 = -1.15798e-06$

8th surface $k = 0.225$
$A4 = 1.19934e-04, A6 = -7.57507e-07$

15th surface $k = 0.000$
$A4 = 7.84266e-05, A6 = 1.28333e-06$

16th surface $k = 0.000$
$A4 = 1.40842e-04$

Zoom data
Zoom ratio 2.00

| | WE | ST | TE |
|---|---|---|---|
| f | 9.08 | 13.15 | 18.16 |
| Fno. | 3.60 | 4.80 | 5.80 |
| 2ω | 112.14 | 82.40 | 63.17 |
| IH | 11.15 | 11.15 | 11.15 |
| BF (in air) | 4.32 | 7.75 | 12.70 |
| LTL (in air) | 47.27 | 44.59 | 45.50 |
| d6 | 9.97 | 4.07 | 0.70 |
| d12 | 4.61 | 4.42 | 3.74 |
| d16 | 1.34 | 4.77 | 9.73 |

Unit focal length

| f1 = −15.08 | f2 = 12.19 | f3 = −26.63 |
|---|---|---|

EXAMPLE 3

Unit mm

Surface data

| Surface no. | r | d | nd | vd |
|---|---|---|---|---|
| Object plane | ∞ | ∞ | | |
| 1 | 75.995 | 0.90 | 1.83481 | 42.71 |
| 2 | 12.696 | 4.10 | | |
| 3 | −42.060 | 0.80 | 1.72916 | 54.68 |
| 4 | −95.241 | 0.30 | | |
| 5 | 20.768 | 2.18 | 1.84666 | 23.78 |
| 6 | 47.496 | Variable | | |
| 7* | 10.820 | 3.46 | 1.74320 | 49.34 |
| 8* | −57.210 | 1.00 | | |
| 9 (Stop) | ∞ | 1.00 | | |
| 10 | −139.774 | 0.80 | 1.90366 | 31.32 |
| 11 | 7.933 | 3.72 | 1.49700 | 81.61 |
| 12 | −13.585 | Variable | | |
| 13 | −18.820 | 2.34 | 1.63493 | 23.90 |
| 14 | −10.810 | 2.50 | | |
| 15* | −8.315 | 1.00 | 1.53071 | 55.69 |
| 16* | −147.917 | Variable | | |
| 17 | ∞ | 4.00 | 1.51633 | 64.14 |
| 18 | ∞ | 2.10 | | |
| Image plane (Image pickup surface) | ∞ | | | |

Aspherical surface data

7th surface k = 0.000
A4 = −5.01016e−05, A6 = −6.21902e−08

8th surface k = 0.225
A4 = 8.77419e−05, A6 = 7.86763e−08

15th surface k = 0.000
A4 = −1.34322e−05, A6 = 2.52661e−07

16th surface k = 0.000
A4 = 2.46540e−06

Zoom data
Zoom ratio 2.86

| | WE | ST | TE |
|---|---|---|---|
| f | 14.53 | 24.63 | 41.56 |
| Fno. | 3.67 | 4.29 | 5.74 |
| 2ω | 82.38 | 48.48 | 29.79 |
| IH | 11.15 | 11.15 | 11.15 |
| BF (in air) | 8.48 | 13.99 | 29.27 |
| LTL (in air) | 56.18 | 49.50 | 56.58 |
| d6 | 18.64 | 6.09 | 0.70 |
| d12 | 4.97 | 5.32 | 2.51 |
| d16 | 3.74 | 9.25 | 24.53 |

Unit focal length

| f1 = −27.00 | f2 = 16.19 | f3 = −32.22 |
|---|---|---|

EXAMPLE 4

Unit mm

Surface data

| Surface no. | r | d | nd | vd |
|---|---|---|---|---|
| Object plane | ∞ | ∞ | | |
| 1 | 91.218 | 0.90 | 1.83481 | 42.71 |
| 2 | 12.968 | 3.94 | | |
| 3 | −46.843 | 0.80 | 1.74400 | 44.78 |
| 4 | −175.156 | 0.30 | | |
| 5 | 21.108 | 2.23 | 1.84666 | 23.78 |
| 6 | 52.526 | Variable | | |
| 7* | 11.043 | 3.28 | 1.74320 | 49.34 |
| 8* | −34.008 | 1.00 | | |
| 9 (Stop) | ∞ | 1.00 | | |
| 10 | 45.295 | 0.80 | 1.90366 | 31.32 |
| 11 | 6.269 | 2.67 | 1.49700 | 81.61 |
| 12 | 23.223 | 0.70 | | |
| 13* | −40.000 | 1.37 | 1.55332 | 71.68 |
| 14* | −10.491 | Variable | | |
| 15* | −18.748 | 2.28 | 1.63493 | 23.90 |
| 16 | −11.691 | 2.43 | | |
| 17 | −7.378 | 1.00 | 1.53071 | 55.69 |
| 18* | −36.701 | Variable | | |
| 19 | ∞ | 4.00 | 1.51633 | 64.14 |
| 20 | ∞ | 2.10 | | |
| Image plane (Image pickup surface) | ∞ | | | |

Aspherical surface data

7th surface k = −0.355
A4 = −7.41084e−05, A6 = −1.24732e−07

8th surface k = 0.000
A4 = 9.61924e−05

13th surface k = 0.000
A4 = 1.66347e−04, A6 = 1.70320e−05

14th surface k = 0.000
A4 = 6.32014e−05, A6 = 1.17813e−05

15th surface k = 0.000
A4 = 7.21867e−05, A6 = 1.64539e−06

18th surface k = 0.000
A4 = −4.12494e−05, A6 = 1.00733e−07

Zoom data
Zoom ratio 2.89

| | WE | ST | TE |
|---|---|---|---|
| f | 14.27 | 24.24 | 41.18 |
| Fno. | 3.55 | 4.61 | 5.96 |
| 2ω | 83.40 | 49.94 | 30.20 |
| IH | 11.15 | 11.15 | 11.15 |
| BF (in air) | 6.96 | 14.10 | 28.35 |
| LTL (in air) | 53.12 | 48.86 | 55.59 |
| d6 | 16.74 | 6.21 | 0.70 |

-continued

| Unit mm | | | |
|---|---|---|---|
| d14 | 4.74 | 3.87 | 1.85 |
| d18 | 2.21 | 9.35 | 23.60 |

| Unit focal length | | |
|---|---|---|
| f1 = −25.74 | f2 = 15.54 | f3 = −29.84 |

EXAMPLE 5

| Unit mm | | | |
|---|---|---|---|
| Surface data | | | |
| Surface no. | r | d | nd | vd |
| Object plane | ∞ | ∞ | | |
| 1 | 35.385 | 0.90 | 1.83481 | 42.71 |
| 2 | 12.341 | 5.74 | | |
| 3 | −25.770 | 0.80 | 1.81600 | 46.62 |
| 4 | −51.770 | 0.30 | | |
| 5 | 23.925 | 1.68 | 1.92286 | 18.90 |
| 6 | 40.000 | Variable | | |
| 7* | 12.836 | 3.06 | 1.69350 | 53.21 |
| 8* | −50.586 | 1.00 | | |
| 9 (Stop) | ∞ | 1.00 | | |
| 10 | 14.521 | 1.71 | 1.56732 | 42.82 |
| 11 | −24.798 | 1.26 | 1.84666 | 23.78 |
| 12 | 15.438 | 2.36 | | |
| 13 | 41.575 | 1.00 | 1.88300 | 40.76 |
| 14 | 8.780 | 2.32 | 1.57501 | 41.50 |
| 15 | −14.868 | Variable | | |
| 16* | −25.316 | 1.23 | 1.63493 | 23.90 |
| 17 | −15.397 | 2.00 | | |
| 18 | −8.948 | 1.00 | 1.53071 | 55.69 |
| 19* | 3523.421 | Variable | | |
| 20 | ∞ | 4.00 | 1.51633 | 64.14 |
| 21 | ∞ | 2.10 | | |
| Image plane (Image pickup surface) | ∞ | | | |

Aspherical surface data

7th surface k = −1.197
A4 = 3.41103e−05, A6 = 1.74365e−07

8th surface k = 0.000
A4 = 4.42108e−05

16th surface k = 0.000
A4 = −1.10160e−04, A6 = −7.45198e−07

19th surface k = 0.000
A4 = −1.84016e−04, A6 = 1.79808e−07

Zoom data
Zoom ratio 2.89

| | WE | ST | TE |
|---|---|---|---|
| f | 14.28 | 24.27 | 41.24 |
| Fno. | 3.83 | 4.99 | 6.29 |
| 2ω | 83.35 | 50.01 | 30.07 |
| IH | 11.15 | 11.15 | 11.15 |

-continued

| Unit mm | | | |
|---|---|---|---|
| BF (in air) | 6.75 | 13.07 | 23.20 |
| LTL (in air) | 54.63 | 51.22 | 55.64 |
| d6 | 16.17 | 6.58 | 0.70 |
| d15 | 4.34 | 4.19 | 4.37 |
| d19 | 1.99 | 8.30 | 18.39 |

| Unit focal length | | |
|---|---|---|
| f1 = −23.48 | f2 = 15.48 | f3 = −24.01 |

EXAMPLE 6

| Unit mm | | | |
|---|---|---|---|
| Surface data | | | |
| Surface no. | r | d | nd | vd |
| Object plane | ∞ | ∞ | | |
| 1 | 36.397 | 0.90 | 1.83481 | 42.71 |
| 2 | 11.944 | 5.12 | | |
| 3 | −33.318 | 0.80 | 1.81600 | 46.62 |
| 4 | −104.401 | 0.30 | | |
| 5 | 22.063 | 1.84 | 1.92286 | 18.90 |
| 6 | 40.000 | Variable | | |
| 7* | 11.402 | 3.12 | 1.69350 | 53.21 |
| 8* | −71.319 | 1.00 | | |
| 9 (Stop) | ∞ | 1.00 | | |
| 10 | 16.989 | 1.61 | 1.56732 | 42.82 |
| 11 | −25.938 | 1.00 | 1.84666 | 23.78 |
| 12 | 11.990 | 0.72 | | |
| 13 | 27.742 | 1.00 | 1.88300 | 40.76 |
| 14 | 10.876 | 2.04 | 1.57501 | 41.50 |
| 15 | −14.549 | Variable | | |
| 16* | −28.917 | 2.32 | 1.63493 | 23.90 |
| 17 | −15.000 | 2.00 | | |
| 18 | −8.044 | 0.80 | 1.53071 | 55.69 |
| 19 | −20.001 | 0.85 | | |
| 20 | −13.068 | 1.00 | 1.53071 | 55.69 |
| 21* | −29.347 | Variable | | |
| 22 | ∞ | 4.00 | 1.51633 | 64.14 |
| 23 | ∞ | 2.10 | | |
| Image plane (Image pickup surface) | ∞ | | | |

Aspherical surface data

7th surface k = −1.171
A4 = 3.90034e−05, A6 = 2.47055e−07

8th surface k = 0.000
A4 = 5.76059e−05

16th surface k = 0.000
A4 = 5.40447e−05, A6 = −2.66457e−07

21th surface k = 0.000
A4 = −2.61663e−05, A6 = −2.68337e−07

Zoom data
Zoom ratio 2.89

| | WE | ST | TE |
|---|---|---|---|
| f | 14.28 | 24.26 | 41.23 |
| Fno. | 3.78 | 4.91 | 6.20 |
| 2ω | 83.35 | 50.09 | 30.14 |

EXAMPLE 7 (continued)

Unit mm

| | | | |
|---|---|---|---|
| IH | 11.15 | 11.15 | 11.15 |
| BF (in air) | 6.61 | 12.95 | 23.39 |
| LTL (in air) | 54.54 | 51.00 | 55.63 |
| d6 | 16.39 | 6.59 | 0.70 |
| d15 | 4.11 | 4.03 | 4.12 |
| d21 | 1.85 | 8.18 | 18.60 |

Unit focal length

| | | |
|---|---|---|
| f1 = −23.45 | f2 = 15.03 | f3 = −25.60 |

EXAMPLE 7

Unit mm

Surface data

| Surface no. | r | d | nd | νd |
|---|---|---|---|---|
| Object plane | ∞ | ∞ | | |
| 1 | 40.000 | 0.90 | 1.83481 | 42.71 |
| 2 | 12.636 | 4.54 | | |
| 3 | −29.146 | 0.80 | 1.91082 | 35.25 |
| 4 | −64.993 | 0.30 | | |
| 5 | 23.143 | 1.93 | 1.92286 | 18.90 |
| 6 | 45.612 | Variable | | |
| 7* | 10.800 | 3.31 | 1.58313 | 59.38 |
| 8* | −35.588 | 1.00 | | |
| 9 (Stop) | ∞ | 1.00 | | |
| 10 | 14.449 | 1.59 | 1.55332 | 71.68 |
| 11 | −34.089 | 1.01 | 1.90366 | 31.32 |
| 12 | 11.691 | 1.50 | | |
| 13 | −30.368 | 1.44 | 1.58313 | 59.38 |
| 14* | −9.367 | Variable | | |
| 15* | −18.814 | 2.00 | 1.63493 | 23.90 |
| 16 | −12.000 | 2.50 | | |
| 17 | −9.000 | 1.00 | 1.53071 | 55.69 |
| 18* | −542.769 | Variable | | |
| 19 | ∞ | 4.00 | 1.51633 | 64.14 |
| 20 | ∞ | 2.10 | | |
| Image plane (Image pickup surface) | ∞ | | | |

Aspherical surface data

7th surface k = −2.544
A4 = 1.76956e−04, A6 = −3.66344e−07
8th surface k = 0.000
A4 = 1.25692e−04
14th surface k = 0.000
A4 = 1.00086e−04, A6 = 1.40362e−07
15th surface k = 0.000
A4 = −1.72491e−05, A6 = −1.12951e−06
18th surface k = 0.000
A4 = −1.14712e−04, A6 = 1.20103e−07

Unit mm

Zoom data
Zoom ratio 2.89

| | WE | ST | TE |
|---|---|---|---|
| f | 14.28 | 24.26 | 41.23 |
| Fno. | 3.62 | 4.75 | 6.05 |
| 2ω | 83.36 | 50.18 | 30.15 |
| IH | 11.15 | 11.15 | 11.15 |
| BF (in air) | 6.94 | 14.65 | 27.37 |
| LTL (in air) | 52.69 | 49.73 | 55.64 |
| d6 | 15.85 | 6.40 | 0.70 |
| d14 | 5.08 | 3.86 | 2.75 |
| d18 | 2.18 | 9.88 | 22.56 |

Unit focal length

| | | |
|---|---|---|
| f1 = −24.74 | f2 = 15.34 | f3 = −27.84 |

EXAMPLE 8

Unit mm

Surface data

| Surface no. | r | d | nd | νd |
|---|---|---|---|---|
| Object plane | ∞ | ∞ | | |
| 1 | 117.050 | 0.90 | 1.88300 | 40.76 |
| 2 | 12.212 | 2.40 | | |
| 3* | 16.695 | 0.90 | 1.80610 | 40.92 |
| 4* | 12.542 | 0.30 | | |
| 5 | 13.485 | 3.37 | 1.84666 | 23.78 |
| 6 | 29.029 | Variable | | |
| 7* | 10.343 | 3.57 | 1.74320 | 49.34 |
| 8* | −32.075 | 1.00 | | |
| 9 (Stop) | ∞ | 1.00 | | |
| 10 | −23.131 | 0.75 | 1.90366 | 31.32 |
| 11 | 9.543 | 3.44 | 1.49700 | 81.61 |
| 12* | −8.787 | Variable | | |
| 13 | −18.853 | 4.51 | 1.63493 | 23.90 |
| 14* | −10.000 | 2.50 | | |
| 15* | −7.428 | 1.00 | 1.53071 | 55.69 |
| 16* | −779.506 | Variable | | |
| 17 | ∞ | 2.60 | 1.51633 | 64.14 |
| 18 | ∞ | 1.00 | | |
| Image plane (Image pickup surface) | ∞ | | | |

Aspherical surface data

3rd surface k = 0.000
A4 = −3.06144e−04, A6 = 2.45708e−06
4th surface k = 0.000
A4 = −3.38458e−04, A6 = 2.53398e−06
7th surface k = 0.000
A4 = −4.80378e−05, A6 = −5.64884e−07
8th surface k = 0.225
A4 = 1.43751e−04, A6 = −2.86304e−07

Unit mm

12th surface k = 0.000
A4 = 1.03622e−04, A6 = 9.15213e−07

14th surface k = 0.000
A4 = 1.34838e−04, A6 = 4.46037e−08

15th surface k = 0.000
A4 = 2.61427e−04, A6 = 2.38873e−07

16th surface k = 0.000
A4 = −8.80804e−05

Zoom data
Zoom ratio 3.82

|  | WE | ST | TE |
|---|---|---|---|
| f | 12.85 | 26.16 | 49.07 |
| Fno. | 3.63 | 5.00 | 6.50 |
| 2ω | 88.94 | 46.83 | 25.34 |
| IH | 11.00 | 11.00 | 11.00 |
| BF (in air) | 4.49 | 16.97 | 35.88 |
| LTL (in air) | 51.47 | 50.95 | 63.11 |
| d6 | 15.59 | 5.74 | 0.70 |
| d12 | 5.74 | 2.59 | 0.88 |
| d16 | 1.77 | 14.26 | 33.17 |

Unit focal length

| f1 = −22.74 | f2 = 14.39 | f3 = −28.33 |
|---|---|---|

EXAMPLE 9

Unit mm

Surface data

| Surface no. | r | d | nd | vd |
|---|---|---|---|---|
| Object plane | ∞ | ∞ | | |
| 1 | 65.557 | 0.90 | 1.94595 | 17.98 |
| 2 | 16.718 | 5.06 | | |
| 3* | −88.240 | 0.90 | 1.80610 | 40.92 |
| 4* | 23.101 | 0.65 | | |
| 5 | 19.838 | 4.28 | 1.94595 | 17.98 |
| 6 | 418.035 | Variable | | |
| 7* | 9.538 | 3.67 | 1.49700 | 81.61 |
| 8* | −309.161 | 0.50 | | |
| 9 | 140.536 | 1.80 | 1.49700 | 81.61 |
| 10 | −22.276 | 0.90 | 2.00069 | 25.46 |
| 11 | −36.252 | 1.00 | | |
| 12 (Stop) | ∞ | 2.88 | | |
| 13* | −637.823 | 3.85 | 1.58313 | 59.38 |
| 14 | −5.509 | 0.92 | 1.80610 | 40.92 |
| 15 | −21.738 | Variable | | |
| 16 | −8.200 | 1.82 | 1.49700 | 81.61 |
| 17* | −29.073 | Variable | | |
| 18 | ∞ | 2.60 | 1.51633 | 64.14 |
| 19 | ∞ | 1.00 | | |
| Image plane (Image pickup surface) | ∞ | | | |

Unit mm

Aspherical surface data

3rd surface k = 0.000
A4 = −3.65510e−06, A6 = 1.89251e−07,
A8 = −1.82841e−10

4th surface k = 0.000
A4 = 1.46909e−05, A6 = 2.29144e−07

7th surface k = 0.000
A4 = −3.79449e−05, A6 = −7.96296e−08

8th surface k = 0.000
A4 = 8.31258e−05, A6 = 1.97382e−07

13th surface k = 0.000
A4 = 6.79418e−05, A6 = 4.59739e−06,
A8 = −2.48651e−07, A10 = 1.16932e−08

17th surface k = 0.000
A4 = −3.91665e−06, A6 = 1.16045e−07

Zoom data
Zoom ratio 2.88

|  | WE | ST | TE |
|---|---|---|---|
| f | 14.19 | 24.14 | 40.84 |
| Fno. | 3.63 | 4.61 | 5.77 |
| 2ω | 83.20 | 49.19 | 29.87 |
| IH | 11.00 | 11.00 | 11.00 |
| BF (in air) | 4.45 | 9.45 | 19.67 |
| LTL (in air) | 64.61 | 57.16 | 60.26 |
| d6 | 21.85 | 8.76 | 2.00 |
| d15 | 9.18 | 9.82 | 9.46 |
| d17 | 1.74 | 6.70 | 16.99 |

Unit focal length

| f1 = −26.91 | f2 = 17.46 | f3 = −23.67 |
|---|---|---|

EXAMPLE 10

Unit mm

Surface data

| Surface no. | r | d | nd | vd |
|---|---|---|---|---|
| Object plane | ∞ | ∞ | | |
| 1 | 88.057 | 0.90 | 1.94595 | 17.98 |
| 2 | 18.425 | 5.03 | | |
| 3* | −91.203 | 0.90 | 1.80610 | 40.92 |
| 4* | 23.802 | 0.73 | | |
| 5 | 21.263 | 4.36 | 1.94595 | 17.98 |
| 6 | 453.435 | Variable | | |
| 7* | 9.075 | 4.00 | 1.49700 | 81.61 |
| 8* | 30.835 | 0.50 | | |
| 9 | 17.493 | 2.81 | 1.49700 | 81.61 |
| 10 | −39.971 | 1.50 | 2.00069 | 25.46 |
| 11 | −110.808 | 2.21 | | |
| 12 (Stop) | ∞ | 1.11 | | |
| 13* | 202.050 | 2.57 | 1.58313 | 59.38 |
| 14 | −5.693 | 0.90 | 1.80610 | 40.92 |
| 15 | −28.174 | Variable | | |
| 16 | −8.200 | 0.90 | 1.49700 | 81.61 |

-continued

| Unit mm | | | | |
|---|---|---|---|---|
| 17* | −27.873 | Variable | | |
| 18 | ∞ | 2.60 | 1.51633 | 64.14 |
| 19 | ∞ | 1.00 | | |
| Image plane (Image pickup surface) | ∞ | | | |

Aspherical surface data

3rd surface k = 0.000
A4 = −1.59276e−05, A6 = 1.99652e−07,
A8 = −8.25523e−11
4th surface k = 0.000
A4 = 4.04778e−07, A6 = 2.43332e−07
7th surface k = 0.000
A4 = −2.55059e−05, A6 = 8.52278e−08
8th surface k = 0.000
A4 = 9.22418e−05, A6 = 8.19004e−07
13th surface k = 0.000
A4 = −1.18119e−05, A6 = 2.82565e−06,
A8 = −2.01219e−07, A10 = 9.46323e−09
17th surface k = 0.000
A4 = −3.66290e−06, A6 = 2.52548e−07

Zoom data
Zoom ratio 2.87

| | WE | ST | TE |
|---|---|---|---|
| f | 14.23 | 24.17 | 40.81 |
| Fno. | 3.63 | 4.60 | 5.78 |
| 2ω | 82.99 | 49.05 | 29.86 |
| IH | 11.00 | 11.00 | 11.00 |
| BF (in air) | 4.74 | 9.76 | 19.71 |
| LTL (in air) | 62.64 | 56.03 | 59.23 |
| d6 | 20.56 | 8.40 | 2.00 |
| d15 | 8.92 | 9.46 | 9.11 |
| d17 | 2.00 | 7.00 | 17.06 |

Unit focal length

| f1 = −26.46 | f2 = 17.07 | f3 = −23.74 |
|---|---|---|

EXAMPLE 11

| Unit mm | | | | |
|---|---|---|---|---|
| Surface data | | | | |
| Surface no. | r | d | nd | vd |
| Object plane | ∞ | ∞ | | |
| 1 | 46.800 | 0.50 | 1.94595 | 17.98 |
| 2 | 15.484 | 6.59 | | |
| 3* | −70.372 | 0.50 | 1.80610 | 40.92 |
| 4* | 21.155 | 0.67 | | |
| 5 | 19.609 | 4.41 | 1.94595 | 17.98 |
| 6 | 421.341 | Variable | | |
| 7* | 8.308 | 4.00 | 1.49700 | 81.61 |
| 8* | 35.848 | 0.50 | | |
| 9 | 25.929 | 2.12 | 1.49700 | 81.61 |

-continued

| Unit mm | | | | |
|---|---|---|---|---|
| 10 | −33.929 | 0.50 | 2.00069 | 25.46 |
| 11 | −83.621 | 1.00 | | |
| 12 (Stop) | ∞ | 1.32 | | |
| 13* | 258.544 | 3.92 | 1.58313 | 59.38 |
| 14 | −5.220 | 0.50 | 1.80610 | 40.92 |
| 15 | −23.925 | Variable | | |
| 16 | −8.200 | 0.50 | 1.49700 | 81.61 |
| 17* | −24.601 | Variable | | |
| 18 | ∞ | 2.60 | 1.51633 | 64.14 |
| 19 | ∞ | 1.00 | | |
| Image plane (Image pickup surface) | ∞ | | | |

Aspherical surface data

3rd surface k = 0.000
A4 = −8.08236e−06, A6 = 2.03954e−07,
A8 = −1.46805e−10
4th surface k = 0.000
A4 = 5.21886e−06, A6 = 2.45894e−07
7th surface k = 0.000
A4 = −3.82772e−05, A6 = 1.95822e−08
8th surface k = 0.000
A4 = 1.05719e−04, A6 = 1.08481e−06
13th surface k = 0.000
A4 = 5.43769e−06, A6 = 4.60911e−06,
A8 = −2.76062e−07, A10 = 1.31726e−08
17th surface k = 0.000
A4 = 5.82550e−06, A6 = 2.39336e−07

Zoom data
Zoom ratio 3.80

| | WE | ST | TE |
|---|---|---|---|
| f | 12.00 | 23.34 | 45.60 |
| Fno. | 3.63 | 5.00 | 6.50 |
| 2ω | 95.02 | 50.61 | 26.94 |
| IH | 11.00 | 11.00 | 11.00 |
| BF (in air) | 4.09 | 10.89 | 26.27 |
| LTL (in air) | 65.11 | 57.44 | 65.11 |
| d6 | 23.62 | 8.88 | 2.00 |
| d15 | 10.37 | 10.64 | 9.81 |
| d17 | 1.37 | 8.17 | 23.56 |

Unit focal length

| f1 = −23.85 | f2 = 17.04 | f3 = −25.00 |
|---|---|---|

EXAMPLE 12

| Unit mm | | | | |
|---|---|---|---|---|
| Surface data | | | | |
| Surface no. | r | d | nd | vd |
| Object plane | ∞ | ∞ | | |
| 1 | 27.094 | 0.90 | 1.83481 | 42.71 |
| 2 | 11.068 | 6.31 | | |

-continued

Unit mm

| | | | | |
|---|---|---|---|---|
| 3 | 99.417 | 0.80 | 1.69350 | 53.21 |
| 4* | 26.511 | 0.30 | | |
| 5 | 14.608 | 2.06 | 1.84666 | 23.78 |
| 6 | 23.879 | Variable | | |
| 7* | 16.593 | 2.35 | 1.74320 | 49.34 |
| 8* | −87.839 | 1.00 | | |
| 9 (Stop) | ∞ | 1.00 | | |
| 10 | −145.110 | 0.50 | 1.90366 | 31.32 |
| 11 | 14.609 | 6.00 | 1.49700 | 81.61 |
| 12* | −10.567 | Variable | | |
| 13* | −18.965 | 1.00 | 1.49700 | 81.61 |
| 14* | 76.293 | Variable | | |
| 15 | ∞ | 2.60 | 1.51633 | 64.14 |
| 16 | ∞ | 1.00 | | |
| Image plane (Image pickup surface) | ∞ | | | |

Aspherical surface data

4th surface k = 0.000
A4 = 8.47912e−06, A6 = −1.12132e−07

7th surface k = 0.000
A4 = −3.30283e−05, A6 = −9.72677e−07

8th surface k = 0.225
A4 = 8.11974e−05, A6 = −3.81815e−07

12th surface k = 0.000
A4 = 2.93225e−05, A6 = 3.85869e−08

13th surface k = 0.000
A4 = −2.03079e−04, A6 = −1.12783e−06

14th surface k = 0.000
A4 = −1.27285e−04

Zoom data
Zoom ratio 2.57

| | WE | ST | TE |
|---|---|---|---|
| f | 14.07 | 16.45 | 36.20 |
| Fno. | 3.63 | 4.60 | 5.78 |
| 2ω | 83.05 | 70.80 | 33.35 |
| IH | 11.00 | 11.00 | 11.00 |
| BF (in air) | 4.89 | 5.27 | 22.94 |
| LTL (in air) | 58.61 | 54.94 | 58.24 |
| d6 | 16.06 | 11.04 | 0.70 |
| d12 | 15.45 | 16.41 | 12.39 |
| d14 | 2.17 | 2.55 | 20.23 |

Unit focal length

| f1 = −25.90 | f2 = 17.04 | f3 = −30.46 |
|---|---|---|

EXAMPLE 13

Unit mm

Surface data

| Surface no. | r | d | nd | vd |
|---|---|---|---|---|
| Object plane | ∞ | ∞ | | |
| 1* | 611.551 | 1.00 | 1.76802 | 49.24 |
| 2* | 13.100 | 6.59 | | |
| 3 | 17.000 | 2.00 | 2.00069 | 25.46 |
| 4 | 23.343 | Variable | | |
| 5* | 15.056 | 5.08 | 1.55332 | 71.68 |
| 6* | 219.586 | 0.92 | | |
| 7 (Stop) | ∞ | 0.70 | | |
| 8 | 24.013 | 0.80 | 1.90366 | 31.32 |
| 9 | 10.356 | 4.96 | 1.59201 | 67.02 |
| 10* | −32.348 | Variable | | |
| 11* | 139.170 | 3.07 | 1.61881 | 63.85 |
| 12* | 19.706 | Variable | | |
| 13 | ∞ | 3.50 | 1.51633 | 64.14 |
| 14 | ∞ | 2.00 | | |
| Image plane (Image pickup surface) | ∞ | | | |

Aspherical surface data

1st surface k = 0.000
A4 = 3.16538e−06

2nd surface k = 0.000
A4 = −1.23207e−05, A6 = 1.18638e−07,
A8 = −1.20000e−09

5th surface k = 0.000
A4 = −5.96405e−05, A6 = −3.71724e−07

6th surface k = 0.000
A4 = −4.07130e−06, A6 = −1.06665e−07,
A8 = −3.99991e−09

10th surface k = 0.000
A4 = −1.86001e−05

11th surface k = −50.000
A4 = −4.34806e−04, A6 = −4.86730e−07,
A8 = 7.59670e−09

12th surface k = 0.000
A4 = −3.51470e−04, A6 = 1.30497e−06

Zoom data
Zoom ratio 2.50

| | WE | ST | TE |
|---|---|---|---|
| f | 14.50 | 23.03 | 36.25 |
| Fno. | 3.90 | 4.80 | 6.20 |
| 2ω | 83.81 | 52.08 | 33.90 |
| IH | 11.15 | 11.15 | 11.15 |
| BF (in air) | 6.31 | 13.03 | 25.04 |
| LTL (in air) | 63.75 | 57.29 | 60.15 |

-continued

Unit mm

| | | | |
|---|---|---|---|
| d4 | 19.34 | 7.50 | 0.78 |
| d10 | 12.97 | 11.64 | 9.20 |
| d12 | 2.00 | 8.72 | 20.73 |

Unit focal length

| | | |
|---|---|---|
| f1 = −29.17 | f2 = 18.60 | f3 = −37.47 |

EXAMPLE 14

Unit mm

Surface data

| Surface no. | r | d | nd | vd |
|---|---|---|---|---|
| Object plane | ∞ | ∞ | | |
| 1 | 23.362 | 0.51 | 1.94595 | 17.98 |
| 2 | 11.523 | 6.93 | | |
| 3* | −311.410 | 0.50 | 1.80610 | 40.92 |
| 4* | 14.616 | 2.63 | | |
| 5 | 20.325 | 4.00 | 1.94595 | 17.98 |
| 6 | 229.857 | Variable | | |
| 7 (Stop) | ∞ | 1.20 | | |
| 8* | 8.100 | 2.33 | 1.49700 | 81.61 |
| 9* | −783.952 | 3.82 | | |
| 10 | 26.179 | 1.95 | 1.49700 | 81.61 |
| 11 | −20.083 | 0.50 | 2.00069 | 25.46 |
| 12 | 206.331 | 1.00 | | |
| 13* | 43.679 | 4.31 | 1.58313 | 59.38 |
| 14 | −5.929 | 0.50 | 1.80610 | 40.92 |
| 15 | −17.567 | Variable | | |
| 16 | −8.200 | 0.50 | 1.49700 | 81.61 |
| 17* | −32.744 | Variable | | |
| 18 | ∞ | 2.60 | 1.51633 | 64.14 |
| 19 | ∞ | 1.00 | | |
| Image plane (Image pickup surface) | ∞ | | | |

Aspherical surface data

3rd surface k = 0.000
A4 = 6.85747e−06, A6 = −1.02676e−07,
A8 = 5.72335e−10
4th surface k = 0.000
A4 = −2.74806e−05, A6 = −2.27684e−07
8th surface k = 0.000
A4 = −7.82370e−05, A6 = −3.93359e−07
9th surface k = 0.000
A4 = 5.84011e−05, A6 = 5.78357e−07
13th surface k = 0.000
A4 = −8.31381e−05, A6 = −1.97851e−06,
A8 = 1.54830e−08, A10 = −2.37420e−09
17th surface k = 0.000
A4 = 1.62502e−04, A6 = −6.60527e−07

-continued

Unit mm

Zoom data
Zoom ratio 1.92

| | WE | ST | TE |
|---|---|---|---|
| f | 9.60 | 13.58 | 18.43 |
| Fno. | 3.63 | 4.60 | 5.78 |
| 2ω | 106.78 | 80.48 | 62.06 |
| IH | 11.00 | 11.00 | 11.00 |
| BF (in air) | 7.71 | 10.88 | 15.32 |
| LTL (in air) | 64.44 | 57.66 | 55.86 |
| d6 | 22.18 | 12.33 | 6.53 |
| d15 | 3.88 | 3.77 | 3.34 |
| d17 | 5.00 | 8.17 | 12.61 |

Unit focal length

| | | |
|---|---|---|
| f1 = −20.88 | f2 = 15.09 | f3 = −22.16 |

EXAMPLE 15

Unit mm

Surface data

| Surface no. | r | d | nd | vd |
|---|---|---|---|---|
| Object plane | ∞ | ∞ | | |
| 1 | 23.611 | 0.50 | 1.94595 | 17.98 |
| 2 | 11.574 | 4.83 | | |
| 3* | 189.552 | 0.50 | 1.80610 | 40.92 |
| 4* | 10.901 | 1.82 | | |
| 5 | 14.723 | 4.00 | 1.94595 | 17.98 |
| 6 | 71.447 | Variable | | |
| 7 (Stop) | ∞ | 1.20 | | |
| 8* | 7.944 | 2.35 | 1.49700 | 81.61 |
| 9* | 117.820 | 2.18 | | |
| 10 | 12.682 | 1.80 | 1.49700 | 81.61 |
| 11 | 55.197 | 0.50 | 2.00069 | 25.46 |
| 12 | 13.136 | 1.00 | | |
| 13* | 24.004 | 3.14 | 1.58313 | 59.38 |
| 14 | −7.794 | 0.50 | 1.80610 | 40.92 |
| 15 | −14.875 | Variable | | |
| 16 | −8.200 | 0.50 | 1.49700 | 81.61 |
| 17* | −28.497 | Variable | | |
| 18 | ∞ | 2.60 | 1.51633 | 64.14 |
| 19 | ∞ | 1.00 | | |
| Image plane (Image pickup surface) | ∞ | | | |

Aspherical surface data

3rd surface k = 0.000
A4 = −1.44621e−06, A6 = −1.89593e−07,
A8 = 1.96871e−09
4th surface k = 0.000
A4 = −4.39405e−05, A6 = −6.05933e−07
8th surface k = 0.000
A4 = −5.08335e−05, A6 = 4.14805e−07
9th surface k = 0.000
A4 = 1.45376e−04, A6 = 8.86360e−07

-continued

| Unit mm |
|---|
| 13th surface | k = 0.000
A4 = -1.78063e-04, A6 = -6.27491e-06,
A8 = 1.47009e-07, A10 = -1.15453e-08
17th surface k = 0.000
A4 = 1.35080e-04, A6 = -1.07155e-06

| Zoom data |
| Zoom ratio 1.92 |

|  | WE | ST | TE |
|---|---|---|---|
| f | 10.40 | 14.41 | 19.97 |
| Fno. | 3.63 | 4.60 | 5.78 |
| 2ω | 102.56 | 77.39 | 58.14 |
| IH | 11.00 | 11.00 | 11.00 |
| BF (in air) | 7.71 | 10.69 | 15.74 |
| LTL (in air) | 54.61 | 50.40 | 50.25 |
| d6 | 15.97 | 8.78 | 4.11 |
| d15 | 6.10 | 6.11 | 5.57 |
| d17 | 5.00 | 7.98 | 13.02 |

| Unit focal length | | |
|---|---|---|
| f1 = -19.02 | f2 = 13.86 | f3 = -23.36 |

EXAMPLE 16

| Unit mm |
|---|
| Surface data |

| Surface no. | r | d | nd | vd |
|---|---|---|---|---|
| Object plane | ∞ | ∞ | | |
| 1 | 19.320 | 0.90 | 1.83481 | 42.71 |
| 2 | 10.027 | 5.48 | | |
| 3* | -107.518 | 0.80 | 1.69350 | 53.21 |
| 4* | 49.414 | 0.0 | | |
| 5 | 12.995 | 1.93 | 1.84666 | 23.78 |
| 6 | 18.050 | Variable | | |
| 7* | 16.313 | 2.00 | 1.74320 | 49.34 |
| 8* | 40.933 | 1.00 | | |
| 9 (Stop) | ∞ | 1.00 | | |
| 10* | 22.448 | 4.00 | 1.49700 | 81.61 |
| 11 | -11.000 | 1.50 | 1.92286 | 20.88 |
| 12 | -16.548 | Variable | | |
| 13* | -8.097 | 1.00 | 1.49700 | 81.61 |
| 14* | -14.648 | Variable | | |
| 15 | ∞ | 2.60 | 1.51633 | 64.14 |
| 16 | ∞ | 1.00 | | |
| Image plane (Image pickup surface) | ∞ | | | |

| Aspherical surface data |
|---|
| 3rd surface | k = 0.000
A4 = -9.63140e-06, A6 = 4.98120e-07
4th surface k = 0.000
A4 = 2.97924e-06, A6 = 6.40719e-07
7th surface k = 0.000
A4 = -1.27682e-04, A6 = -9.87292e-07

-continued

| Unit mm |
|---|
| 8th surface | k = 0.225
A4 = -1.89591e-04, A6 = -3.23392e-07
10th surface k = 0.000
A4 = -1.44264e-04, A6 = 3.40410e-07
13th surface k = 0.000
A4 = -6.86953e-05, A6 = -6.91313e-07
14th surface k = 0.000
A4 = -3.38899e-05

| Zoom data |
| Zoom ratio 2.88 |

|  | WE | ST | TE |
|---|---|---|---|
| f | 13.73 | 21.25 | 39.54 |
| Fno. | 3.63 | 4.60 | 5.78 |
| 2ω | 84.78 | 55.70 | 30.93 |
| IH | 11.00 | 11.00 | 11.00 |
| BF (in air) | 4.87 | 10.62 | 25.12 |
| LTL (in air) | 58.61 | 53.86 | 58.61 |
| d6 | 18.33 | 8.70 | 0.70 |
| d12 | 15.50 | 14.64 | 12.89 |
| d14 | 2.16 | 7.90 | 22.40 |

| Unit focal length | | |
|---|---|---|
| f1 = -25.21 | f2 = 16.59 | f3 = -38.37 |

EXAMPLE 17

| Unit mm |
|---|
| Surface data |

| Surface no. | r | d | nd | vd |
|---|---|---|---|---|
| Object plane | ∞ | ∞ | | |
| 1 | 49.691 | 0.90 | 1.83481 | 42.71 |
| 2 | 12.007 | 3.97 | | |
| 3 | 103.685 | 0.80 | 1.69350 | 53.21 |
| 4* | 30.989 | 0.30 | | |
| 5 | 16.118 | 2.20 | 1.84666 | 23.78 |
| 6 | 33.781 | Variable | | |
| 7* | 10.571 | 3.14 | 1.74320 | 49.34 |
| 8* | -50.170 | 1.00 | | |
| 9 (Stop) | ∞ | 1.00 | | |
| 10 | -46.647 | 0.50 | 1.90366 | 31.32 |
| 11 | 7.609 | 5.55 | 1.49700 | 81.61 |
| 12* | -14.050 | 1.70 | | |
| 13 | -21.889 | 1.62 | 1.94595 | 17.98 |
| 14 | -17.211 | Variable | | |
| 15* | -13.283 | 1.00 | 1.49700 | 81.61 |
| 16* | -537.461 | Variable | | |
| 17 | ∞ | 2.60 | 1.51633 | 64.14 |
| 18 | ∞ | 1.00 | | |
| Image plane (Image pickup surface) | ∞ | | | |

| Aspherical surface data |
|---|
| 4th surface | k = 0.000
A4 = 2.85380e-06, A6 = -2.56958e-08

-continued

Unit mm

7th surface k = 0.000
A4 = −4.06783e−05, A6 = −1.84936e−07
8th surface k = 0.225
A4 = 7.80403e−05, A6 = −1.97323e−07
12th surface k = 0.000
A4 = 7.34005e−06, A6 = 8.31748e−08
15th surface k = 0.000
A4 = 8.08470e−06, A6 = −3.91991e−09
16th surface k = 0.000
A4 = 9.05557e−06

Zoom data
Zoom ratio 2.88

|  | WE | ST | TE |
|---|---|---|---|
| f | 14.55 | 24.74 | 41.93 |
| Fno. | 3.63 | 4.60 | 5.78 |
| 2ω | 80.85 | 47.65 | 29.06 |
| IH | 11.00 | 11.00 | 11.00 |
| BF (in air) | 4.78 | 8.26 | 22.22 |
| LTL (in air) | 58.61 | 50.72 | 57.11 |
| d6 | 18.78 | 5.30 | 0.70 |
| d14 | 11.37 | 13.47 | 10.50 |
| d16 | 2.07 | 5.55 | 19.51 |

Unit focal length

| f1 = −26.65 | f2 = 17.56 | f3 = −27.42 |
|---|---|---|

EXAMPLE 18

Unit mm

Surface data

| Surface no. | r | d | nd | νd |
|---|---|---|---|---|
| Object plane | ∞ | ∞ | | |
| 1 | 21.491 | 0.95 | 1.72903 | 54.04 |
| 2 | 12.000 | 7.20 | | |
| 3* | −28.891 | 1.10 | 1.55332 | 71.68 |
| 4* | 221.973 | 1.51 | | |
| 5 | 34.919 | 1.50 | 1.94595 | 17.98 |
| 6 | 53.053 | Variable | | |
| 7* | 9.583 | 3.00 | 1.49700 | 81.61 |
| 8* | −26.491 | 0.70 | | |
| 9 (Stop) | ∞ | 0.70 | | |
| 10* | 46.302 | 3.00 | 1.49700 | 81.54 |
| 11 | −10.003 | 0.80 | 1.85049 | 40.21 |
| 12 | 20.000 | 1.99 | | |
| 13* | −30.590 | 2.47 | 1.77377 | 47.17 |
| 14* | −9.892 | Variable | | |
| 15* | −11.344 | 1.00 | 1.49700 | 81.61 |
| 16* | −50.473 | Variable | | |
| 17 | ∞ | 2.60 | 1.51633 | 64.14 |
| 18 | ∞ | 1.00 | | |
| Image plane (Image pickup surface) | ∞ | | | |

Unit mm

Aspherical surface data

3rd surface k = 0.000
A4 = −7.85248e−05, A6 = 3.71782e−07
4th surface k = 0.000
A4 = −9.61224e−05, A6 = 4.44893e−07
7th surface k = 0.000
A4 = −7.20814e−07, A6 = 1.26779e−06
8th surface k = 0.000
A4 = 1.60731e−04, A6 = −1.32113e−06
10th surface k = 0.000
A4 = −1.01583e−04, A6 = −6.78458e−06
13th surface k = 0.000
A4 = −1.14019e−04, A6 = 4.12049e−06,
A8 = −5.09907e−08
14th surface k = 0.000
A4 = −4.00338e−05, A6 = 1.82526e−06,
A8 = −1.56473e−08
15th surface k = 0.000
A4 = 1.94949e−04
16th surface k = 0.000
A4 = 1.25752e−04, A6 = −1.39402e−06,
A8 = 1.10294e−08

Zoom data
Zoom ratio 2.80

|  | WE | ST | TE |
|---|---|---|---|
| f | 14.20 | 23.76 | 39.76 |
| Fno. | 3.90 | 4.80 | 6.50 |
| 2ω | 85.64 | 51.76 | 31.40 |
| IH | 11.15 | 11.15 | 11.15 |
| BF (in air) | 5.13 | 13.41 | 24.79 |
| LTL (in air) | 62.55 | 59.10 | 63.11 |
| d6 | 18.37 | 8.34 | 1.40 |
| d14 | 13.13 | 11.43 | 11.00 |
| d16 | 2.42 | 10.69 | 22.07 |

Unit focal length

| f1 = −25.36 | f2 = 17.71 | f3 = −29.69 |
|---|---|---|

In the zoom lenses in the examples from the example 1 to the example 18, a barrel-shape distortion occurs at the wide angle end. In contrast, an occurrence of distortion near the intermediate focal length state and at the telephoto end is suppressed. In other words, an arrangement is made such that the maximum image height IHw at the wide angle end becomes smaller than the maximum image height IHs in the intermediate focal length state and the maximum image height IHt at the telephoto end.

In the zoom lenses of the examples from the example 1 to the example 18, for achieving small-sizing, the barrel-shape distortion occurs at the wide angle end. Therefore, in an image pickup apparatus in which one of these zoom lenses is used, recording and displaying of an image may be carried out after the barrel-shape distortion occurring at the wide angle end has been corrected electrically. In that case, an image signal including the distortion at the wide angle end that has been acquired in an effective image pickup area is corrected by image processing (image conversion), and thereby rectangular image information in which the distortion has been reduced is generated.

Moreover, the image data acquired in the effective image pickup area satisfies the following conditional expression (A) at the time of focusing on an infinite object point.

$$0.7 < y07/(f_w \times \tan \omega 07w) < 0.97 \quad (A)$$

Here, y07 is expressed as y07=0.7×y10 where, y10 denotes a distance up to the farthest point from the center of the effective image pickup area (in a plane in which an image can be picked up) of the image pickup element (maximum image height), ω07w denotes an angle made by a direction of an object point with respect to an image point connecting the center on the image pickup surface at the wide angle end and a position of y07, with an optical axis and $f_w$ denotes a focal length of the overall image forming optical system at the wide angle end.

In a case in which, the electrical correction of the distortion is presupposed, it is possible to set the maximum image height at the wide angle end to be smaller than the image height at the telephoto end and near the intermediate focal length state where no electrical correction is carried out.

In the zoom lenses of the examples from the example 1 to the example 18, data of the image height, the focal length, the F-number, and the full angle of view in the case in which the electrical correction of distortion has been presupposed is shown below. Numerical values in the following data are values at the wide angle end, in the intermediate focal length state, and at the telephoto end, in order from the left side.

Data of the first example are given below.

|     | WE    | ST    | TE    |
| --- | ----- | ----- | ----- |
| f   | 14.79 | 24.93 | 42.52 |
| Fno.| 3.50  | 4.60  | 5.50  |
| 2ω  | 76.41 | 48.00 | 29.11 |
| IH  | 10.36 | 11.15 | 11.15 |

Data of the second example are given below.

|     | WE     | ST    | TE    |
| --- | ------ | ----- | ----- |
| f   | 9.08   | 13.15 | 18.16 |
| Fno.| 3.60   | 4.80  | 5.80  |
| 2ω  | 105.34 | 82.40 | 63.17 |
| IH  | 10.10  | 11.15 | 11.15 |

Data of the third example are given below.

|     | WE    | ST    | TE    |
| --- | ----- | ----- | ----- |
| f   | 14.53 | 24.63 | 41.56 |
| Fno.| 3.67  | 4.29  | 5.74  |

-continued

|     | WE    | ST    | TE    |
| --- | ----- | ----- | ----- |
| 2ω  | 77.23 | 48.48 | 29.79 |
| IH  | 10.36 | 11.15 | 11.15 |

Data of the fourth example are given below.

|     | WE    | ST    | TE    |
| --- | ----- | ----- | ----- |
| f   | 14.27 | 24.24 | 41.18 |
| Fno.| 3.55  | 4.61  | 5.96  |
| 2ω  | 78.20 | 49.94 | 30.20 |
| IH  | 10.36 | 11.15 | 11.15 |

Data of the fifth example are given below.

|     | WE    | ST    | TE    |
| --- | ----- | ----- | ----- |
| f   | 14.28 | 24.27 | 41.24 |
| Fno.| 3.83  | 4.99  | 6.29  |
| 2ω  | 78.13 | 50.01 | 30.07 |
| IH  | 10.35 | 11.15 | 11.15 |

Data of the sixth example are given below.

|     | WE    | ST    | TE    |
| --- | ----- | ----- | ----- |
| f   | 14.28 | 24.26 | 41.23 |
| Fno.| 3.78  | 4.91  | 6.20  |
| 2ω  | 78.18 | 50.09 | 30.14 |
| IH  | 10.36 | 11.15 | 11.15 |

Data of the seventh example are given below.

|     | WE    | ST    | TE    |
| --- | ----- | ----- | ----- |
| f   | 14.28 | 24.26 | 41.23 |
| Fno.| 3.62  | 4.75  | 6.05  |
| 2ω  | 78.21 | 50.18 | 30.15 |
| IH  | 10.36 | 11.15 | 11.15 |

Data of the eighth example are given below.

|     | WE    | ST    | TE    |
| --- | ----- | ----- | ----- |
| f   | 12.85 | 26.16 | 49.07 |
| Fno.| 3.63  | 5.00  | 6.50  |
| 2ω  | 84.44 | 46.83 | 25.34 |
| IH  | 10.23 | 11.00 | 11.00 |

Data of the ninth example are given below.

|     | WE    | ST    | TE    |
| --- | ----- | ----- | ----- |
| f   | 14.19 | 24.14 | 40.84 |
| Fno.| 3.63  | 4.61  | 5.77  |

-continued

|    | WE    | ST    | TE    |
|----|-------|-------|-------|
| 2ω | 78.00 | 49.19 | 29.87 |
| IH | 10.20 | 11.00 | 11.00 |

Data of the tenth example are given below.

|     | WE    | ST    | TE    |
|-----|-------|-------|-------|
| f   | 14.23 | 24.17 | 40.81 |
| Fno.| 3.63  | 4.60  | 5.78  |
| 2ω  | 77.85 | 49.05 | 29.86 |
| IH  | 10.20 | 11.00 | 11.00 |

Data of the eleventh example are given below.

|     | WE    | ST    | TE    |
|-----|-------|-------|-------|
| f   | 12.00 | 23.34 | 45.60 |
| Fno.| 3.63  | 5.00  | 6.50  |
| 2ω  | 88.41 | 50.61 | 26.94 |
| IH  | 10.02 | 11.00 | 11.00 |

Data of the twelfth example are given below.

|     | WE    | ST    | TE    |
|-----|-------|-------|-------|
| f   | 14.07 | 16.45 | 36.20 |
| Fno.| 3.63  | 4.60  | 5.78  |
| 2ω  | 78.16 | 70.80 | 33.35 |
| IH  | 10.27 | 11.00 | 11.00 |

Data of the thirteenth example are given below.

|     | WE    | ST    | TE    |
|-----|-------|-------|-------|
| f   | 14.50 | 23.03 | 36.25 |
| Fno.| 3.90  | 4.80  | 6.20  |
| 2ω  | 77.49 | 52.08 | 33.90 |
| IH  | 10.23 | 11.15 | 11.15 |

Data of the fourteenth example are given below.

|     | WE     | ST    | TE    |
|-----|--------|-------|-------|
| f   | 9.60   | 13.58 | 18.43 |
| Fno.| 3.63   | 4.60  | 5.78  |
| 2ω  | 101.13 | 80.48 | 62.06 |
| IH  | 10.11  | 11.00 | 11.00 |

Data of the fifteenth example are given below.

|     | WE    | ST    | TE    |
|-----|-------|-------|-------|
| f   | 10.40 | 14.41 | 19.97 |
| Fno.| 3.63  | 4.60  | 5.78  |
| 2ω  | 96.26 | 77.39 | 58.14 |
| IH  | 10.07 | 11.00 | 11.00 |

Data of the sixteenth example are given below.

|     | WE    | ST    | TE    |
|-----|-------|-------|-------|
| f   | 13.73 | 21.25 | 39.54 |
| Fno.| 3.63  | 4.60  | 5.78  |
| 2ω  | 79.84 | 55.70 | 30.93 |
| IH  | 10.23 | 11.00 | 11.00 |

Data of the seventeenth example are given below.

|     | WE    | ST    | TE    |
|-----|-------|-------|-------|
| f   | 14.55 | 24.74 | 41.93 |
| Fno.| 3.63  | 4.60  | 5.78  |
| 2ω  | 76.29 | 47.65 | 29.06 |
| IH  | 10.29 | 11.00 | 11.00 |

Data of the eighteenth example are given below.

|     | WE    | ST    | TE    |
|-----|-------|-------|-------|
| f   | 14.20 | 23.76 | 39.76 |
| Fno.| 3.90  | 4.80  | 6.50  |
| 2ω  | 79.14 | 51.76 | 31.40 |
| IH  | 10.17 | 11.15 | 11.15 |

Next, values of conditional expressions in each example are given below. '-' (hyphen) indicates that arrangement (element) of the optical system is different.

Conditional

| Expression | | Example1 | Example2 | Example3 | Example4 |
|---|---|---|---|---|---|
| (1) | $(\beta_{2t}/\beta_{2w})/(\beta_{3t}/\beta_{3w})$ | 1.04 | 1.27 | 1.25 | 1.17 |
| (1-1) | $(\beta_{2t}/\beta_{2w})/(\beta_{3t}/\beta_{3w})$ | 1.04 | 1.27 | 1.25 | 1.17 |
| (2) | $\beta_{2w}$ | −0.45 | −0.49 | −0.43 | −0.44 |
| (3) | $f_2/f_w$ | 1.07 | 1.34 | 1.11 | 1.09 |
| (3-1) | $f_2/f_w$ | 1.07 | 1.34 | 1.11 | 1.09 |
| (3-2) | $f_2/f_w$ | — | — | — | — |
| (4) | $\beta_{3w}$ | 1.20 | 1.23 | 1.26 | 1.26 |
| (5) | $\beta_{3t}$ | 1.99 | 1.55 | 1.91 | 1.97 |
| (6) | $f_1/f_w$ | −1.83 | −1.66 | −1.86 | −1.80 |
| (7) | $f_3/f_w$ | −1.87 | −2.93 | −2.22 | −2.09 |
| (8) | $(\beta_{2t}/\beta_{2w})/(f_t/f_w)$ | 0.60 | 0.80 | 0.66 | 0.64 |
| (9) | $D_{air}/(\tan\omega_t \times f_t)$ | 2.30 | 1.91 | 2.37 | 2.28 |
| (10) | $EXP_w/(\tan\omega_w \times f_t)$ | 3.24 | 1.95 | 3.39 | 3.33 |

Conditional

| Expression | | Example5 | Example6 | Example7 | Example8 |
|---|---|---|---|---|---|
| (1) | $(\beta_{2t}/\beta_{2w})/(\beta_{3t}/\beta_{3w})$ | 1.23 | 1.29 | 1.15 | 1.02 |
| (1-1) | $(\beta_{2t}/\beta_{2w})/(\beta_{3t}/\beta_{3w})$ | 1.23 | 1.29 | 1.15 | 1.02 |
| (2) | $\beta_{2w}$ | −0.47 | −0.46 | −0.46 | −0.48 |
| (3) | $f_2/f_w$ | 1.08 | 1.05 | 1.07 | 1.12 |
| (3-1) | $f_2/f_w$ | 1.08 | 1.05 | 1.07 | 1.12 |
| (3-2) | $f_2/f_w$ | — | — | — | — |
| (4) | $\beta_{3w}$ | 1.29 | 1.32 | 1.26 | 1.19 |

-continued

| Expression | Example5 | Example6 | Example7 | Example8 |
|---|---|---|---|---|
| (5) $\beta_{3t}$ | 1.98 | 1.97 | 1.99 | 2.29 |
| (6) $f_1/f_w$ | −1.65 | −1.64 | −1.73 | −1.77 |
| (7) $f_3/f_w$ | −1.68 | −1.79 | −1.95 | −2.20 |
| (8) $(\beta_{2t}/\beta_{2w})/(f_t/f_w)$ | 0.65 | 0.67 | 0.63 | 0.52 |
| (9) $D_{aiw}/(\tan\omega_t \times f_t)$ | 2.38 | 2.38 | 2.29 | 2.21 |
| (10) $EXP_w/(\tan\omega_t \times f_t)$ | 2.97 | 3.04 | 3.26 | 3.99 |

Conditional

| Expression | Example9 | Example10 | Example11 | Example12 |
|---|---|---|---|---|
| (1) $(\beta_{2t}/\beta_{2w})/(\beta_{3t}/\beta_{3w})$ | 1.26 | 1.26 | 1.24 | 1.14 |
| (1-1) $(\beta_{2t}/\beta_{2w})/(\beta_{3t}/\beta_{3w})$ | — | — | — | — |
| (2) $\beta_{2w}$ | −0.42 | −0.44 | −0.43 | −0.46 |
| (3) $f_2/f_w$ | 1.23 | 1.20 | 1.42 | 1.21 |
| (3-1) $f_2/f_w$ | — | — | — | — |
| (3-2) $f_2/f_w$ | 1.23 | 1.20 | 1.42 | 1.21 |
| (4) $\beta_{3w}$ | 1.26 | 1.24 | 1.18 | 1.18 |
| (5) $\beta_{3t}$ | 1.90 | 1.87 | 2.07 | 1.77 |
| (6) $f_1/f_w$ | −1.90 | −1.86 | −1.99 | −1.84 |
| (7) $f_3/f_w$ | −1.67 | −1.67 | −2.08 | −2.16 |
| (8) $(\beta_{2t}/\beta_{2w})/(f_t/f_w)$ | 0.66 | 0.66 | 0.57 | 0.67 |
| (9) $D_{aiw}/(\tan\omega_t \times f_t)$ | 2.20 | 1.84 | 1.98 | 2.74 |
| (10) $EXP_w/(\tan\omega_t \times f_t)$ | 2.79 | 2.61 | 3.25 | 3.20 |

Conditional

| Expression | Example13 | Example14 | Example15 | Example16 |
|---|---|---|---|---|
| (1) $(\beta_{2t}/\beta_{2w})/(\beta_{3t}/\beta_{3w})$ | 1.22 | 1.23 | 1.22 | 1.37 |
| (1-1) $(\beta_{2t}/\beta_{2w})/(\beta_{3t}/\beta_{3w})$ | — | — | — | — |
| (2) $\beta_{2w}$ | −0.43 | −0.34 | −0.40 | −0.47 |
| (3) $f_2/f_w$ | 1.28 | 1.57 | 1.33 | 1.21 |
| (3-1) $f_2/f_w$ | — | — | — | — |
| (3-2) $f_2/f_w$ | 1.28 | 1.57 | 1.33 | 1.21 |
| (4) $\beta_{3w}$ | 1.16 | 1.37 | 1.35 | 1.17 |
| (5) $\beta_{3t}$ | 1.66 | 1.71 | 1.69 | 1.70 |
| (6) $f_1/f_w$ | −2.01 | −2.17 | −1.83 | −1.84 |
| (7) $f_3/f_w$ | −2.58 | −2.31 | −2.25 | −2.79 |
| (8) $(\beta_{2t}/\beta_{2w})/(f_t/f_w)$ | 0.70 | 0.80 | 0.80 | 0.69 |
| (9) $D_{aiw}/(\tan\omega_t \times f_t)$ | 2.72 | 2.58 | 2.51 | 2.63 |
| (10) $EXP_w/(\tan\omega_t \times f_t)$ | 3.20 | 2.23 | 2.31 | 3.52 |

Conditional

| Expression | Example17 | Example18 |
|---|---|---|
| (1) $(\beta_{2t}/\beta_{2w})/(\beta_{3t}/\beta_{3w})$ | 1.23 | 1.16 |
| (1-1) $(\beta_{2t}/\beta_{2w})/(\beta_{3t}/\beta_{3w})$ | — | — |
| (2) $\beta_{2w}$ | −0.46 | −0.47 |
| (3) $f_2/f_w$ | 1.21 | 1.25 |
| (3-1) $f_2/f_w$ | — | — |
| (3-2) $f_2/f_w$ | 1.21 | 1.25 |
| (4) $\beta_{3w}$ | 1.20 | 1.20 |
| (5) $\beta_{3t}$ | 1.84 | 1.86 |
| (6) $f_1/f_w$ | −1.83 | −1.79 |
| (7) $f_3/f_w$ | −1.88 | −2.09 |
| (8) $(\beta_{2t}/\beta_{2w})/(f_t/f_w)$ | 0.65 | 0.64 |
| (9) $D_{aiw}/(\tan\omega_t \times f_t)$ | 2.61 | 2.60 |
| (10) $EXP_w/(\tan\omega_t \times f_t)$ | 3.16 | 3.37 |

Figure 37:
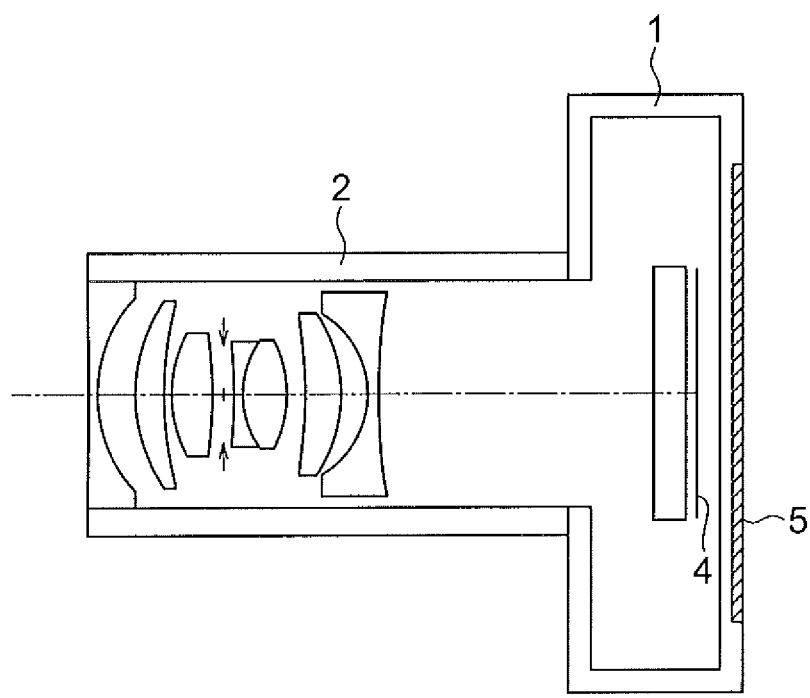
FIG. 37 is a cross-sectional view of an image pickup apparatus in which, the zoom lens according to one of the examples is incorporated.

FIG. 37 is a cross-sectional view of a compact camera as an electronic image pickup apparatus. In FIG. 37, a photographic optical system 2 is disposed inside a lens barrel of a compact camera 1. Moreover, an image pickup element surface 4 and a back monitor 5 are disposed in a body. As an image pickup element, an element such as a small-size CCD (charge coupled device) or a CMOS (complementary metal-oxide semiconductor) is to be used.

Here, it is possible to provide a mount portion to the lens barrel, and to let the photographic optical system 2 to be removable from a casing which is a body of a single-lens mirrorless camera. A mount of a type such as a screw type or of a bayonet type is to be used for the mount portion.

Moreover, as the photographic optical system 2 of the compact camera 1, the zoom lens described in any one of the examples from the first example to the eighteenth example is to be used for instance.

Figure 38:
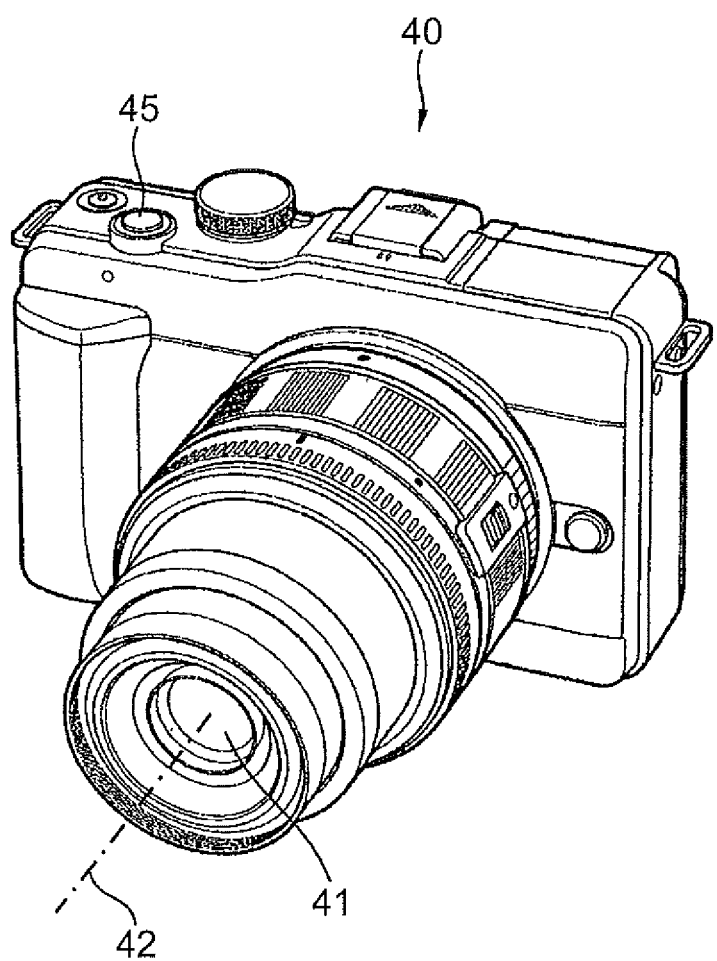
FIG. 38 is a front perspective view showing an appearance of an image pickup apparatus.
Figure 39:
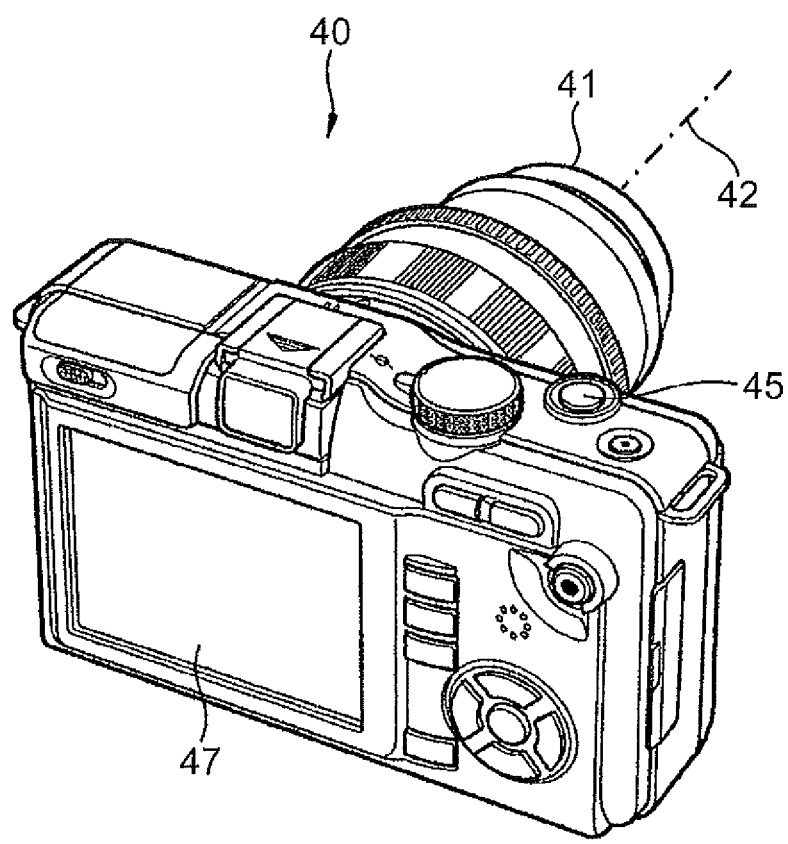
FIG. 39 is a rear perspective view showing an appearance of the image pickup apparatus.

FIG. 38 and FIG. 39 are conceptual diagrams of an arrangement of the image pickup apparatus according to the present embodiment. FIG. 38 is a front perspective view showing an appearance of a digital camera 40 as the image pickup apparatus, and FIG. 39 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example, for instance. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

FIG. 40 shows an internal structure of the digital camera 40 (image pickup apparatus). The internal structure shown in FIG. 40 can be used in an image pickup apparatus of a non-interchangeable lens type (compact camera shown in FIG. 37) and an image pickup apparatus of an interchangeable lens type. The description will be made by citing an example of the image pickup apparatus of interchangeable lens type. The digital camera 40 is an image pickup apparatus of the interchangeable lens type, and includes an interchangeable lens 40A and a camera body 40B. Moreover, each of the interchangeable lens 40A and the camera body 40B has a mount as a connecting portion for connecting. In FIG. 40, the two mounts are put (assembled) together and indicated as a mount portion 70. The interchangeable lens 40A is mounted on a casing which is the camera body 40B, by the mount portion 70. In the image pickup apparatus of the non-interchangeable lens type, there is no mount portion 70. Therefore, there is no division as the interchangeable lens 40A and the camera body 40B, and all members (internal structure) are disposed inside the image pickup apparatus.

The interchangeable lens 40A (lens barrel) includes a photographic optical system 41, an interchangeable-lens internal circuit 50, and the mount portion 70. The interchangeable-lens internal circuit 50 includes a lens control section 51, and a lens-drive operating section 52. The photographic optical system 41 includes a zooming lens, a focusing lens, and a stop. The focusing lens may be used also as a zooming lens. As the photographic optical system 41, the zoom lens of the present invention shown in one of the examples from the example 1 to the example 18 is to be used.

The lens control section 51 includes a microcomputer and peripheral components such as a memory. The lens control section 51 carries out a drive control of the focusing lens and the stop, detection of a state of the stop, a state of the zooming lens, and a state of the focusing lens, and transmission of lens information and reception of camera information to and from a body control section 13. The lens-drive operating section 52 includes buttons and rotating members, and drive control of the focusing lens and the stop is carried out based on information input from the lens-drive operating section 52. The drive control may be made by an electric signal and a motor, or by mechanical transmission. The memory of the lens control section 51 includes information such as identification information of lens and information related to distortion correction.

The mount portion 70 is provided with an electric contact portion (terminal) 71. At the time of mounting the interchangeable lens 40A on the camera body 40B, an electrical connection between the interchangeable lens 40A (lens barrel) and the camera body 40B is made via the electric contact portion 71, and various information that will be mentioned later is transmitted and received.

The camera body 40B includes an internal circuit 60. In the following description, the processing means described above includes for instance, a CDS/ADC section 24, a temporary storage memory 17, and an image processing section 18, and a storage means consists of a storage medium section 19 for example.

The internal circuit 60 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image which formed through the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The display section 20, without restricting to a liquid-crystal display, may be a so-called organic EL (electroluminescence) display element. Furthermore, the display section 20 may be let to be an electronic view finder through which, a photographer observes an image display on the display section 20 via an eyepiece. The set-information storage memory section 21 includes a ROM section in which various image quality parameters are stored in advance, and a RAM section which stores image quality parameters which are selected by an input operation on the operating section 12, from among the image quality parameters which are read from the ROM section.

The body control section 13 is configured to include a microcomputer, and peripheral components such as a memory. The body control section 13 reads an image signal from a CCD (charge coupled device) 49, and carries out correction of the image signal, detection of a defocus state of an image plane, reception of the lens information from the lens control section 51, transmission of the camera information (defocus amount), and operation control of the overall digital camera 40. The body control section 13 and the lens control section 51 carry out communication via the electric contact section 71 of the mount portion 70, and transceiving of information.

For instance, the body control section 13 gives an instruction for transmission of the information of state of the lens to the lens control section 51. The lens control section 51 detects the state of the zooming lens and the state of the focusing lens, and transmits the state of the information to the body control section 13. The body control section 13 receives the information transmitted, and transmits an appropriate drive control signal of an lens to the lens control section 51.

Moreover, the lens control section 51 transmits information related to the distortion correction and identification information of the lens held, to the body control section 13. The body control section 13, based on the information acquired, is capable of indicating the appropriate distortion correction to an image processing section (image converting section) 18.

Moreover, an object-image that is formed on the CCD 49 upon passing through the interchangeable lens 40A is subjected to opto-electric conversion by the CCD 49. Thereafter, an output thereof is sent to a temporary storage memory 17 via a CDS/ADC (correlated double sampling/analogue-to-digital converting) section 24. The image processing section (image converting section) 18 acquires a signal of pixels from the temporary storage memory 17. Moreover, the image processing section (image converting section) 18, based on the signal of pixels acquired, calculates the defocus amount for each image position.

The defocus amount calculated is sent to the lens control section 51 via the body control section 13. The lens control section 51 calculates a lens-drive amount based on the defocus amount received, and based on the lens-drive amount, drives the focusing lens to a focusing point by a drive source such as a motor not shown in the diagram.

Moreover, the lens control section 51 changes the lens information according to the focusing state of the lens, the zooming state, a stop-setting state, and F-number at maximum aperture. Concretely, the lens control section 51 monitors a position of the zoom lens and a position of the focusing lens, and a stop-position of the aperture stop.

Moreover, the lens control section 51 computes the lens information according to the information monitored, or selects the lens information correspond to the information monitored from a lookup table that has been prepared in advance.

The digital camera 40 of the present embodiment is not a camera that is restricted to an image pickup apparatus of the interchangeable lens type shown in FIG. 40, but can also be used as an image pickup apparatus of a fixed-lens type (an image pickup apparatus which is called as a compact camera). Moreover, the photographic optical system 41 is not restricted to a zoom lens, and may be a single-focus lens.

In the digital camera 40 structured in such manner, by using the zoom lens of the present invention as the photographic optical system 41, it is possible to let the digital camera 40 to be an image pickup apparatus having a small-size and a short overall length, in which, various aberrations are corrected favorably.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit.

According to the present invention, it is possible to provide a zoom lens having a small-size and a short overall length, in which, various aberrations are corrected favorably, and a lens barrel and an image pickup apparatus which include such zoom lens.

In such manner, the present invention is suitable for a zoom lens having a small-size and a short overall length, in which, various aberrations are corrected favorably, and a lens barrel and an image pickup apparatus which include such zoom lens.

What is claimed is:

1. A zoom lens comprising in order from an object side:
a first lens unit having a negative refractive power;
a second lens unit having a positive refractive power; and
a third lens unit having a negative refractive power, wherein
the total number of lens units in the zoom lens is three, and
at the time of zooming, all distances between the lens units change, and
at the time of zooming, movement of the first lens unit includes at least a movement toward an image side, the second lens unit moves integrally with an aperture stop, and the third lens unit moves toward the object side, and the movement of the first lens unit toward the image side is a movement when the zooming started from a wide angle end, and
the movement of the third lens unit toward the object side is a movement at the time of zooming from the wide angle end to a telephoto end, and
the first lens unit includes at least a negative lens and a positive lens, and the negative lens is disposed nearest to an object, and
the following conditional expressions are satisfied:

$$0.75 < (\beta_{2t}/\beta_{2w})/(\beta_{3t}/(\beta_{3w}) < 1.38$$

$$-0.70 < \beta_{2w} < -0.32$$

$$0.96 < f_2/f_w < 1.80$$

$$1.00 < D_{aiw}/(\tan \omega_t \times f_t) < 2.90$$

where,
$\beta_{2t}$ denotes a lateral magnification of the second lens unit at the telephoto end,
$\beta_{2w}$ denotes a lateral magnification of the second lens unit at the wide angle end,
$\beta_{3t}$ denotes a lateral magnification of the third lens unit at the telephoto end, and
$\beta_{3w}$ denotes a lateral magnification of the third lens unit at the wide angle end,
here,
each lateral magnification is a lateral magnification at the time of focusing on an infinite object point, and
$f_2$ denotes a focal length of the second lens unit,
$f_w$ denotes a focal length of the overall zoom lens system at the wide angle end,
$D_{aiw}$ denotes a distance between the aperture stop and an image plane at the wide angle end,
$\omega_t$ denotes a half angle of view at the telephoto end, and
$f_t$ denotes a focal length of the overall zoom lens system at the telephoto end.

2. The zoom lens according to claim 1, wherein the following conditional expression is satisfied:

$$1.05 < \beta_{3w} < 1.35$$

where,
$\beta_{3w}$ denotes the lateral magnification of the third lens unit at the time of focusing on the infinite object point at the wide angle end.

3. The zoom lens according to claim 1, wherein the following conditional expression is satisfied:

$$1.70 < \beta_{3t} < 3.00$$

where,
$\beta_{3t}$ denotes the lateral magnification of the third lens unit at the time of focusing on the infinite object point at the telephoto end.

4. The zoom lens according to claim 1, wherein the following conditional expression is satisfied:

$$-2.50 < f_1/f_w < -1.49$$

where,
$f_1$ denotes a focal length of the first lens unit, and
$f_w$ denotes the focal length of the overall zoom lens system at the wide angle end.

5. The zoom lens according to claim 1, wherein the following conditional expression is satisfied:

$$-2.50 < f_3/f_w < -1.50$$

where,
$f_3$ denotes a focal length of the third lens unit, and
$f_w$ denotes the focal length of the overall zoom lens system at the wide angle end.

6. The zoom lens according to claim 1, wherein the following conditional expression is satisfied:

$$0.46 < (\beta_{2t}/\beta_{2w})/(f_t/f_w) < 0.80$$

where,
$\beta_{2t}$ denotes the lateral magnification of the second lens unit at the telephoto end,
$\beta_{2w}$ denotes the lateral magnification of the second lens unit at the wide angle end,
here,
each lateral magnification is a lateral magnification at the time of focusing on the infinite object point,
$f_t$ denotes the focal length of the overall zoom lens system at the telephoto end, and
$f_w$ denotes the focal length of the overall zoom lens system at the wide angle end.

7. The zoom lens according to claim 1, wherein the following conditional expression is satisfied:

$$1.00 < EXP_w/(\tan \omega_t \times f_t) < 4.50$$

where,
$EXP_w$ denotes a distance between an image plane and an exit pupil,
$\omega_t$ denotes the half angle of view at the telephoto end, and
$f_t$ denotes the focal length of the overall zoom lens system at the telephoto end.

8. The zoom lens according to claim 1, wherein at the time of focusing, only the third lens unit moves.

9. A lens barrel comprising:
a zoom lens according to claim 1; and
a connecting portion for connecting to a casing, wherein
an image pickup element which converts an optical image formed by the zoom lens to an electric signal is disposed in the casing.

10. An image pickup apparatus comprising:
a zoom lens according to claim 1; and
an image pickup element which converts an optical image formed by the zoom lens, to an electric signal.

11. The image pickup apparatus according to claim 10, comprising:
an image converting section, wherein
the image converting section converts an electric signal that includes a distortion due to the zoom lens, to an image signal in which, the distortion has been corrected by image processing.

12. A zoom lens comprising in order from an object side:
a first lens unit having a negative refractive power;
a second lens unit having a positive refractive power; and
a third lens unit having a negative refractive power, wherein
the total number of lens units in the zoom lens is three, and
at the time of zooming, all distances between the lens units change, and
at the time of zooming, movement of the first lens unit includes at least a movement toward an image side, a second lens unit moves integrally with an aperture stop, and the third lens unit moves toward the object side, and
the movement of the first lens unit toward the image side is a movement when the zooming started from a wide angle end, and
the movement of the third lens unit toward the object side is a movement at the time of zooming from the wide angle end to a telephoto end, and
the first lens unit includes at least a negative lens and a positive lens, and the negative lens is disposed nearest to an object, and
the third lens unit includes not less than two lenses, and the following conditional expressions are satisfied:

$$0.75 < (\beta_{2t}/\beta_{2w})/(\beta_{3t}/\beta_{3w}) < 2.00$$

$$0.96 < f_2/f_w < 1.70$$

$$1.00 < D_{aiw}/(\tan \omega_t \times f_t) < 2.90$$

where,
$\beta_{2t}$ denotes a lateral magnification of the second lens unit at the telephoto end,
$\beta_{2w}$ denotes a lateral magnification of the second lens unit at the wide angle end,
$\beta_{3t}$ denotes a lateral magnification of the third lens unit at the telephoto end, and
$\beta_{3w}$ denotes a lateral magnification of the third lens unit at the wide angle end,
here,
each lateral magnification is a lateral magnification at the time of focusing on an infinite object point, and
$f_2$ denotes a focal length of the second lens unit,
$f_w$ denotes a focal length of the overall zoom lens system at the wide angle end,
$D_{aiw}$ denotes a distance between the aperture stop and an image plane at the wide angle end,
$\omega_t$ denotes a half angle of view at the telephoto end, and
$f_t$ denotes a focal length of the overall zoom lens system at the telephoto end.

13. The zoom lens according to claim 12, wherein the following conditional expression is satisfied:

$$-0.70 < \beta_{2w} < -0.32$$

where,
$\beta_{2w}$ denotes the lateral magnification of the second lens unit at the time of focusing on the infinite object point at the wide angle end.

14. A zoom lens comprising in order from an object side:
a first lens unit having a negative refractive power;
a second lens unit having a positive refractive power; and
a third lens unit having a negative refractive power, wherein
the total number of lens units in the zoom lens is three, and
at the time of zooming, all distances between the lens units change, and
at the time of zooming, the first lens unit moves, the second lens unit moves integrally with an aperture stop, and the third lens unit moves toward the object side, and
the movement of the third lens unit toward the object side is a movement at the time of zooming from the wide angle end to a telephoto end, and
the third lens unit includes one negative lens, and
the following conditional expressions are satisfied:

$$0.75 < (\beta_{2t}/\beta_{2w})/(\beta_{3t}/\beta_{3w}) < 1.38$$

$$0.94 < f_2/f_w < 1.70$$

$$1.00 < D_{aiw}/(\tan \omega_t \times f_t) < 2.90$$

where,
$\beta_{2t}$ denotes a lateral magnification of the second lens unit at the telephoto end,
$\beta_{2w}$ denotes a lateral magnification of the second lens unit at the wide angle end,
$\beta_{3t}$ denotes a lateral magnification of the third lens unit at the telephoto end, and
$\beta_{3w}$ denotes a lateral magnification of the third lens unit at the wide angle end,
here,
each lateral magnification is a lateral magnification at the time of focusing on an infinite object point, and
$f_2$ denotes a focal length of the second lens unit, and
$f_w$ denotes a focal length of the overall zoom lens system at the wide angle end, and
$D_{aiw}$ denotes a distance between the aperture stop and an image plane at the wide angle end,
$\omega_t$ denotes a half angle of view at the telephoto end, and
$f_t$ denotes a focal length of the overall zoom lens system at the telephoto end.

15. A zoom lens comprising in order from an object side:
a first lens unit having a negative refractive power;
a second lens unit having a positive refractive power; and
a third lens unit having a negative refractive power, wherein
the total number of lens units in the zoom lens is three, and
at the time of zooming, all distances between the lens units change, and
at the time of zooming, movement of the first lens unit includes at least a movement toward an image side, the second lens unit moves integrally with an aperture stop, and the third lens unit moves toward the object side, and
the movement of the first lens unit toward the image side is a movement when the zooming started from a wide angle end, and
the movement of the third lens unit toward the object side is a movement at the time of zooming from the wide angle end to a telephoto end, and
the first lens unit includes a plurality of negative lenses and a positive lens, and one of the negative lenses is disposed nearest to an object, and
the following conditional expressions are satisfied:

$0.75<(\beta_{2t}/\beta_{2w})/(\beta_{3t}/\beta_{3w})<1.38$ $-0.70<\beta_{2w}<-0.32$ $0.96<f_2/f_w<1.80$ where,
$\beta_{2t}$ denotes a lateral magnification of the second lens unit at the telephoto end,
$\beta_{2w}$ denotes a lateral magnification of the second lens unit at the wide angle end,
$\beta_{3t}$ denotes a lateral magnification of the third lens unit at the telephoto end, and
$\beta_{3w}$ denotes a lateral magnification of the third lens unit at the wide angle end,
here,
each lateral magnification is a lateral magnification at the time of focusing on an infinite object point, and
$f_2$ denotes a focal length of the second lens unit, and
$f_w$ denotes a focal length of the overall zoom lens system at the wide angle end.

16. A zoom lens comprising in order from an object side:
a first lens unit having a negative refractive power;
a second lens unit having a positive refractive power; and
a third lens unit having a negative refractive power, wherein
the total number of lens units in the zoom lens is three, and
at the time of zooming, all distances between the lens units change, and
at the time of zooming, movement of the first lens unit includes at least a movement toward an image side, a second lens unit moves integrally with an aperture stop, and the third lens unit moves toward the object side, and
the movement of the first lens unit toward the image side is a movement when the zooming started from a wide angle end, and
the movement of the third lens unit toward the object side is a movement at the time of zooming from the wide angle end to a telephoto end, and
the first lens unit includes a plurality of negative lenses and a positive lens, and one of the negative lenses is disposed nearest to an object, and
the third lens unit includes not less than two lenses, and
the following conditional expressions are satisfied:

$0.75<(\beta_{2t}/\beta_{2w})/(\beta_{3t}/(\beta_{3w})<2.00$ $0.96<f_2/f_w<1.70$ where,
$\beta_{2t}$ denotes a lateral magnification of the second lens unit at the telephoto end,
$\beta_{2w}$ denotes a lateral magnification of the second lens unit at the wide angle end,
$\beta_{3t}$ denotes a lateral magnification of the third lens unit at the telephoto end, and
$\beta_{3w}$ denotes a lateral magnification of the third lens unit at the wide angle end,
here,
each lateral magnification is a lateral magnification at the time of focusing on an infinite object point, and
$f_2$ denotes a focal length of the second lens unit,
$f_w$ denotes a focal length of the overall zoom lens system at the wide angle end.

17. A zoom lens comprising in order from an object side:
a first lens unit having a negative refractive power;
a second lens unit having a positive refractive power; and
a third lens unit having a negative refractive power, wherein
the total number of lens units in the zoom lens is three, and
at the time of zooming, all distances between the lens units change, and
at the time of zooming, the first lens unit moves, the second lens unit moves integrally with an aperture stop, and the third lens unit moves toward the object side, and
the movement of the third lens unit toward the object side is a movement at the time of zooming from the wide angle end to a telephoto end, and
the first lens unit includes a plurality of negative lenses, and the third lens unit includes one negative lens, and
the following conditional expressions are satisfied:

$0.75<(\beta_{2t}/\beta_{2w})/(\beta_{3t}/\beta_{3w})<1.38$ $0.94<f_2/f_w<1.70$ where,
$\beta_{2t}$ denotes a lateral magnification of the second lens unit at the telephoto end,
$\beta_{2w}$ denotes a lateral magnification of the second lens unit at the wide angle end,
$\beta_{3t}$ denotes a lateral magnification of the third lens unit at the telephoto end, and
$\beta_{3w}$ denotes a lateral magnification of the third lens unit at the wide angle end,
here,
each lateral magnification is a lateral magnification at the time of focusing on an infinite object point, and
$f_2$ denotes a focal length of the second lens unit, and
$f_w$ denotes a focal length of the overall zoom lens system at the wide angle end.

18. A zoom lens comprising in order from an object side:
a first lens unit having a negative refractive power;
a second lens unit having a positive refractive power; and
a third lens unit having a negative refractive power, wherein
the total number of lens units in the zoom lens is three, and
at the time of zooming, all distances between the lens units change, and
at the time of zooming, movement of the first lens unit includes at least a movement toward an image side, a second lens unit moves integrally with an aperture stop, and the third lens unit moves toward the object side, and
the movement of the first lens unit toward the image side is a movement when the zooming started from a wide angle end, and
the movement of the third lens unit toward the object side is a movement at the time of zooming from the wide angle end to a telephoto end, and
the first lens unit includes at least a negative lens and a positive lens, and the negative lens is disposed nearest to an object, and
the second lens unit includes the aperture stop, and there is a single lens or a cemented lens adjacent to the aperture stop in the second lens unit, and the single lens or the cemented lens moves integrally with the aperture stop at the time of zooming, and
the third lens unit includes not less than two lenses, and
the following conditional expressions are satisfied:

$$0.75 < (\beta_{2t}/\beta_{2w})/(\beta_{3t}/(\beta_{3w}) < 2.00$$

$$0.96 < f_2/f_w < 1.70$$

where,
$\beta_{2t}$ denotes a lateral magnification of the second lens unit at the telephoto end,
$\beta_{2w}$ denotes a lateral magnification of the second lens unit at the wide angle end,
$\beta_{3t}$ denotes a lateral magnification of the third lens unit at the telephoto end, and
$\beta_{3w}$ denotes a lateral magnification of the third lens unit at the wide angle end,
here,
each lateral magnification is a lateral magnification at the time of focusing on an infinite object point, and
$f_2$ denotes a focal length of the second lens unit,
$f_w$ denotes a focal length of the overall zoom lens system at the wide angle end.

* * * * *